United States Patent
Wright et al.

(10) Patent No.: US 12,169,793 B2
(45) Date of Patent: Dec. 17, 2024

(54) APPROXIMATE VALUE ITERATION WITH COMPLEX RETURNS BY BOUNDING

(71) Applicant: The Research Foundation for The State University of New York, Binghamton, NY (US)

(72) Inventors: Robert Wright, Sherrill, NY (US); Lei Yu, Vestal, NY (US); Steven Loscalzo, Vienna, VA (US)

(73) Assignee: The Research Foundation for The State University of New York, Binghamton, NY (US)

( * ) Notice: Subject to any disclaimer, the term of this patent is extended or adjusted under 35 U.S.C. 154(b) by 1067 days.

(21) Appl. No.: 17/099,762

(22) Filed: Nov. 16, 2020

(65) Prior Publication Data

US 2021/0150399 A1    May 20, 2021

Related U.S. Application Data

(63) Continuation of application No. 15/359,122, filed on Nov. 22, 2016, now Pat. No. 10,839,302.

(Continued)

(51) Int. Cl.
*G06N 7/01* (2023.01)
*G05B 13/02* (2006.01)
(Continued)

(52) U.S. Cl.
CPC ........... *G06N 7/01* (2023.01); *G05B 13/0265* (2013.01); *G05B 15/02* (2013.01); *G06N 20/00* (2019.01); *Y02B 10/30* (2013.01)

(58) Field of Classification Search
CPC ........... G06N 7/01; G06N 20/00; G06N 3/08; G06N 3/04; G06N 3/063; G05B 13/0265; G05B 15/02; G05B 10/30
See application file for complete search history.

(56) References Cited

U.S. PATENT DOCUMENTS

| | | | |
|---|---|---|---|
| 4,665,549 A | 5/1987 | Eriksson et al. | |
| 4,794,537 A | 12/1988 | Adasek et al. | |

(Continued)

OTHER PUBLICATIONS

Wright, Robert, Xingye Qiao, Steven Loscalzo, and Lei Yu. "Improving approximate value iteration with complex returns by bounding." In Proceedings of the AAAI Conference on Artificial Intelligence, vol. 29, No. 1. 2015. (Year: 2015).*

(Continued)

*Primary Examiner* — Kamran Afshar
*Assistant Examiner* — Brian J Hales
(74) *Attorney, Agent, or Firm* — Hoffberg & Associates; Steven M. Hoffberg

(57) ABSTRACT

A system and method for controlling a system, comprising estimating an optimal control policy for the system; receiving data representing sequential states and associated trajectories of the system, comprising off-policy states and associated off-policy trajectories; improving the estimate of the optimal control policy by performing at least one approximate value iteration, comprising: estimating a value of operation of the system dependent on the estimated optimal control policy; using a complex return of the received data, biased by the off-policy states, to determine a bound dependent on at least the off-policy trajectories, and using the bound to improve the estimate of the value of operation of the system according to the estimated optimal control policy; and updating the estimate of the optimimal control policy, dependent on the improved estimate of the value of operation of the system. The control system may produce an output signal to control the system directly, or output the optimized control policy. The system preferably is a reinforcement learning system which continually improves.

20 Claims, 4 Drawing Sheets

Related U.S. Application Data

(60) Provisional application No. 62/259,911, filed on Nov. 25, 2015, provisional application No. 62/259,563, filed on Nov. 24, 2015.

(51) Int. Cl.
*G05B 15/02* (2006.01)
*G06N 20/00* (2019.01)

(56) References Cited

U.S. PATENT DOCUMENTS

| | | | |
|---|---|---|---|
| 5,175,798 A | 12/1992 | Taylor et al. | |
| 5,301,101 A | 4/1994 | MacArthur et al. | |
| 5,355,305 A | 10/1994 | Seem et al. | |
| 5,394,327 A | 2/1995 | Simon, Jr. et al. | |
| 5,444,820 A | 8/1995 | Tzes et al. | |
| 5,464,369 A | 11/1995 | Federspiel | |
| 5,475,795 A | 12/1995 | Taylor et al. | |
| 5,504,839 A | 4/1996 | Mobus | |
| 5,506,768 A | 4/1996 | Seem et al. | |
| 5,511,724 A | 4/1996 | Freiberger et al. | |
| 5,550,752 A | 8/1996 | Federspiel | |
| 5,568,377 A | 10/1996 | Seem et al. | |
| 5,579,993 A | 12/1996 | Ahmed et al. | |
| 5,579,994 A | 12/1996 | Davis, Jr. et al. | |
| 5,608,843 A | 3/1997 | Baird, III | |
| 5,651,264 A | 7/1997 | Lo et al. | |
| 5,677,609 A | 10/1997 | Khan et al. | |
| 5,697,838 A | 12/1997 | Morris | |
| 5,740,324 A | 4/1998 | Mathur et al. | |
| 5,768,121 A | 6/1998 | Federspiel | |
| 5,769,314 A | 6/1998 | Drees et al. | |
| 5,802,506 A | 9/1998 | Hutchison | |
| 5,822,740 A | 10/1998 | Haissig et al. | |
| 5,832,466 A | 11/1998 | Feldgajer | |
| 5,875,108 A | 2/1999 | Hoffberg et al. | |
| 5,875,109 A | 2/1999 | Federspiel | |
| 5,901,246 A | 5/1999 | Hoffberg et al. | |
| 5,924,086 A | 7/1999 | Mathur et al. | |
| 5,946,673 A | 8/1999 | Francone et al. | |
| 6,006,142 A | 12/1999 | Seem et al. | |
| 6,033,302 A | 3/2000 | Ahmed et al. | |
| 6,038,556 A | 3/2000 | Hutchison | |
| 6,041,264 A | 3/2000 | Wruck et al. | |
| 6,047,557 A | 4/2000 | Pham et al. | |
| 6,081,750 A | 6/2000 | Hoffberg et al. | |
| 6,095,426 A | 8/2000 | Ahmed et al. | |
| 6,119,125 A | 9/2000 | Gloudeman et al. | |
| 6,131,463 A | 10/2000 | Morris | |
| 6,160,892 A | 12/2000 | Ver | |
| 6,169,981 B1 | 1/2001 | Werbos | |
| 6,192,354 B1 | 2/2001 | Bigus et al. | |
| 6,201,872 B1 | 3/2001 | Hersh et al. | |
| 6,219,590 B1 | 4/2001 | Bernaden, III et al. | |
| 6,240,324 B1 | 5/2001 | Preska et al. | |
| 6,250,560 B1 | 6/2001 | Kline et al. | |
| 6,264,111 B1 | 7/2001 | Nicolson et al. | |
| 6,295,363 B1 | 9/2001 | Laak, Jr. et al. | |
| 6,296,193 B1 | 10/2001 | West et al. | |
| 6,393,852 B2 | 5/2002 | Pham et al. | |
| 6,400,996 B1 | 6/2002 | Hoffberg et al. | |
| 6,405,103 B1 | 6/2002 | Ryan et al. | |
| 6,408,228 B1 | 6/2002 | Seem et al. | |
| 6,408,635 B1 | 6/2002 | Pham et al. | |
| 6,418,424 B1 | 7/2002 | Hoffberg et al. | |
| 6,427,454 B1 | 8/2002 | West | |
| 6,430,985 B1 | 8/2002 | Drees | |
| 6,438,974 B1 | 8/2002 | Pham et al. | |
| 6,449,972 B2 | 9/2002 | Pham et al. | |
| 6,454,178 B1 | 9/2002 | Fusco et al. | |
| 6,467,280 B2 | 10/2002 | Pham et al. | |
| 6,467,282 B2 | 10/2002 | French et al. | |
| 6,473,851 B1 | 10/2002 | Plutowski | |
| 6,499,305 B2 | 12/2002 | Pham et al. | |
| 6,505,057 B1 | 1/2003 | Finn et al. | |
| 6,505,475 B1 | 1/2003 | Zugibe et al. | |
| 6,513,022 B1 | 1/2003 | Morgan | |
| 6,529,887 B1 | 3/2003 | Doya et al. | |
| 6,532,454 B1 | 3/2003 | Werbos | |
| 6,581,048 B1 | 6/2003 | Werbos | |
| 6,581,847 B2 | 6/2003 | Kline et al. | |
| 6,611,823 B1 | 8/2003 | Selmic et al. | |
| 6,616,057 B1 | 9/2003 | Kelly et al. | |
| 6,640,145 B2 | 10/2003 | Hoffberg et al. | |
| 6,647,318 B2 | 11/2003 | Salsbury | |
| 6,651,895 B1 | 11/2003 | Kadle et al. | |
| 6,662,578 B2 | 12/2003 | Pham et al. | |
| 6,662,583 B2 | 12/2003 | Pham et al. | |
| 6,672,431 B2 | 1/2004 | Brand et al. | |
| 6,679,072 B2 | 1/2004 | Pham et al. | |
| 6,708,160 B1 | 3/2004 | Werbos | |
| 6,726,111 B2 | 4/2004 | Weimer et al. | |
| 6,736,089 B1 | 5/2004 | Lefebvre et al. | |
| 6,775,377 B2 | 8/2004 | McIllwaine et al. | |
| 6,775,415 B1 | 8/2004 | Clausen et al. | |
| 6,792,336 B1 | 9/2004 | Johnson et al. | |
| 6,847,854 B2 | 1/2005 | Discenzo | |
| 6,850,171 B2 | 2/2005 | Mathias | |
| 6,850,252 B1 | 2/2005 | Hoffberg | |
| 6,865,562 B2 | 3/2005 | Fromherz et al. | |
| 6,882,992 B1 | 4/2005 | Werbos | |
| 6,906,434 B1 | 6/2005 | Koeppe et al. | |
| 6,912,515 B2 | 6/2005 | Jackson et al. | |
| 6,917,925 B2 | 7/2005 | Berenji et al. | |
| 6,937,909 B2 | 8/2005 | Seem | |
| 6,950,534 B2 | 9/2005 | Cohen et al. | |
| 6,959,520 B2 | 11/2005 | Hartman | |
| 6,987,331 B2 | 1/2006 | Koeppe et al. | |
| 6,990,670 B1 | 1/2006 | Hodjat | |
| 7,006,881 B1 | 2/2006 | Hoffberg et al. | |
| 7,013,201 B2 | 3/2006 | Hattori et al. | |
| 7,014,015 B2 | 3/2006 | Nikovski et al. | |
| 7,024,254 B2 | 4/2006 | Salsbury et al. | |
| 7,024,336 B2 | 4/2006 | Salsbury et al. | |
| 7,031,880 B1 | 4/2006 | Seem et al. | |
| 7,043,462 B2 | 5/2006 | Jin et al. | |
| 7,044,397 B2 | 5/2006 | Bartlett et al. | |
| 7,050,873 B1 | 5/2006 | Discenzo | |
| 7,059,143 B1 | 6/2006 | Zugibe et al. | |
| 7,079,904 B1 | 7/2006 | Forstrom et al. | |
| 7,080,055 B2 | 7/2006 | Campos et al. | |
| 7,086,240 B1 | 8/2006 | Zugibe et al. | |
| 7,136,710 B1 | 11/2006 | Hoffberg et al. | |
| 7,143,016 B1 | 11/2006 | Discenzo et al. | |
| 7,164,117 B2 | 1/2007 | Breed et al. | |
| 7,174,354 B2 | 2/2007 | Andreasson | |
| 7,239,962 B2 | 7/2007 | Plutowski | |
| 7,243,945 B2 | 7/2007 | Breed et al. | |
| 7,272,234 B2 | 9/2007 | Sommerfeldt et al. | |
| 7,295,119 B2 | 11/2007 | Rappaport et al. | |
| 7,295,960 B2 | 11/2007 | Rappaport et al. | |
| 7,308,322 B1 | 12/2007 | Discenzo et al. | |
| 7,321,882 B2 | 1/2008 | Jaeger | |
| 7,343,016 B2 | 3/2008 | Kim | |
| 7,347,774 B2 | 3/2008 | Aronstam et al. | |
| 7,386,522 B1 | 6/2008 | Bigus et al. | |
| 7,389,649 B2 | 6/2008 | Pham et al. | |
| 7,403,904 B2 | 7/2008 | Abe et al. | |
| 7,407,029 B2 | 8/2008 | Breed et al. | |
| 7,415,126 B2 | 8/2008 | Breed et al. | |
| 7,419,365 B2 | 9/2008 | Pham et al. | |
| 7,451,005 B2 | 11/2008 | Hoffberg et al. | |
| 7,458,342 B2 | 12/2008 | Lefebvre et al. | |
| 7,460,690 B2 | 12/2008 | Cohen et al. | |
| 7,461,849 B2 | 12/2008 | Robbins et al. | |
| 7,475,828 B2 | 1/2009 | Bartlett et al. | |
| 7,489,303 B1 | 2/2009 | Pryor | |
| 7,505,877 B2 | 3/2009 | Salsbury | |
| 7,519,553 B2 | 4/2009 | Abe et al. | |
| 7,533,536 B1 | 5/2009 | Zugibe et al. | |
| 7,539,549 B1 | 5/2009 | Discenzo et al. | |
| 7,539,748 B2 | 5/2009 | Williams | |
| 7,542,876 B2 | 6/2009 | Singhal et al. | |
| 7,546,210 B2 | 6/2009 | Callahan et al. | |

(56) References Cited

U.S. PATENT DOCUMENTS

| | | |
|---|---|---|
| 7,556,271 B2 | 7/2009 | Robbins et al. |
| 7,577,108 B2 | 8/2009 | Zhang et al. |
| 7,583,710 B2 | 9/2009 | Dantus et al. |
| 7,599,759 B2 | 10/2009 | Zugibe et al. |
| 7,606,751 B2 | 10/2009 | Tarbox et al. |
| 7,611,157 B2 | 11/2009 | Robbins et al. |
| 7,617,140 B2 | 11/2009 | Tarbox et al. |
| 7,619,647 B2 | 11/2009 | Wren et al. |
| 7,623,993 B2 | 11/2009 | Kelkar et al. |
| 7,628,409 B2 | 12/2009 | Robbins et al. |
| 7,630,986 B1 | 12/2009 | Herz et al. |
| 7,654,098 B2 | 2/2010 | Pham et al. |
| 7,663,502 B2 | 2/2010 | Breed |
| 7,668,340 B2 | 2/2010 | Cohen et al. |
| 7,672,739 B2 | 3/2010 | Ganesan et al. |
| 7,707,131 B2 | 4/2010 | Chickering et al. |
| 7,734,471 B2 | 6/2010 | Paek et al. |
| 7,740,234 B2 | 6/2010 | Robbins et al. |
| 7,769,623 B2 | 8/2010 | Mittal et al. |
| 7,797,062 B2 | 9/2010 | Discenzo et al. |
| 7,805,952 B1 | 10/2010 | Zugibe et al. |
| 7,813,822 B1 | 10/2010 | Hoffberg |
| 7,827,124 B2 | 11/2010 | McKinstry et al. |
| 7,827,813 B2 | 11/2010 | Seem |
| 7,837,543 B2 | 11/2010 | Graepel et al. |
| 7,839,275 B2 | 11/2010 | Spalink et al. |
| RE42,006 E | 12/2010 | Pham et al. |
| 7,849,033 B2 | 12/2010 | Sabe et al. |
| 7,853,645 B2 | 12/2010 | Brown et al. |
| 7,865,334 B2 | 1/2011 | Singhal et al. |
| 7,881,830 B2 | 2/2011 | Yasui et al. |
| 7,890,927 B2 | 2/2011 | Eldridge et al. |
| 7,904,187 B2 | 3/2011 | Hoffberg et al. |
| 7,918,100 B2 | 4/2011 | Breed et al. |
| 7,936,732 B2 | 5/2011 | Ho et al. |
| 7,949,474 B2 | 5/2011 | Callahan et al. |
| 7,966,078 B2 | 6/2011 | Hoffberg et al. |
| 7,966,104 B2 | 6/2011 | Srivastava et al. |
| 7,966,276 B2 | 6/2011 | Cade |
| 7,970,739 B2 | 6/2011 | Carmel et al. |
| 7,974,714 B2 | 7/2011 | Hoffberg |
| 7,977,852 B2 | 7/2011 | Ward et al. |
| 7,979,293 B2 | 7/2011 | Reaume |
| 7,984,420 B2 | 7/2011 | Eldridge et al. |
| 7,987,003 B2 | 7/2011 | Hoffberg et al. |
| 8,001,063 B2 | 8/2011 | Tesauro et al. |
| 8,010,252 B2 | 8/2011 | Getman et al. |
| 8,023,500 B2 | 9/2011 | Thibault et al. |
| 8,024,611 B1 | 9/2011 | Meek et al. |
| 8,027,742 B2 | 9/2011 | Seem et al. |
| 8,028,272 B2 | 9/2011 | Eldridge et al. |
| 8,028,275 B2 | 9/2011 | Eldridge et al. |
| 8,031,060 B2 | 10/2011 | Hoffberg et al. |
| 8,035,320 B2 | 10/2011 | Sibert |
| 8,041,661 B2 | 10/2011 | Curtis |
| 8,046,107 B2 | 10/2011 | Zugibe et al. |
| 8,046,313 B2 | 10/2011 | Hoffberg et al. |
| 8,060,222 B2 | 11/2011 | Eldridge et al. |
| 8,086,352 B1 | 12/2011 | Elliott |
| 8,090,452 B2 | 1/2012 | Johnson et al. |
| 8,096,140 B2 | 1/2012 | Seem |
| 8,103,465 B2 | 1/2012 | Brzezowski et al. |
| 8,126,574 B2 | 2/2012 | Discenzo et al. |
| 8,126,765 B2 | 2/2012 | Dube et al. |
| 8,127,060 B2 | 2/2012 | Doll et al. |
| 8,135,653 B2 | 3/2012 | Sekiai et al. |
| 8,147,302 B2 | 4/2012 | Desrochers et al. |
| 8,165,770 B2 | 4/2012 | Getman et al. |
| 8,165,916 B2 | 4/2012 | Hoffberg et al. |
| 8,176,011 B2 | 5/2012 | Carmel et al. |
| 8,200,344 B2 | 6/2012 | Li et al. |
| 8,200,345 B2 | 6/2012 | Li et al. |
| 8,209,040 B2 | 6/2012 | Sekiai et al. |
| 8,212,688 B2 | 7/2012 | Morioka et al. |
| 8,214,062 B2 | 7/2012 | Eguchi et al. |
| 8,225,271 B2 | 7/2012 | Eldridge et al. |
| 8,229,579 B2 | 7/2012 | Eldridge et al. |
| 8,229,825 B2 | 7/2012 | Tarbox et al. |
| 8,234,146 B2 | 7/2012 | Mittal et al. |
| 8,235,776 B2 | 8/2012 | Stanimirovic |
| 8,250,014 B2 | 8/2012 | Schneegaß et al. |
| 8,260,441 B2 | 9/2012 | Scheegaß et al. |
| 8,260,655 B2 | 9/2012 | Dance et al. |
| 8,265,110 B2 | 9/2012 | Dantus et al. |
| 8,275,635 B2 | 9/2012 | Stivoric et al. |
| 8,285,581 B2 | 10/2012 | Abe et al. |
| 8,301,406 B2 | 10/2012 | Lee et al. |
| 8,301,527 B2 | 10/2012 | Tarbox et al. |
| 8,316,926 B2 | 11/2012 | Cheng et al. |
| 8,321,862 B2 | 11/2012 | Swamy et al. |
| 8,326,464 B2 | 12/2012 | Clanin |
| 8,326,780 B2 | 12/2012 | Gupta et al. |
| 8,327,653 B1 | 12/2012 | Zugibe et al. |
| 8,340,789 B2 | 12/2012 | Wintrich et al. |
| 8,356,760 B2 | 1/2013 | Riley, Jr. |
| 8,359,226 B2 | 1/2013 | Abe et al. |
| 8,364,136 B2 | 1/2013 | Hoffberg et al. |
| 8,368,640 B2 | 2/2013 | Dardinski et al. |
| 8,369,967 B2 | 2/2013 | Hoffberg et al. |
| 8,382,590 B2 | 2/2013 | Stivoric et al. |
| 8,396,550 B2 | 3/2013 | Rom |
| 8,412,357 B2 | 4/2013 | Seem |
| 8,417,360 B2 | 4/2013 | Sustaeta et al. |
| 8,422,444 B2 | 4/2013 | Gunawardena et al. |
| 8,424,328 B2 | 4/2013 | Lifson et al. |
| 8,424,885 B2 | 4/2013 | Woodbury, II et al. |
| 8,428,755 B2 | 4/2013 | Salsbury |
| 8,433,578 B2 | 4/2013 | Williams et al. |
| 8,447,431 B2 | 5/2013 | Lefebvre et al. |
| 8,447,706 B2 | 5/2013 | Schneegaß et al. |
| 8,452,639 B2 | 5/2013 | Abe et al. |
| 8,458,715 B1 | 6/2013 | Khosla et al. |
| 8,463,441 B2 | 6/2013 | Zugibe et al. |
| 8,463,964 B2 | 6/2013 | Kostadinov et al. |
| 8,468,041 B1 | 6/2013 | Vengerov |
| 8,473,080 B2 | 6/2013 | Seem et al. |
| 8,478,433 B2 | 7/2013 | Seem et al. |
| 8,484,146 B2 | 7/2013 | Movellan et al. |
| 8,494,980 B2 | 7/2013 | Hans et al. |
| 8,494,989 B1 | 7/2013 | VanDerHorn et al. |
| 8,495,888 B2 | 7/2013 | Seem |
| 8,504,493 B2 | 8/2013 | Jones, III |
| 8,504,504 B2 | 8/2013 | Liu |
| 8,516,266 B2 | 8/2013 | Hoffberg et al. |
| 8,527,108 B2 | 9/2013 | Kulyk et al. |
| 8,527,109 B2 | 9/2013 | Kulyk et al. |
| 8,538,184 B2 | 9/2013 | Neogi et al. |
| 8,548,745 B2 | 10/2013 | Callahan et al. |
| 8,554,706 B2 | 10/2013 | Hayashi et al. |
| 8,560,657 B2 | 10/2013 | Williams |
| 8,567,204 B2 | 10/2013 | Seem |
| 8,571,317 B2 | 10/2013 | Welling et al. |
| 8,583,263 B2 | 11/2013 | Hoffberg et al. |
| 8,583,284 B2 | 11/2013 | Fidenberger et al. |
| 8,594,813 B2 | 11/2013 | Cheng et al. |
| 8,594,814 B2 | 11/2013 | Rovaglio et al. |
| 8,608,480 B2 | 12/2013 | Chan et al. |
| 8,612,106 B2 | 12/2013 | Mitchell et al. |
| 8,612,107 B2 | 12/2013 | Malikopoulos |
| 8,626,345 B2 | 1/2014 | Li |
| 8,626,565 B2 | 1/2014 | Petroff |
| 8,639,392 B2 | 1/2014 | Chassin |
| 8,644,990 B2 | 2/2014 | Kim et al. |
| 8,655,822 B2 | 2/2014 | Levchuk et al. |
| 8,661,136 B2 | 2/2014 | Tumbde et al. |
| 8,666,517 B2 | 3/2014 | Li et al. |
| 8,674,544 B2 | 3/2014 | Rada et al. |
| 8,682,454 B2 | 3/2014 | Fuller et al. |
| 8,682,677 B2 | 3/2014 | William et al. |
| 8,694,132 B2 | 4/2014 | Li et al. |
| 8,694,409 B2 | 4/2014 | Chassin et al. |
| 8,762,304 B2 | 6/2014 | Chitapur et al. |
| 8,762,379 B2 | 6/2014 | Birdwell et al. |
| 8,767,987 B2 | 7/2014 | Fretz |

(56) References Cited

U.S. PATENT DOCUMENTS

| | | |
|---|---|---|
| 8,774,923 B2 | 7/2014 | Rom |
| 8,775,341 B1 | 7/2014 | Commons |
| 8,781,608 B2 | 7/2014 | Seem et al. |
| 8,788,415 B2 | 7/2014 | Chassin et al. |
| 8,793,119 B2 | 7/2014 | Williams |
| 8,793,205 B1 | 7/2014 | Fisher et al. |
| 8,793,381 B2 | 7/2014 | Baughman et al. |
| 8,793,557 B2 | 7/2014 | Smyth |
| 8,805,598 B2 | 8/2014 | Shaffer et al. |
| 8,805,759 B1 | 8/2014 | Cha et al. |
| 8,816,752 B2 | 8/2014 | Smith |
| 8,818,925 B2 | 8/2014 | Morimura et al. |
| 8,819,523 B2 | 8/2014 | Smyth |
| 8,832,007 B2 | 9/2014 | Nahum et al. |
| 8,845,795 B2 | 9/2014 | Becze et al. |
| 8,860,602 B2 | 10/2014 | Nohara et al. |
| 8,873,813 B2 | 10/2014 | Tadayon et al. |
| 8,874,440 B2 | 10/2014 | Park et al. |
| 8,874,477 B2 | 10/2014 | Hoffberg |
| 8,882,895 B2 | 11/2014 | Ball et al. |
| 8,897,563 B1 | 11/2014 | Welling et al. |
| 8,909,359 B2 | 12/2014 | Seem |
| 8,909,571 B2 | 12/2014 | Morimura et al. |
| 8,909,590 B2 | 12/2014 | Newnham et al. |
| 8,914,300 B2 | 12/2014 | Sustaeta et al. |
| 8,915,295 B2 | 12/2014 | Norrell et al. |
| 8,918,223 B2 | 12/2014 | Kulyk et al. |
| 8,918,657 B2 | 12/2014 | Cameron et al. |
| 8,924,024 B2 | 12/2014 | Lefebvre et al. |
| 8,924,318 B2 | 12/2014 | Newnham et al. |
| 8,930,115 B2 | 1/2015 | Filev et al. |
| 8,930,116 B2 | 1/2015 | Filev et al. |
| 8,943,008 B2 | 1/2015 | Ponulak et al. |
| 8,954,319 B2 | 2/2015 | Williams |
| 8,965,597 B2 | 2/2015 | Filev et al. |
| 8,976,041 B2 | 3/2015 | Buckel |
| 8,987,959 B2 | 3/2015 | Sortore et al. |
| 8,990,133 B1 | 3/2015 | Ponulak et al. |
| 8,996,141 B1 | 3/2015 | Alsaleem et al. |
| 8,996,177 B2 | 3/2015 | Coenen |
| 9,002,483 B1 | 4/2015 | Engler |
| 9,007,908 B2 | 4/2015 | Niyato et al. |
| 9,008,840 B1 | 4/2015 | Ponulak et al. |
| 9,008,914 B2 | 4/2015 | Akiyama |
| 9,015,092 B2 | 4/2015 | Sinyavskiy et al. |
| 9,015,093 B1 | 4/2015 | Commons |
| 9,021,462 B2 | 4/2015 | Gupta |
| 9,026,473 B2 | 5/2015 | Chassin et al. |
| 9,053,431 B1 | 6/2015 | Commons |
| 9,053,545 B2 | 6/2015 | Steinberg et al. |
| 9,056,368 B2 | 6/2015 | Stork Genannt Wersborg |
| 9,057,532 B2 | 6/2015 | Clanin |
| 9,063,551 B2 | 6/2015 | Deivasigamani et al. |
| 9,073,701 B2 | 7/2015 | Lopes |
| 9,081,760 B2 | 7/2015 | Barbosa et al. |
| 9,082,079 B1 | 7/2015 | Coenen |
| 9,087,359 B2 | 7/2015 | Chassin |
| 9,088,179 B2 | 7/2015 | Shaffer et al. |
| 9,090,255 B2 | 7/2015 | Gupta et al. |
| 9,092,307 B2 | 7/2015 | Langer et al. |
| 9,104,186 B2 | 8/2015 | Sinyavskiy et al. |
| 9,104,497 B2 | 8/2015 | Mortazavi |
| 9,105,077 B2 | 8/2015 | Wersborg et al. |
| 9,109,981 B2 | 8/2015 | Sharp |
| 9,110,647 B2 | 8/2015 | Kulyk et al. |
| 9,113,371 B2 | 8/2015 | Sun et al. |
| 9,120,365 B2 | 9/2015 | Herr-Rathke et al. |
| 9,129,337 B2 | 9/2015 | Chassin et al. |
| 9,134,707 B2 | 9/2015 | Vamvoudakis et al. |
| 9,146,546 B2 | 9/2015 | Sinyavskiy et al. |
| 9,152,915 B1 | 10/2015 | Gabardos et al. |
| 9,156,165 B2 | 10/2015 | Ponulak |
| 9,172,738 B1 | 10/2015 | daCosta |
| 9,182,154 B2 | 11/2015 | Burns et al. |
| 2001/0002239 A1 | 5/2001 | Pham et al. |
| 2001/0042792 A1 | 11/2001 | Kline et al. |
| 2001/0045097 A1 | 11/2001 | Pham et al. |
| 2001/0049942 A1 | 12/2001 | Pham et al. |
| 2002/0014538 A1 | 2/2002 | Weimer et al. |
| 2002/0105231 A1 | 8/2002 | Koeppe et al. |
| 2002/0112435 A1 | 8/2002 | Hartman |
| 2002/0116075 A1 | 8/2002 | Salsbury |
| 2002/0151992 A1 | 10/2002 | Hoffberg et al. |
| 2002/0178737 A1 | 12/2002 | Pham et al. |
| 2002/0184166 A1 | 12/2002 | Jackson et al. |
| 2002/0184176 A1 | 12/2002 | Fromherz et al. |
| 2002/0198854 A1 | 12/2002 | Berenji et al. |
| 2003/0061004 A1 | 3/2003 | Discenzo |
| 2003/0063016 A1 | 4/2003 | Mathias |
| 2003/0074338 A1 | 4/2003 | Young et al. |
| 2003/0084672 A1 | 5/2003 | Pham et al. |
| 2003/0089119 A1 | 5/2003 | Pham et al. |
| 2003/0094004 A1 | 5/2003 | Pham et al. |
| 2003/0153986 A1 | 8/2003 | Salsbury et al. |
| 2003/0160104 A1 | 8/2003 | Kelly et al. |
| 2003/0171901 A1 | 9/2003 | Salsbury |
| 2003/0204368 A1 | 10/2003 | Ertin et al. |
| 2003/0209893 A1 | 11/2003 | Breed et al. |
| 2003/0219132 A1 | 11/2003 | Sommerfeldt et al. |
| 2003/0221915 A1 | 12/2003 | Brand et al. |
| 2003/0230443 A1 | 12/2003 | Cramer et al. |
| 2004/0015386 A1 | 1/2004 | Abe et al. |
| 2004/0015933 A1 | 1/2004 | Campos et al. |
| 2004/0029213 A1 | 2/2004 | Callahan et al. |
| 2004/0037430 A1 | 2/2004 | Kim |
| 2004/0073764 A1 | 4/2004 | Andreasson |
| 2004/0117239 A1 | 6/2004 | Mittal et al. |
| 2004/0123550 A1 | 7/2004 | Hartman |
| 2004/0123612 A1 | 7/2004 | Pham et al. |
| 2004/0129478 A1 | 7/2004 | Breed et al. |
| 2004/0143428 A1 | 7/2004 | Rappaport et al. |
| 2004/0161132 A1 | 8/2004 | Cohen et al. |
| 2004/0205394 A1 | 10/2004 | Plutowski |
| 2004/0215356 A1 | 10/2004 | Salsbury et al. |
| 2004/0228277 A1 | 11/2004 | Williams |
| 2004/0236547 A1 | 11/2004 | Rappaport et al. |
| 2004/0236557 A1 | 11/2004 | Shah |
| 2004/0244729 A1 | 12/2004 | Lefebvre et al. |
| 2004/0246900 A1 | 12/2004 | Zhang et al. |
| 2004/0262089 A1 | 12/2004 | Nikovski et al. |
| 2004/0267395 A1 | 12/2004 | Discenzo et al. |
| 2005/0017488 A1 | 1/2005 | Breed et al. |
| 2005/0046584 A1 | 3/2005 | Breed |
| 2005/0071223 A1 | 3/2005 | Jain et al. |
| 2005/0083858 A1 | 4/2005 | Loa et al. |
| 2005/0156052 A1 | 7/2005 | Bartlett et al. |
| 2005/0245303 A1 | 11/2005 | Graepel et al. |
| 2005/0273298 A1 | 12/2005 | Shah |
| 2006/0013440 A1 | 1/2006 | Cohen et al. |
| 2006/0064180 A1 | 3/2006 | Kelkar et al. |
| 2006/0105697 A1 | 5/2006 | Aronstam et al. |
| 2006/0111816 A1 | 5/2006 | Spalink et al. |
| 2006/0121616 A1 | 6/2006 | Lefebvre et al. |
| 2006/0155398 A1 | 7/2006 | Hoffberg et al. |
| 2006/0155660 A1 | 7/2006 | Koshizen et al. |
| 2006/0158051 A1 | 7/2006 | Bartlett et al. |
| 2006/0192850 A1 | 8/2006 | Verhaegh et al. |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0206337 A1 | 9/2006 | Paek et al. |
| 2006/0208169 A1 | 9/2006 | Breed et al. |
| 2006/0208570 A1 | 9/2006 | Christian et al. |
| 2006/0224535 A1 | 10/2006 | Chickering et al. |
| 2006/0234621 A1 | 10/2006 | Desrochers et al. |
| 2006/0247973 A1 | 11/2006 | Mueller et al. |
| 2006/0253296 A1 | 11/2006 | Liisberg et al. |
| 2006/0271441 A1 | 11/2006 | Mueller et al. |
| 2006/0288715 A1 | 12/2006 | Pham et al. |
| 2007/0016265 A1 | 1/2007 | Davoodi et al. |
| 2007/0016476 A1 | 1/2007 | Hoffberg et al. |
| 2007/0022068 A1 | 1/2007 | Linsker |
| 2007/0022771 A1 | 2/2007 | Pham et al. |

(56) References Cited

U.S. PATENT DOCUMENTS

| | | |
|---|---|---|
| 2007/0053513 A1 | 3/2007 | Hoffberg |
| 2007/0061735 A1 | 3/2007 | Hoffberg et al. |
| 2007/0070038 A1 | 3/2007 | Hoffberg et al. |
| 2007/0082601 A1 | 4/2007 | Desrochers et al. |
| 2007/0087756 A1 | 4/2007 | Hoffberg |
| 2007/0094187 A1 | 4/2007 | Anderson et al. |
| 2007/0114292 A1 | 5/2007 | Breed et al. |
| 2007/0145695 A1 | 6/2007 | Robbins et al. |
| 2007/0145699 A1 | 6/2007 | Robbins et al. |
| 2007/0147013 A1 | 6/2007 | Robbins et al. |
| 2007/0151751 A1 | 7/2007 | Robbins et al. |
| 2007/0151779 A1 | 7/2007 | Robbins et al. |
| 2007/0152409 A1 | 7/2007 | Robbins et al. |
| 2007/0174105 A1 | 7/2007 | Abe et al. |
| 2007/0178825 A1 | 8/2007 | Aronstam et al. |
| 2007/0181701 A1 | 8/2007 | Cheng et al. |
| 2007/0198444 A1 | 8/2007 | Movellan et al. |
| 2007/0203871 A1 | 8/2007 | Tesauro et al. |
| 2007/0256432 A1 | 11/2007 | Zugibe et al. |
| 2007/0260346 A1 | 11/2007 | Ganesan et al. |
| 2008/0037485 A1 | 2/2008 | Osinga et al. |
| 2008/0051940 A1 | 2/2008 | Aronstam et al. |
| 2008/0091628 A1 | 4/2008 | Srinivasa et al. |
| 2008/0140379 A1 | 6/2008 | Shah et al. |
| 2008/0140591 A1 | 6/2008 | Agarwal et al. |
| 2008/0154707 A1 | 6/2008 | Mittal et al. |
| 2008/0168016 A1 | 7/2008 | Sekiai et al. |
| 2008/0177621 A1 | 7/2008 | Abe et al. |
| 2008/0179409 A1 | 7/2008 | Seem |
| 2008/0211779 A1 | 9/2008 | Pryor |
| 2008/0243439 A1 | 10/2008 | Runkle et al. |
| 2008/0249844 A1 | 10/2008 | Abe et al. |
| 2008/0265799 A1 | 10/2008 | Sibert |
| 2008/0269955 A1 | 10/2008 | Yasui et al. |
| 2008/0275800 A1 | 11/2008 | Abe et al. |
| 2008/0318678 A1 | 12/2008 | Stivoric et al. |
| 2008/0319781 A1 | 12/2008 | Stivoric et al. |
| 2008/0319786 A1 | 12/2008 | Stivoric et al. |
| 2008/0319787 A1 | 12/2008 | Stivoric et al. |
| 2008/0319796 A1 | 12/2008 | Stivoric et al. |
| 2008/0319855 A1 | 12/2008 | Stivoric et al. |
| 2008/0320029 A1 | 12/2008 | Stivoric et al. |
| 2008/0320030 A1 | 12/2008 | Stivoric et al. |
| 2009/0005912 A1 | 1/2009 | Srivastava et al. |
| 2009/0006457 A1 | 1/2009 | Stivoric et al. |
| 2009/0006458 A1 | 1/2009 | Stivoric et al. |
| 2009/0012922 A1 | 1/2009 | Tesauro et al. |
| 2009/0062961 A1 | 3/2009 | Lefebvre et al. |
| 2009/0074248 A1 | 3/2009 | Cohen et al. |
| 2009/0088991 A1 | 4/2009 | Brzezowski et al. |
| 2009/0089078 A1 | 4/2009 | Bursey |
| 2009/0093928 A1 | 4/2009 | Getman et al. |
| 2009/0099985 A1 | 4/2009 | Tesauro et al. |
| 2009/0116736 A1 | 5/2009 | Neogi et al. |
| 2009/0116746 A1 | 5/2009 | Neogi et al. |
| 2009/0116755 A1 | 5/2009 | Neogi et al. |
| 2009/0116756 A1 | 5/2009 | Neogi et al. |
| 2009/0116757 A1 | 5/2009 | Neogi et al. |
| 2009/0119296 A1 | 5/2009 | Neogi et al. |
| 2009/0127976 A1 | 5/2009 | Ward et al. |
| 2009/0132095 A1 | 5/2009 | Sekiai et al. |
| 2009/0157419 A1 | 6/2009 | Bursey |
| 2009/0177521 A1 | 7/2009 | Dube et al. |
| 2009/0204234 A1 | 8/2009 | Sustaeta et al. |
| 2009/0204237 A1 | 8/2009 | Sustaeta et al. |
| 2009/0204245 A1 | 8/2009 | Sustaeta et al. |
| 2009/0204267 A1 | 8/2009 | Sustaeta et al. |
| 2009/0210081 A1 | 8/2009 | Sustaeta et al. |
| 2009/0225677 A1 | 9/2009 | Williams |
| 2009/0248175 A1 | 10/2009 | Eguchi et al. |
| 2009/0254971 A1 | 10/2009 | Herz et al. |
| 2009/0276457 A1 | 11/2009 | Carmel et al. |
| 2009/0285469 A1 | 11/2009 | Callahan et al. |
| 2009/0299496 A1 | 12/2009 | Cade |
| 2009/0306866 A1 | 12/2009 | Malikopoulos |
| 2009/0312985 A1 | 12/2009 | Eliazar |
| 2009/0322561 A1 | 12/2009 | Morioka et al. |
| 2009/0327011 A1 | 12/2009 | Petroff |
| 2009/0327172 A1 | 12/2009 | Liu et al. |
| 2010/0010681 A1 | 1/2010 | Zugibe et al. |
| 2010/0023307 A1 | 1/2010 | Lee et al. |
| 2010/0030578 A1 | 2/2010 | Siddique et al. |
| 2010/0044990 A1 | 2/2010 | Woodbury |
| 2010/0057258 A1 | 3/2010 | Clanin |
| 2010/0058799 A1 | 3/2010 | Ifson et al. |
| 2010/0076642 A1 | 3/2010 | Hoffberg et al. |
| 2010/0082142 A1 | 4/2010 | Usadi et al. |
| 2010/0082513 A1 | 4/2010 | Liu |
| 2010/0106332 A1 | 4/2010 | Chassin et al. |
| 2010/0106603 A1 | 4/2010 | Dey et al. |
| 2010/0106641 A1 | 4/2010 | Chassin et al. |
| 2010/0107173 A1 | 4/2010 | Chassin |
| 2010/0110634 A1 | 5/2010 | Woodbury et al. |
| 2010/0112533 A1 | 5/2010 | Chan et al. |
| 2010/0114387 A1 | 5/2010 | Chassin |
| 2010/0137734 A1 | 6/2010 | Digiovanna et al. |
| 2010/0145161 A1 | 6/2010 | Niyato et al. |
| 2010/0182137 A1 | 7/2010 | Pryor |
| 2010/0205974 A1 | 8/2010 | Schneegass et al. |
| 2010/0241243 A1 | 9/2010 | Hans et al. |
| 2010/0242045 A1 | 9/2010 | Swamy et al. |
| 2010/0250015 A1 | 9/2010 | Flikkema |
| 2010/0257866 A1 | 10/2010 | Schneegass et al. |
| 2010/0262286 A1 | 10/2010 | Eidenberger et al. |
| 2010/0268533 A1 | 10/2010 | Park et al. |
| 2010/0306001 A1 | 12/2010 | Discenzo et al. |
| 2010/0324936 A1 | 12/2010 | Vishnubhatla et al. |
| 2010/0327687 A1 | 12/2010 | Iannello et al. |
| 2011/0010164 A1 | 1/2011 | Williams |
| 2011/0016067 A1 | 1/2011 | Levchuk et al. |
| 2011/0019693 A1 | 1/2011 | Fu et al. |
| 2011/0022235 A1 | 1/2011 | Li |
| 2011/0029100 A1 | 2/2011 | Seem et al. |
| 2011/0037725 A1 | 2/2011 | Pryor |
| 2011/0040393 A1 | 2/2011 | Cheng et al. |
| 2011/0043035 A1 | 2/2011 | Yamada et al. |
| 2011/0082598 A1 | 4/2011 | Boretto et al. |
| 2011/0099130 A1 | 4/2011 | Blumberg et al. |
| 2011/0131048 A1 | 6/2011 | Williams et al. |
| 2011/0142269 A1 | 6/2011 | Fretz |
| 2011/0148202 A1 | 6/2011 | Rada et al. |
| 2011/0156896 A1 | 6/2011 | Hoffberg et al. |
| 2011/0167110 A1 | 7/2011 | Hoffberg et al. |
| 2011/0168792 A1 | 7/2011 | Riley, Jr. |
| 2011/0190909 A1 | 8/2011 | Salsbury |
| 2011/0213435 A1 | 9/2011 | Rom |
| 2011/0215903 A1 | 9/2011 | Yang et al. |
| 2011/0216953 A1 | 9/2011 | Callahan et al. |
| 2011/0219056 A1 | 9/2011 | Carmel et al. |
| 2011/0231320 A1 | 9/2011 | Irving |
| 2011/0246409 A1 | 10/2011 | Mitra |
| 2011/0249905 A1 | 10/2011 | Singh et al. |
| 2011/0251725 A1 | 10/2011 | Chan |
| 2011/0252248 A1 | 10/2011 | Cameron et al. |
| 2011/0255782 A1 | 10/2011 | Welling et al. |
| 2011/0255784 A1 | 10/2011 | Welling et al. |
| 2011/0255788 A1 | 10/2011 | Duggan et al. |
| 2011/0255789 A1 | 10/2011 | Neogi et al. |
| 2011/0255790 A1 | 10/2011 | Duggan et al. |
| 2011/0255794 A1 | 10/2011 | Neogi et al. |
| 2011/0257860 A1 | 10/2011 | Getman et al. |
| 2011/0258150 A1 | 10/2011 | Neogi et al. |
| 2011/0258170 A1 | 10/2011 | Duggan et al. |
| 2011/0258182 A1 | 10/2011 | Singh et al. |
| 2011/0258195 A1 | 10/2011 | Welling et al. |
| 2011/0278277 A1 | 11/2011 | Stork Genannt Wersborg |
| 2011/0284512 A1 | 11/2011 | Stork Genannt Wersborg |
| 2011/0302000 A1 | 12/2011 | Dance et al. |
| 2011/0316376 A1 | 12/2011 | Sortore et al. |
| 2012/0002567 A1 | 1/2012 | Sun et al. |
| 2012/0010913 A1 | 1/2012 | Lele et al. |
| 2012/0013257 A1 | 1/2012 | Sibert |
| 2012/0016435 A1 | 1/2012 | Rom |
| 2012/0027388 A1 | 2/2012 | Fehr |

(56) References Cited

U.S. PATENT DOCUMENTS

| | | |
|---|---|---|
| 2012/0030137 A1 | 2/2012 | Garcke et al. |
| 2012/0036016 A1 | 2/2012 | Hoffberg et al. |
| 2012/0041608 A1 | 2/2012 | Zugibe et al. |
| 2012/0065746 A1 | 3/2012 | Wintrich et al. |
| 2012/0072030 A1 | 3/2012 | Elliott |
| 2012/0072031 A1 | 3/2012 | Elliott |
| 2012/0072039 A1 | 3/2012 | Anderson et al. |
| 2012/0085291 A1 | 4/2012 | Conger et al. |
| 2012/0107921 A1 | 5/2012 | Willson et al. |
| 2012/0125558 A1 | 5/2012 | Nortman et al. |
| 2012/0150651 A1 | 6/2012 | Hoffberg et al. |
| 2012/0166375 A1 | 6/2012 | Sekiai et al. |
| 2012/0209794 A1 | 8/2012 | Linzey |
| 2012/0221156 A1 | 8/2012 | Fuller et al. |
| 2012/0235579 A1 | 9/2012 | Chemel et al. |
| 2012/0253514 A1 | 10/2012 | Sugimoto et al. |
| 2012/0253524 A1 | 10/2012 | Norrell et al. |
| 2012/0260679 A1 | 10/2012 | Huerta-Ochoa |
| 2012/0278220 A1 | 11/2012 | Chassin et al. |
| 2012/0278221 A1 | 11/2012 | Fuller et al. |
| 2012/0296656 A1 | 11/2012 | Smyth |
| 2012/0296658 A1 | 11/2012 | Smyth |
| 2012/0303388 A1 | 11/2012 | Vishnubhatla et al. |
| 2012/0303412 A1 | 11/2012 | Etzioni et al. |
| 2012/0323674 A1 | 12/2012 | Simmons et al. |
| 2012/0324928 A1 | 12/2012 | Durham et al. |
| 2013/0013120 A1 | 1/2013 | Sabripour |
| 2013/0016669 A1 | 1/2013 | Hottinen et al. |
| 2013/0024043 A1 | 1/2013 | Shaffer et al. |
| 2013/0043319 A1 | 2/2013 | Cheng et al. |
| 2013/0054044 A1 | 2/2013 | Shaffer et al. |
| 2013/0066750 A1 | 3/2013 | Siddique et al. |
| 2013/0073080 A1 | 3/2013 | Ponulak |
| 2013/0080358 A1 | 3/2013 | Newnham et al. |
| 2013/0080377 A1 | 3/2013 | Newnham et al. |
| 2013/0080641 A1 | 3/2013 | Lui et al. |
| 2013/0096722 A1 | 4/2013 | Clanin |
| 2013/0097321 A1 | 4/2013 | Tumbde et al. |
| 2013/0097664 A1 | 4/2013 | Herz et al. |
| 2013/0103490 A1 | 4/2013 | Abe et al. |
| 2013/0131839 A1 | 5/2013 | Washington et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0173504 A1 | 7/2013 | Tu et al. |
| 2013/0178952 A1 | 7/2013 | Wersborg et al. |
| 2013/0178953 A1 | 7/2013 | Wersborg et al. |
| 2013/0184838 A1 | 7/2013 | Tchoryk, Jr. et al. |
| 2013/0185667 A1 | 7/2013 | Harper et al. |
| 2013/0186119 A1 | 7/2013 | Burns et al. |
| 2013/0197676 A1 | 8/2013 | Salsbury et al. |
| 2013/0213082 A1 | 8/2013 | Woodbury et al. |
| 2013/0215116 A1 | 8/2013 | Siddique et al. |
| 2013/0218743 A1 | 8/2013 | Chassin et al. |
| 2013/0218744 A1 | 8/2013 | Chassin et al. |
| 2013/0223724 A1 | 8/2013 | Wersborg et al. |
| 2013/0228134 A1 | 9/2013 | Conger et al. |
| 2013/0238333 A1 | 9/2013 | William et al. |
| 2013/0245831 A1 | 9/2013 | Lefebvre et al. |
| 2013/0249604 A1 | 9/2013 | Smith |
| 2013/0250638 A1 | 9/2013 | Tuttle et al. |
| 2013/0254090 A1 | 9/2013 | Chassin et al. |
| 2013/0262353 A1 | 10/2013 | Vamvoudakis et al. |
| 2013/0269376 A1 | 10/2013 | Zugibe et al. |
| 2013/0284109 A1 | 10/2013 | Conger et al. |
| 2013/0309154 A1 | 11/2013 | Call et al. |
| 2013/0318023 A1 | 11/2013 | Morimura et al. |
| 2013/0319021 A1 | 12/2013 | Ball et al. |
| 2013/0319226 A1 | 12/2013 | Becze et al. |
| 2013/0325691 A1 | 12/2013 | Chassin et al. |
| 2013/0325692 A1 | 12/2013 | Chassin et al. |
| 2013/0325764 A1 | 12/2013 | Morimura et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325776 A1 | 12/2013 | Ponulak et al. |
| 2013/0341159 A1 | 12/2013 | Lopes |
| 2013/0346614 A1 | 12/2013 | Baughman et al. |
| 2014/0012821 A1 | 1/2014 | Fuhrmann et al. |
| 2014/0018985 A1 | 1/2014 | Gupta et al. |
| 2014/0025613 A1 | 1/2014 | Ponulak |
| 2014/0032458 A1 | 1/2014 | Sinyavskiy et al. |
| 2014/0032459 A1 | 1/2014 | Sinyavskiy et al. |
| 2014/0046777 A1 | 2/2014 | Markey et al. |
| 2014/0052431 A1 | 2/2014 | Engel et al. |
| 2014/0058755 A1 | 2/2014 | Macoviak et al. |
| 2014/0072955 A1 | 3/2014 | Callahan et al. |
| 2014/0079297 A1 | 3/2014 | Tadayon et al. |
| 2014/0081895 A1 | 3/2014 | Coenen et al. |
| 2014/0089001 A1 | 3/2014 | Macoviak et al. |
| 2014/0089241 A1 | 3/2014 | Hoffberg et al. |
| 2014/0094935 A1 | 4/2014 | Ogawa et al. |
| 2014/0094999 A1 | 4/2014 | Petroff |
| 2014/0097979 A1 | 4/2014 | Nohara et al. |
| 2014/0100674 A1 | 4/2014 | Cheng et al. |
| 2014/0100777 A1 | 4/2014 | Petroff |
| 2014/0100835 A1 | 4/2014 | Majumdar et al. |
| 2014/0100912 A1 | 4/2014 | Bursey |
| 2014/0103128 A1 | 4/2014 | Patel et al. |
| 2014/0113600 A1 | 4/2014 | El Gamal et al. |
| 2014/0115008 A1 | 4/2014 | Stivoric et al. |
| 2014/0115100 A1 | 4/2014 | Changuel et al. |
| 2014/0122386 A1 | 5/2014 | Nahum et al. |
| 2014/0122395 A1 | 5/2014 | Nahum et al. |
| 2014/0122496 A1 | 5/2014 | Stivoric et al. |
| 2014/0122536 A1 | 5/2014 | Stivoric et al. |
| 2014/0122537 A1 | 5/2014 | Stivoric et al. |
| 2014/0123906 A1 | 5/2014 | Conger et al. |
| 2014/0129715 A1 | 5/2014 | Mortazavi |
| 2014/0132425 A1 | 5/2014 | Buckel |
| 2014/0148923 A1 | 5/2014 | Yamada et al. |
| 2014/0156031 A1 | 6/2014 | Anderson et al. |
| 2014/0156698 A1 | 6/2014 | Stivoric et al. |
| 2014/0173452 A1 | 6/2014 | Hoffberg et al. |
| 2014/0180018 A1 | 6/2014 | Stivoric et al. |
| 2014/0180024 A1 | 6/2014 | Stivoric et al. |
| 2014/0180025 A1 | 6/2014 | Stivoric et al. |
| 2014/0180598 A1 | 6/2014 | Stivoric et al. |
| 2014/0180720 A1 | 6/2014 | Stivoric et al. |
| 2014/0180993 A1 | 6/2014 | Stivoric et al. |
| 2014/0181108 A1 | 6/2014 | Stivoric et al. |
| 2014/0187872 A1 | 7/2014 | Stivoric et al. |
| 2014/0187873 A1 | 7/2014 | Stivoric et al. |
| 2014/0188874 A1 | 7/2014 | Stivoric et al. |
| 2014/0195475 A1 | 7/2014 | Levchuk et al. |
| 2014/0201018 A1 | 7/2014 | Chassin |
| 2014/0201111 A1 | 7/2014 | Kasravi et al. |
| 2014/0201126 A1 | 7/2014 | Zadeh et al. |
| 2014/0213854 A1 | 7/2014 | Stivoric et al. |
| 2014/0213938 A1 | 7/2014 | Stivoric et al. |
| 2014/0214552 A1 | 7/2014 | Stivoric et al. |
| 2014/0214836 A1 | 7/2014 | Stivoric et al. |
| 2014/0214873 A1 | 7/2014 | Stivoric et al. |
| 2014/0214874 A1 | 7/2014 | Stivoric et al. |
| 2014/0214903 A1 | 7/2014 | Stivoric et al. |
| 2014/0220525 A1 | 8/2014 | Stivoric et al. |
| 2014/0221730 A1 | 8/2014 | Stivoric et al. |
| 2014/0221773 A1 | 8/2014 | Stivoric et al. |
| 2014/0221775 A1 | 8/2014 | Stivoric et al. |
| 2014/0221776 A1 | 8/2014 | Stivoric et al. |
| 2014/0222728 A1 | 8/2014 | Vasseur et al. |
| 2014/0222732 A1 | 8/2014 | Stivoric et al. |
| 2014/0222733 A1 | 8/2014 | Stivoric et al. |
| 2014/0222734 A1 | 8/2014 | Stivoric et al. |
| 2014/0222735 A1 | 8/2014 | Stivoric et al. |
| 2014/0222739 A1 | 8/2014 | Ponulak |
| 2014/0222804 A1 | 8/2014 | Stivoric et al. |
| 2014/0222847 A1 | 8/2014 | Stivoric et al. |
| 2014/0222848 A1 | 8/2014 | Stivoric et al. |
| 2014/0222849 A1 | 8/2014 | Stivoric et al. |
| 2014/0222850 A1 | 8/2014 | Stivoric et al. |
| 2014/0222851 A1 | 8/2014 | Stivoric et al. |
| 2014/0223562 A1 | 8/2014 | Liu |

(56) References Cited

U.S. PATENT DOCUMENTS

| | | |
|---|---|---|
| 2014/0229022 A1 | 8/2014 | Deivasigamani et al. |
| 2014/0231666 A1 | 8/2014 | Akima et al. |
| 2014/0235474 A1 | 8/2014 | Tang et al. |
| 2014/0257528 A1 | 9/2014 | Perez et al. |
| 2014/0257577 A1 | 9/2014 | Prange et al. |
| 2014/0260692 A1 | 9/2014 | Sharp |
| 2014/0265927 A1 | 9/2014 | Mohan et al. |
| 2014/0277718 A1 | 9/2014 | Izhikevich et al. |
| 2014/0277735 A1 | 9/2014 | Breazeal |
| 2014/0277744 A1 | 9/2014 | Coenen |
| 2014/0277765 A1 | 9/2014 | Karimi et al. |
| 2014/0282458 A1 | 9/2014 | Gupta |
| 2014/0303789 A1 | 10/2014 | Wroblewski et al. |
| 2014/0308636 A1 | 10/2014 | Stivoric et al. |
| 2014/0308639 A1 | 10/2014 | Stivoric et al. |
| 2014/0309939 A1 | 10/2014 | Stivoric et al. |
| 2014/0309940 A1 | 10/2014 | Stivoric et al. |
| 2014/0310105 A1 | 10/2014 | Stivoric et al. |
| 2014/0310223 A1 | 10/2014 | Stivoric et al. |
| 2014/0310274 A1 | 10/2014 | Stivoric et al. |
| 2014/0310275 A1 | 10/2014 | Stivoric et al. |
| 2014/0310276 A1 | 10/2014 | Stivoric et al. |
| 2014/0310284 A1 | 10/2014 | Stivoric et al. |
| 2014/0310294 A1 | 10/2014 | Stivoric et al. |
| 2014/0310295 A1 | 10/2014 | Stivoric et al. |
| 2014/0310296 A1 | 10/2014 | Stivoric et al. |
| 2014/0310297 A1 | 10/2014 | Stivoric et al. |
| 2014/0310298 A1 | 10/2014 | Stivoric et al. |
| 2014/0316585 A1 | 10/2014 | Boesveld et al. |
| 2014/0316885 A1 | 10/2014 | Stivoric et al. |
| 2014/0317039 A1 | 10/2014 | Stivoric et al. |
| 2014/0317042 A1 | 10/2014 | Stivoric et al. |
| 2014/0317119 A1 | 10/2014 | Stivoric et al. |
| 2014/0317135 A1 | 10/2014 | Stivoric et al. |
| 2014/0324395 A1 | 10/2014 | Silverman et al. |
| 2014/0330554 A1 | 11/2014 | Williams |
| 2014/0330763 A1 | 11/2014 | Hunt et al. |
| 2014/0336539 A1 | 11/2014 | Torres et al. |
| 2014/0337002 A1 | 11/2014 | Manto |
| 2014/0344282 A1 | 11/2014 | Stivoric et al. |
| 2014/0358284 A1 | 12/2014 | Laurent et al. |
| 2014/0371907 A1 | 12/2014 | Passot et al. |
| 2014/0371912 A1 | 12/2014 | Passot et al. |
| 2015/0005937 A1 | 1/2015 | Ponulak |
| 2015/0019024 A1 | 1/2015 | Sabripour |
| 2015/0019241 A1 | 1/2015 | Bennett et al. |
| 2015/0019458 A1 | 1/2015 | Dorai et al. |
| 2015/0032258 A1 | 1/2015 | Passot et al. |
| 2015/0052092 A1 | 2/2015 | Tang et al. |
| 2015/0058265 A1 | 2/2015 | Padala et al. |
| 2015/0060037 A1 | 3/2015 | Norrell et al. |
| 2015/0088786 A1 | 3/2015 | Anandhakrishnan |
| 2015/0094850 A1 | 4/2015 | Passot et al. |
| 2015/0094852 A1 | 4/2015 | Laurent et al. |
| 2015/0100530 A1 | 4/2015 | Mnih et al. |
| 2015/0102945 A1 | 4/2015 | El-Tantawy et al. |
| 2015/0106306 A1 | 4/2015 | Birdwell et al. |
| 2015/0106310 A1 | 4/2015 | Birdwell et al. |
| 2015/0106311 A1 | 4/2015 | Birdwell et al. |
| 2015/0106314 A1 | 4/2015 | Birdwell et al. |
| 2015/0106315 A1 | 4/2015 | Birdwell et al. |
| 2015/0106316 A1 | 4/2015 | Birdwell et al. |
| 2015/0116808 A1 | 4/2015 | Branda et al. |
| 2015/0127149 A1 | 5/2015 | Sinyavskiy et al. |
| 2015/0127150 A1 | 5/2015 | Ponulak et al. |
| 2015/0130631 A1 | 5/2015 | Patel et al. |
| 2015/0133043 A1 | 5/2015 | Patel et al. |
| 2015/0142466 A1 | 5/2015 | Macoviak et al. |
| 2015/0148953 A1 | 5/2015 | Laurent et al. |
| 2015/0154952 A1 | 6/2015 | Williams |
| 2015/0158368 A1 | 6/2015 | Herr-Rathke et al. |
| 2015/0167999 A1 | 6/2015 | Seem et al. |
| 2015/0186799 A1 | 7/2015 | Dasgupta et al. |
| 2015/0222121 A1 | 8/2015 | Kuttel et al. |
| 2015/0226343 A1 | 8/2015 | Jenks |
| 2015/0241856 A1 | 8/2015 | Walser et al. |
| 2015/0242946 A1 | 8/2015 | Powell et al. |
| 2015/0258679 A1 | 9/2015 | Izhikevich et al. |
| 2015/0258682 A1 | 9/2015 | Izikevich et al. |
| 2015/0258683 A1 | 9/2015 | Izhikevich et al. |
| 2015/0278725 A1 | 10/2015 | Mizuta et al. |
| 2015/0278735 A1 | 10/2015 | Mizuta et al. |
| 2015/0283701 A1 | 10/2015 | Izhikevich et al. |
| 2015/0283702 A1 | 10/2015 | Izhikevich et al. |
| 2015/0283703 A1 | 10/2015 | Izhikevich et al. |
| 2015/0294226 A1 | 10/2015 | Mizuta et al. |
| 2015/0294350 A1 | 10/2015 | Mizuta et al. |
| 2015/0301510 A1 | 10/2015 | Dull et al. |
| 2015/0306761 A1 | 10/2015 | O'Connor et al. |
| 2015/0310068 A1 | 10/2015 | Pickens et al. |
| 2015/0314454 A1 | 11/2015 | Breazeal et al. |
| 2015/0316282 A1 | 11/2015 | Stone et al. |
| 2015/0317582 A1 | 11/2015 | Nath et al. |
| 2015/0323427 A1 | 11/2015 | Sharp |
| 2016/0148251 A1* | 5/2016 | Thomas ............... G06N 20/00 705/14.43 |

OTHER PUBLICATIONS

Wright, Robert William, Xingye Qiao, Lei Yu, and Steven Loscalzo. "CFQI: Fitted Q-Iteration with Complex Returns." In AAMAS, pp. 163-170. 2015. (Year: 2015).*

* cited by examiner

APPROXIMATE VALUE ITERATION WITH COMPLEX RETURNS BY BOUNDING

CROSS REFERENCE TO RELATE APPLICATIONS

The present application is Continuation of U.S. patent application Ser. No. 15/359,122, filed Nov. 22, 2016, now U.S. Pat. No. 10,839,302, issued Nov. 17, 2020, which is a Non-provisional of, and claims benefit of priority from, U.S. Provisional Patent Application No. 62/259,911, filed Nov. 25, 2015, and U.S. Provisional Patent Application No. 62/259,563, filed Nov. 24, 2015, each of which is expressly incorporated herein by reference in its entirety.

STATEMENT OF GOVERNMENT SUPPORT

This invention was made with government support under FA8750-13-2-0116 awarded by the U.S. Air Force. The government has certain rights in the invention.

BACKGROUND OF THE INVENTION

Reinforcement Learning

Reinforcement learning (RL) is a form of machine learning [Michell 1997] that solves sequential decision making problems through feedback that comes in the form of a reward signal. RL agents are provided with, or given the ability to collect, experiences interacting with a problem domain. These experiences are labeled with rewards that describe the relative value of the events that occurred. From these rewards RL agents learn to optimize their behavior. Unlike classical supervised learning methods [Mitchell 1997], RL agents do not need to be explicitly told what correct and incorrect behaviors are. Instead they learn to self-optimize their behavior in order to maximize the long term expected value. This ability to self-optimize makes RL suitable for learning and adapting to novel and dynamic scenarios, a key component for any robust autonomous system.

RL problems can be elegantly described within the context of Markov Decision Processes (MDP) [Puterman 2009]. An MDP, M, is defined as a 5-tuple, M=(S,A,P,$\mathcal{R}$,γ), where:

S is a fully observable finite set of states,

A is a finite set of possible actions,

P is the state transition model such that P(s'|s,a)∈[0,1] describes the probability of transitioning to state s' after taking action a in state s, $\mathcal{R}_{s,s'}^a$ is the expected value of the immediate reward r after taking a in s, resulting in s', and γ∈(0,1) is the discount factor on future rewards.

A Markov Decision Process is a discrete time stochastic control process. At each time step, the process is in some state s, and the decision maker may choose any action a that is available in state s. The process responds at the next time step by randomly moving into a new state s', and giving the decision maker a corresponding reward $R_a(s,s')$. The probability that the process moves into its new state s' is influenced by the chosen action. Specifically, it is given by the state transition function $P_a(s,s')$. Thus, the next state s' depends on the current state s and the decision maker's action a. But given s and a, it is conditionally independent of all previous states and actions; in other words, the state transitions of an MDP process satisfies the Markov property. Markov decision processes are an extension of Markov chains; the difference is the addition of actions (allowing choice) and rewards (giving motivation). Conversely, if only one action exists for each state and all rewards are the same (e.g., zero), a Markov decision process reduces to a Markov chain. See en.wikipedia.org/wiki/Markov_decision_process.

The core problem of MDPs is to find a "policy" for the decision maker: a function 7 that specifies the action π(s) that the decision maker will choose when in state s. Note that once a Markov decision process is combined with a policy in this way, this fixes the action for each state and the resulting combination behaves like a Markov chain.

The goal is to choose a policy π that will maximize some cumulative function of the random rewards, typically the expected discounted sum over a potentially infinite horizon:

$$\sum_{t=0}^{\infty} \gamma^t R_{a_t}(s_t, s_{t+1})$$

(where we choose $a_t=\pi(s_t)$)

where γ is the discount factor and satisfies 0≤γ≤1. (For example, γ=1/(1+r) when the discount rate is r.) γ is typically close to 1. Because of the Markov property, the optimal policy for this particular problem can indeed be written as a function of s only, as assumed above.

MDPs can be solved by linear programming or dynamic programming. Below, the dynamic programming alternate is discussed in depth.

In a typical case, the state transition function P and the reward function R are known, the policy that maximizes the expected discounted reward is to be calculated. The standard family of algorithms to calculate this optimal policy requires storage for two arrays indexed by state: value V, which contains real values, and policy π which contains actions. At the end of the algorithm, π will contain the solution and V(s) will contain the discounted sum of the rewards to be earned (on average) by following that solution from state s. The typical algorithm has the following two kinds of steps, which are repeated in some order for all the states until no further changes take place. They are defined recursively as follows:

$$\pi(s) := \operatorname{argmax}\left\{\sum_{s'} P_a(s, s')(R_a(s, s') + \gamma V(s'))\right\}$$

$$V(s) := \sum_{s'} P_{\pi_s}(s, s')(R_{\pi(s)}(s, s') + \gamma V(s'))$$

Their order depends on the variant of the algorithm; one can also do them for all states $a_t$ once or state by state, and more often to some states than others. As long as no state is permanently excluded from either of the steps, the algorithm will eventually arrive at the correct solution.

In value iteration [Bellman 1957], which is also called backward induction, the π function is not used; instead, the value of π(s) is calculated within V(s) whenever it is needed. Substituting the calculation of π(s) into the calculation of V(s) gives the combined step:

$$V_{i+1}(s) := \max_a\left\{\sum_{s'} P_a(s, s')(R_a(s, s') + \gamma V(s'))\right\}$$

where i is the iteration number. Value iteration starts at i=0 and $V_0$ as a guess of the value function. It then iterates, repeatedly computing $V_{i+1}$ for all states s, until V converges with the left-hand side equal to the right-hand side (which is the "Bellman equation" for this problem).

In policy iteration [Howard 1960], step one is performed once, and then step two is repeated until it converges. Then step one is again performed once and so on. Instead of repeating step two to convergence, it may be formulated and solved as a set of linear equations. This variant has the advantage that there is a definite stopping condition: when the array π does not change in the course of applying step 1 to all states, the algorithm is completed. In modified policy iteration [van Nunen, 1976; Puterman 1978], step one is performed once, and then step two is repeated several times. Then step one is again performed once and so on.

In prioritized sweeping, the steps are preferentially applied to states which are in some way important—whether based on the algorithm (there were large changes in V or π around those states recently) or based on use (those states are near the starting state, or otherwise of interest to the person or program using the algorithm).

The solution above assumes that the state s is known when action is to be taken; otherwise π(s) cannot be calculated. When this assumption is not true, the problem is called a partially observable Markov decision process or POMDP.

Burnetas and Katehakis [Burnetas 1997] discuss a class of adaptive policies that possess uniformly maximum convergence rate properties for the total expected finite horizon reward, which were constructed under the assumptions of finite state-action spaces and irreducibility of the transition law. These policies prescribe that the choice of actions, at each state and time period, should be based on indices that are inflations of the right-hand side of the estimated average reward optimality equations.

If the probabilities or rewards are unknown, the problem is one of reinforcement learning [Sutton and Barto, 1998]. For this purpose, it is useful to define a further function, which corresponds to taking the action a and then continuing optimally (or according to whatever policy one currently has):

$$Q(s, a) = \sum_{s'} P_a(s, s')(R_a(s, s') + \gamma V(s'))$$

While this function is also unknown, experience during learning is based on (s,a) pairs (together with the outcome s'); that is, "I was in state s and I tried doing a and s' happened"). Thus, one has an array Q and uses experience to update it directly. This is known as Q-learning. See, https://en.wikipedia.org/wiki/Q-learning.

Reinforcement learning can solve Markov decision processes without explicit specification of the transition probabilities; the values of the transition probabilities are needed in value and policy iteration. In reinforcement learning, instead of explicit specification of the transition probabilities, the transition probabilities are accessed through a simulator that is typically restarted many times from a uniformly random initial state. Reinforcement learning can also be combined with function approximation to address problems with a very large number of states.

Thus, a proposed solution to a MDP comes in the form of a policy, π(s). Policies, π:S↦A, are functions that prescribe which action to take given a particular state, π(s)=a. Given a policy, the value of any individual state-action pair in M can be inferred. The value of a state-action pair while following π, is given by its Q-value, $Q_\pi(s, a)$, which is defined as:

$$Q_\pi(s, a) = \mathbb{E}_\pi\left[\sum_{i=0}^{\infty} \gamma^j r_{i+1} \mid s_0 = s, a_0 = a\right]$$

where $r_{i+1}$ is the immediate reward given at time i+1.

The overall objective is to derive an optimal policy, π*, that maximizes the expected long term discounted value for any state-action pair in M. In order to derive π*, value based RL approaches attempt to learn an approximation of the optimal Q-function, Q*, which is defined as the solution to the optimal Bellman equation, $$Q^*(s, a) = \sum_{s' \in S} P(s' \mid s, a)[\mathcal{R}^a_{s,s'} + \gamma \max_{a' \in A} Q^*(s', a')] \quad (1)$$

From this equation π* can be extracted as π*(s)=arg $\max_{a \in A} Q^*(s, a)$.

In the RL setting P and $\mathcal{R}$ are unknown and is learned from samples. Samples are atomic observations of transitions taken from the domain. They are represented by tuples, $(s_t, a_t, s_{t+1}, r_{t+1})$, consisting of a state $s_t$, an action $a_t$, the state $s_{t+1}$ transitioned to by taking $a_t$ in $s_t$, and $r_{t+1}$, the immediate reward for that transition. Samples are often collected as episodic sequences known as trajectories. Each trajectory, T, is a sequentially ordered collection of observations where, $T[(s_0,a_0,s_1,r_1),(s_1,a_1,s_2,r_2), \ldots ]$.

If P and $\mathcal{R}$ are known, Q* can be solved for efficiently using dynamic programming. However, in RL scenarios P and $\mathcal{R}$ are unknown and Q* is approximated from samples. Samples are single-step observations of the effects of taking actions in the domain. They are represented by tuples, $(s_t,a_t,s_{t+1},r_{t+1})$, consisting of a state $s_t$, an action $a_t$, the state $s_{t+1}$ transitioned to by taking at in $s_t$, and $r_{t+1}$, the immediate reward for that transition.

Approximate Value Iteration

Approximate Value Iteration (AVI) is a popular framework for solving Reinforcement Learning (RL) problems for deriving optimal value functions from samples of experience, and which combines classical value iteration with function approximation [Gordon 1995, Munos 2005]. It is sample-efficient and because it is an off-policy approach it can make effective use of all available samples. Samples are most commonly collected in sequences known as trajectories. Most AVI methods do not take full advantage of the sequential relationship between samples within a trajectory in deriving value estimates, due to the challenges in dealing with the inherent bias and variance in the n-step returns.

Approaches based upon AVI solve RL problems by iteratively updating the estimated values of samples, based upon an approximate value function. The approximate value function model is then updated using the sample data and estimated values using a regression technique. The accuracy of the method's sample value estimates determines the final quality of the value function approximation and the overall success of the approach.

At the heart of AVI is its 1-step backup update function which makes use of the Bellman optimality equation [Sutton 1998]. This update function does not consider the sequential relationship between samples that can be used to improve value estimation. Samples in RL domains are most commonly collected in episodic sequences known as trajectories. Given multi-sample trajectories, the idea behind the 1-step return has been extended by Temporal Difference (TD) [Sutton 1998] to produce the n-step return estimates which may be subject to different variance and bias than the 1-step return depending on the learning contexts.

Approximate Value Iteration (AVI) derives $\hat{Q}$, an approximation of $Q^*$, from a fixed finite set of samples. Provided an initial estimate of $Q^*$ called $\hat{Q}_0$, in iteration m, AVI arrives at $\hat{Q}_m$ by employing the 1-step backup operator (called $R^{(1)}$) (For conciseness of notation, the subscript t is omitted where there is no confusion), over the provided samples and the previous estimate $\hat{Q}_{m-1}$:

$$\hat{Q}_m(s_t, a_t) \leftarrow R_t^{(1)} = r_{t+1} + \lambda \max_{a \in A} \hat{Q}_{m-1}(s_{t+1}, a), \quad (2)$$

$R_t^{(1)}$ combines the 1-step observed immediate reward with a greedy choice among all bootstrapped estimates of future returns as approximated by $\hat{Q}_{m-1}$. Note that Eq. (2) differs from the 1-step return definition used by TD methods [Sutton 1998] by application of the max operator to guide action selection.

Function approximation is used to provide generalization over limited training samples in any non-trivial domain where state-action spaces cannot be explicitly represented. Approximation necessarily introduces errors into the AVI process since the state-action function is now attempting to represent the value of possibly infinitely many points with a model described by a constant number of parameters. By varying the model's parameterization or the sample set used in the approximation, each sample's $R_t^{(1)}$ can be viewed as a random variable with its own bias and variance as compared to the true 1-step return.

See (each of which is expressly incoorporated herein by reference in its entirety): US Patent Application Nos. 20080140379; 20050273298; 20040236557; 20040205394; and U.S. Pat. No. 8,612,106.

On-Policy and Off-Policy Approaches

Value function based RL approaches can be classified as being either off-policy or on-policy. The distinction between the two classes of approaches has to do with the relationship between the sources of the sample data and the policy being learned. Sample data is generated by making observations following what is known as a behavior policy, $\pi_b$. The policy that is being learned is commonly referred to as the target policy, $\pi_t$.

On-policy methods assume that both the target and behavior policies are one in the same, $\pi_t = \pi_b$. Examples of such methods include the popular algorithms SARSA [Sutton 1998] and LSTD [Boyan 2002]. On-policy methods are effective in on-line learning scenarios and actor-critic frameworks and have robust theoretical convergence properties [Sutton 1998]. However, these methods are limited in that they can only learn from samples generated by the target policy and cannot take advantage of samples generated by other sources.

Conversely, off-policy methods can learn from samples generated by any arbitrary policy. In off-policy contexts the target and behavior policies are not necessarily the same, $\pi_t \neq \pi_b$. Examples of off-policy RL algorithms include Q-learning [Watkins 1992], LSPI [Lagoudakis 2003], and GTD [Sutton 2009]. From a sample efficiency and scalability standpoint, off-policy approaches are more desirable because they can effectively utilize more of the available samples.

The ability to learn from off-policy samples does come with a cost. Only under fairly restrictive assumptions are off-policy methods guaranteed to converge upon $Q^*$ [Gordon 1995, Lagoudakis 2003]. Unfortunately, under more realistic assumptions, when paired with function approximation and/or limited sampling, many off-policy methods have been shown to have divergent behavior [Boyan 2002]. Conversely, on-policy methods do not suffer from this issue. Notwithstanding this limitation, the advantage of utilizing samples gathered arbitrarily is so great that overcoming this issue has been the subject of intense study [Sutton 2009, Gordon 1995, Ormoneit 2002, Lagoudakis 2003].

See (each of which is expressly incoorporated herein by reference in its entirety): U.S. Pat. Nos. 8,793,381; 8,682,677; 8,433,578; 7,837,543; 7,174,354; 20150310068; 20150100530; 20130346614; 20130238333; 20110131048; 20050245303; 20040073764; 9,156,165; 9,152,915; 9,146,546; 9,134,707; 9,129,337; 9,105,077; 9,104,186; 9,087,359; 9,082,079; 9,073,701; 9,053,545; 9,026,473; 9,015,092; 9,008,914; 9,008,840; 8,996,177; 8,990,133; 8,976,041; 8,943,008; 8,924,024; 8,914,300; 8,874,440; 8,819,523; 8,793,557; 8,788,415; 8,774,923; 8,762,304; 8,639,392; 8,612,107; 8,608,480; 8,560,657; 8,554,706; 8,484,146; 8,447,431; 8,422,444; 8,417,360; 8,396,550; 8,340,789; 8,260,441; 8,214,062; 8,212,688; 8,209,040; 8,135,653; 8,041,661; 7,977,852; 7,966,276; 7,881,830; 7,849,033; 7,827,124; 7,734,471; 7,707,131; 7,539,748; 7,539,549; 7,458,342; 7,386,522; 7,321,882; 7,308,322; 7,080,055; 7,043,462; 7,013,201; 6,882,992; 6,850,171; 6,792,336; 6,736,089; 6,708,160; 6,611,823; 6,581,048; 6,532,454; 6,529,887; 6,192,354; 6,169,981; 6,038,556; 5,946,673; 5,832,466; 5,802,506; 5,677,609; 5,608,843; 5,504,839; 5,475,795; 5,175,798; and US Patent App. Nos. 20150316282; 20150306761; 20150301510; 20150283703; 20150283702; 20150283701; 20150258683; 20150258682; 20150258679; 20150148953; 20150127150; 20150127149; 20150106316; 20150106315; 20150106314; 20150106311; 20150106310; 20150106306; 20150094852; 20150094850; 20150032258; 20150005937; 20140371912; 20140371907; 20140358284; 20140330763; 20140277765; 20140277744; 20140277718; 20140235474; 20140132425; 20140081895; 20140032459; 20140032458; 20140025613; 20130341159; 20130325776; 20130325775; 20130325774; 20130325773; 20130325768; 20130262353; 20130245831; 20130223724; 20130184838; 20130178953; 20130178952; 20130080641; 20120296658; 20120296656; 20120166375; 20120107921; 20120065746; 20120016435; 20110246409; 20110213435; 20100268533; 20100257866; 20100112533; 20100082142; 20090327172; 20090322561; 20090306866; 20090248175; 20090225677; 20090132095; 20090127976; 20090062961; 20080269955; 20080168016; 20080091628; 20070198444; 20070094187; 20070016265; 20060253296; 20060224535; 20060206337; 20060155660; 20060121616; 20040244729; 20040228277; 20040015933; and 20030063016.

Policy Iteration

Policy iteration is a family of value function-based approaches that iteratively interleave phases of policy evaluation with policy improvement [Sutton 1998]. Rather than attempting to derive $Q^*$ directly, as is done in value iteration, policy iteration methods incrementally make refinements to a policy until it converges upon $\pi^*$ in the limit. It starts with an arbitrary base policy, $\pi$. In the policy evaluation phase, samples gathered following $\pi$ are used by an on-policy algorithm to derive its value function, $Q_\pi$. Then, in the policy improvement phase, $Q_\pi$ is used to calculate the improved policy, $\pi'$, by identifying any states where $\pi$ took a sub-optimal action, $\pi(s_t) \neq \arg\max_{a \in A} Q_\pi(s_t,a)$. The process is then repeated for $\pi'$ and it is guaranteed to asymptotically converge upon $Q^*$ and $\pi^*$ [Kaelbling 1996].

Policy iteration methods are typically more sample efficient than direct policy search methods, but less so than value iteration methods. Samples gathered for the evaluation phase of one policy are usually discarded and not considered during the evaluation of subsequent policies, because they are at that point off-policy samples. Importance sampling methods [Precup 2001] have been adapted to enable the limited reuse of the off-policy samples for policy evaluation. However, this process is still limited to using samples that were gathered in previous iterations and assumes that more samples from the current policy can be obtained.

See (each of which is expressly incorporated herein by reference in its entirety): US Patent App. Nos. 20150019458; 20140277744; 20140115100; 20140052431; 20130262353; 20130238333; 20120303412; 20120010913; 20110131048; 20110019693; 20100205974; 20090306866; 20090177521; 20090012922; 20080249844; 20070203871; 20050071223; 20040015386; 20020198854; and U.S. Pat. Nos. 9,134,707; 8,996,177; 8,682,677; 8,612,107; 8,468,041; 8,447,706; 8,433,578; 8,285,581; 8,250,014; 8,126,765; 8,001,063; 7,403,904; 7,239,962; 6,917,925; 5,608,843.

Value Iteration

Value iteration, in contrast, searches for $Q^*$ directly rather than deriving intermediate Q-functions of sub-optimal policies [Sutton 1998]. It derives $Q^*$ through iterative applications of the Bellman operator over all samples [Boyan 2002]:

$$Q(s_t, a_t) \leftarrow r_{t+1} + \gamma \max_{a' \in A} Q'(s_{t+1}, a') \quad (3)$$

This operator assigns the value for a given state-action pair, $Q(s_t,a_t)$, as equal to the value of the immediate reward, $r_{t+1}$, plus the discounted maximum value for the next state, $\gamma\max_{a' \in A} Q_\pi(s_{t+1},a')$, given the prior approximation of $Q^*$, $Q'$. Value iteration converges to $Q^*$ asymptotically under infinite sampling assumptions and the use of Q-tables [Sutton 1998]. However, value iteration with function approximation has been shown to have unstable convergence with arbitrary regression models [Boyan 1995. Convergence can be guaranteed with specific forms of function approximation such as kernel based averagers [Gordon 1995, Ormoneit 2002]. Compared with other RL approaches value iteration methods can be very sample efficient because all available samples are reused at each iteration.

See (each of which is expressly incorporated herein by reference in its entirety): U.S. Pat. Nos. 5,608,843; 6,917,925; 7,239,962; 7,403,904; 8,001,063; 8,126,765; 8,250,014; 8,285,581; 8,433,578; 8,447,706; 8,468,041; 8,612,107; 8,682,677; 8,996,177; 9,134,707; and US Patent App. Nos. 20020198854; 20040015386; 20050071223; 20070203871; 20080249844; 20090012922; 20090177521; 20090306866; 20100205974; 20110019693; 20110131048; 20120010913; 20120303412; 20130238333; 20130262353; 20140052431; 20140115100; 20140277744; 20150019458.

Direct Policy Search

Learning value functions is not the only way to solve RL problems. In fact, deriving an arbitrarily accurate approximation of the optimal value function does not guarantee learning the optimal policy [Lagoudakis 2003]. As an alternative, policy search methods forego value functions entirely and search the policy space directly for improving policies [Baxter 2001]. Policy search methods encode policies as a parameterized function, $\pi_\theta$ where $\theta \in \mathbb{R}^n$ [Kormushev 2012], and search over the parametric space for improving policies. In this framework, each candidate policy, $\pi_\theta$, is evaluated independently through simulation to determine their relative quality. The parameters, $\theta$, of the candidates are then tuned based upon their performances. This process is repeated until a policy of desired quality emerges.

There are two general types of policy search algorithms: genetic policy search [Gomez 2006] and gradient policy search [Riedmiller 2007]. In general, policy search methods perform better than value function methods on poorly defined or represented problems [Kalyanakrishnan 2009]. However, they are also highly sample inefficient because each candidate policy needs to be evaluated individually over the entire problem space. Further, all the samples generated by the candidate policies are ignored or discarded rather than being used to train future policies or for other purposes.

See (each of which is expressly incorporated herein by reference in its entirety): U.S. Pat. Nos. 8,326,780; 8,612,107; 8,775,341; 8,818,925; 8,909,571; 9,015,093; 9,053,431; 9,105,077; and US Patent App. Nos. 20130178952; 20130178953; 20130223724; 20130318023; 20130325764.

Approximate Modified Policy Iteration

The Approximate Modified Policy Iteration method (Scherrer et al. 2012) uses n-step roll-outs for the purpose of improving sample value estimates. However, this approach, as the name suggests, is part of a policy iteration process and is not comparable to a value iteration based method.

See (each of which is expressly incorporated herein by reference in its entirety):

Scherrer, Bruno, et al. "Approximate modified policy iteration." arXiv preprint arXiv:1205.3054 (2012).

Farahmand, Amir-Massoud, et al. "CAPI: Generalized classification-based approximate policy iteration." *Multidisciplinary Conference on Reinforcement Learning and Decision Making*. Vol. 1. 2013.

Lesner, Boris, and Bruno Scherrer. "Tight performance bounds for approximate modified policy iteration with non-stationary policies." arXiv preprint arXiv:1304.5610 (2013).

Raghavan, Aswin, et al. "Symbolic opportunistic policy iteration for factored-action MDPs." *Advances in Neural Information Processing Systems*. 2013.

Scherrer, Bruno, and Matthieu Geist. "Local Policy Search in a Convex Space and Conservative Policy Iteration as Boosted Policy Search." *Machine Learning and Knowledge Discovery in Databases. Springer Berlin Heidelberg*, 2014. 35-50.

Scherrer, Bruno, and Matthieu Geist. "Policy Search: Any Local Optimum Enjoys a Global Performance Guarantee." arXiv preprint arXiv: 1306.1520 (2013).

Yu, Huizhen, and Dimitri P. Bertsekas. *Weighted Bellman Equations and their Applications in Approximate Dynamic Programming*. LIDS technical report 2876, MIT, Cambridge, Mass., 2012.

Scherrer, Bruno. "On the performance bounds of some policy search dynamic programming algorithms." arXiv preprint arXiv:1306.0539 (2013).

Scherrer, Bruno. "Non-Stationary Approximate Modified Policy Iteration."

Iteration, Non-Stationary Approximate Modified Policy. "Supplementary Material for Non-Stationary Approximate Modified Policy Iteration."

U.S. Pat. Nos. 8,954,319; 8,930,116; 8,860,602; 8,793,119; 8,655,822; 8,644,990; 8,612,107; 8,583,284; 8,504,504; 8,452,639; 8,359,226; 8,285,581; 8,250,014; 8,126,765; 8,024,611; 8,001,063; 7,966,276; 7,672,739; 7,519,553; 7,403,904; 7,239,962; 6,513,022; 5,608,843; US Patent Appl. Nos. 20150242946; 20150154952; 20150100530; 20150019458; 20140330554; 20140223562; 20140195475; 20140097979; 20130103490; 20120010913; 20110215903; 20110019693; 20110016067; 20110010164; 20100262286; 20100082513; 20090312985; 20090306866; 20090299496; 20090177521; 20090012922; 20080275800; 20080249844; 20080243439; 20080177621; 20070260346; 20070203871; 20070174105; 20040015386; 20030204368.

Fitted Q-Iteration

Fitted Q-Iteration (FQI) is a widely used approximate value iteration (AVI) framework for solving reinforcement learning (RL) problems [Ernst 2005]. Since its introduction FQI has been utilized and extended by numerous others [Riedmiller 2005, Kalyanakrishnan 2007, Antos 2007, Nouri 2008]. FQI's most compelling feature is its ability to learn effectively from varied sources of off-policy sample data. In a multi-agent context, this is analogous to learning from the aggregate experiences of heterogeneous agents solving a given problem. Most other RL methods make restrictive assumptions on sample data rendering such collections of data useless. In many realistic learning situations, where simulation is impractical and obtaining samples is difficult and costly, it is critically important to be able to utilize all available data. FQI provides a means to utilize all available data to learn an approximation of the optimal policy.

FQI [Ernst 2005] is a batch-mode, off-line, off-policy approach for solving RL problems. It is an approximate value iteration [Munos 2005] framework that solves directly for Q* through a sequence of standard supervised learning regression problems. As a batch-mode algorithm it makes efficient use of samples. It has also been proven that, under restrictive assumptions of the regression model, FQI is guaranteed to converge towards Q* [Ormoneit 2002].

Although FQI can utilize off-policy sample data effectively, it does not exploit this data to the fullest extent. The key operation of FQI, and its derivatives, is its Q-value update function which makes use of the greedy 1-step Temporal Difference (TD) return [Sutton 1998]. This 1-step update treats each sample as an independent event and relies completely on bootstrapped value estimates. These bootstrapped estimates can have significant error due the use of function approximation and irregularly distributed sample sets. Samples, however, are not typically gathered as single step experiences and they are not independent of each other. Instead they are gathered as multi-step experiences known as trajectories and share sequential relationships that can be exploited to reduce this error.

FQI starts with an arbitrarily initalized approximation of $Q^*$, $\hat{Q}_0$. This approximation of $Q^*$ is then refined through an iterative process. In this process the estimated Q-values of each sample are calculated using the current $\hat{Q}$ approximation. These values are then used as target values for a regression algorithm that "fits" them with their corresponding sample state and action features producing the next approximation, $\hat{Q}_i$). The process is repeated for M iterations or until some other stopping criteria.

A crucial component of this process is how the sample value estimates are calculated. The accuracy of these estimates dictates the final accuracy of $\hat{Q}_I$ and in turn the quality of the derived policy. For this purpose, FQI uses the greedy 1-step return estimate, $R_t^{(1)}$:

$$\hat{Q}_i(s_t, a_t) \leftarrow R_t^{(1)} = r_{t+1} + \gamma \max_{a \in A} \hat{Q}_{m-1}(s_{t+1}, a), \quad (4)$$

which combines the single-step observed immediate reward with a greedy choice among all bootstrapped estimates of future returns provided by $\hat{Q}_{i-1}$. $R_t^{(1)}$ is a reasonable choice for a value estimator as it is unbiased with regard to the sampling policies. However, it is not the only choice and it is very sensitive to error caused by biases and variances in an imperfect function approximation model and irregular sample distributions.

Trajectories

Trajectory data has been utilized to great effect in on-policy and policy iteration RL contexts through the use of complex returns [Sutton 1998, Konidaris 2011, Hachiya 2009, Geist 2014]. Complex returns are a weighted average of the n-step returns, value estimates made by looking further forward down the trajectory than just one step. Through careful design, the aggregated value estimates produced by complex returns have low variance and are generally more accurate than 1-step return estimates. Despite this advantage and the general availability of trajectory data, complex returns have not been considered in an AVI context. There are two primary reasons why complex returns have not been used for AVI. First, off-policy trajectories introduce bias into complex return estimates. The other is that the target policy being learned is an optimal policy and generally is unknown, making it impossible to apply importance sampling to mitigate off-policy biases [Precup 2001].

See (each of which is expressly incorporated herein by reference in its entirety): U.S. Pat. No. 8,494,980 and US Patent App. No. 20100241243.

Complex Returns

Complex returns have been applied with success in other off-policy learning contexts with importance sampling [Precup 2001, Hachiya 2009, Geist 2014]. This method takes advantage of prior knowledge of both the behavior policy ($\pi_b$), the policy that generated the trajectory, and the target policy ($\pi_t$), the policy being learned, both of which are assumed to have non-zero action selection probabilities. It uses prior knowledge of both the behavior policy ($\pi_b$) and the target policy ($\pi_t$) to weight each return of a complex backup to reduce the bias of the individual $R_t^{(n)}$ returns. This idea is well motivated for the policy evaluation phase of a policy iteration approach where the target policy is known and likely non-deterministic given exploration. However, in the value iteration context, $\pi_t$ is always $\pi^*$, and is unknown, making importance sampling inapplicable.

See (each of which is expressly incorporated herein by reference in its entirety):

Albus, J. S. A theory of cerebellar functions. Mathematical Biosciences 10 (1971), 25-61.

Ammar, H., Tuyls, K., Taylor, M., Driessens, K., and Weiss, G. Reinforcement learning transfer via sparse coding. In Proceedings of the 11th International Conference on Autonomous Agents and Multiagent Systems-Volume 1 (2012), International Foundation for Autonomous Agents and Multiagent Systems, pp. 383-390.

Antos, A, C. Szepesvari, and R. Munos. Fitted q-iteration in continuous action-space mdps. In J. Platt, D. Koller, Y. Singer, and S. Roweis, editors, Advances in Neural Information Processing Systems 20, pages 9-16. 2007.

Argall, B., Chernova, S., Veloso, M., and Browning, B. A survey of robot learning from demonstration. Robotics and Autonomous Systems 57, 5 (2009), 469-483.

Babes, Monica, et al. "Apprenticeship learning about multiple intentions." Proceedings of the 28th International Conference on Machine Learning (ICML-11). 2011.

Bagnell, J. Andrew, et al. "Policy search by dynamic programming." Advances in neural information processing systems. 2003.

Barto, A., and R. H. Crites. "Improving elevator performance using reinforcement learning." Advances in neural information processing systems 8 (1996): 1017-1023.

Barto, Andy G., and Satinder P. Singh. "On the computational economics of reinforcement learning." Connectionist Models: Proceedings of the 1990 Summer School. Morgan Kaufmann. San Diego, Calif.: Citeseer, 1990.

Barto, Michael T. Rosenstein Andrew G. "J. 4 Supervised Actor-Critic Reinforcement Learning." Handbook of learning and approximate dynamic programming 2 (2004): 359.

Baxter, J., Bartlett, P. L., and Weaver, L. Experiments with infinite-horizon, policy-gradient estimation. J. Artif. Intell. Res. (JAIR) 15 (2001), 351-381.

Bellman, R., A Markovian Decision Process. Journal of Mathematics and Mechanics 6, 1957.

Bertsekas, D. P., and Tsitsiklis, J. N. Neuro-Dynamic Programming (Optimization and Neural Computation Series, 3). Athena Scientific, May 1996.

Bertsekas, Dimitri P., and John N. Tsitsiklis. "Neuro-dynamic programming: an overview." Decision and Control, 1995., Proceedings of the 34th IEEE Conference on. Vol. 1. IEEE, 1995.

Botvinick, Matthew M., Yael Niv, and Andrew C. Barto. "Hierarchically organized behavior and its neural foundations: A reinforcement learning perspective." Cognition 113.3 (2009): 262-280.

Boyan, J. A., and Moore, A. W. Generalization in reinforcement learning: Safely approximating the value function. In Advances in Neural Information Processing Systems 7 (1995), MIT Press, pp. 369-376.

Boyan, J. Technical update: Least-squares temporal difference learning. Machine Learning 49, 2 (2002), 233-246.

Boyan, Justin, and Andrew W. Moore. "Learning evaluation functions to improve optimization by local search." The Journal of Machine Learning Research 1 (2001): 77-112.

Brochu, Eric, Vlad M. Cora, and Nando De Freitas. "A tutorial on Bayesian optimization of expensive cost functions, with application to active user modeling and hierarchical reinforcement learning." arXiv preprint arXiv:1012.2599 (2010).

Burnetas, A. N.; Katehakis, M. N. (1997). "Optimal Adaptive Policies for Markov Decision Processes". Mathematics of Operations Research 22: 222. doi:10.1287/moor.22.1.222

Castelletti, A., Galelli, S., Restelli, M., and Soncini-Sessa, R. Tree-based variable selection for dimensionality reduction of large-scale control systems. In Adaptive Dynamic Programming And Reinforcement Learning (ADPRL), 2011 IEEE Symposium on (2011), IEEE, pp. 62-69.

Chandramohan, Senthilkumar, et al. "User simulation in dialogue systems using inverse reinforcement learning." Interspeech 2011. 2011.

Chapman, D., and Kaelbling, L. Input generalization in delayed reinforcement learning: An algorithm and performance comparisons. In Proceedings of the Twelfth International Joint Conference on Artificial Intelligence (1991), pp. 726-731.

Cheng, Weiwei, et al. "Preference-based policy iteration: Leveraging preference learning for reinforcement learning." Machine Learning and Knowledge Discovery in Databases. Springer Berlin Heidelberg, 2011. 312-327.

Cobo, L. C., Zang, P., Isbell Jr, C. L., and Thomaz, A. L. Automatic state abstraction from demonstration. In IJCAI Proceedings-International Joint Conference on Artificial Intelligence (2011), vol. 22, p. 1243.

Cuayáhuitl, Heriberto. "Hierarchical reinforcement learning for spoken dialogue systems." Dissertation. (2009).

Cuayáhuitl, Heriberto, Steve Renals, Oliver Lemon, and Hiroshi Shimodaira. "Evaluation of a hierarchical reinforcement learning spoken dialogue system." Computer Speech & Language 24, no. 2 (2010): 395-429.

Dahm, W. Technology horizons: A vision for air force science and technology during 2010-2030, 2010.

Deisenroth, Marc, and Carl E. Rasmussen. "PILCO: A model-based and data-efficient approach to policy search." Proceedings of the 28th International Conference on machine learning (ICML-11). 2011.

Dietterich, Thomas G. "The MAXQ Method for Hierarchical Reinforcement Learning." In ICML, pp. 118-126. 1998.

Dietterich, T. G. Hierarchical reinforcement learning with the maxq value function decomposition. Journal of Artificial Intelligence Research 13 (1999), 227-303.

Dietterich, T. G., Ensemble methods in machine learning. In Multiple classier systems, pages 1-15. Springer, 2000.

Doya, Kenji. "Reinforcement learning in continuous time and space." Neural computation 12.1 (2000): 219-245.

Džroski, Sašo, Luc De Raedt, and Hendrik Blockeel. Relational reinforcement learning. Springer Berlin Heidelberg, 1998.

Efron, B., Hastie, T., Johnstone, I., and Tibshirani, R. Least angle regression. The Annals of statistics 32, 2 (2004), 407-499.

Engel, Yaakov, Shie Mannor, and Ron Meir. "Reinforcement learning with Gaussian processes." Proceedings of the 22nd international conference on Machine learning. ACM, pp. 201-208. 2005.

Ernst, D.; Geurts, P.; Wehenkel, L.; and Littman, L. 2005. Tree-based batch mode reinforcement learning. Journal of Machine Learning Research 6:503-556. (2005)

Ernst, Damien, et al. "Reinforcement learning versus model predictive control: a comparison on a power system problem." Systems, Man, and Cybernetics, Part B: Cybernetics, IEEE Transactions on 39.2 (2009): 517-529.

Farahmand, A., Ghavamzadeh, M., Szepesva'ri, C., and Mannor, S. Regularized fitted q-iteration for planning in continuous-space markovian decision problems. In American Control Conference, 2009. ACC'09. (2009), IEEE, pp. 725-730.

Fern, Alan, Sung Wook Yoon, and Robert Givan. "Approximate Policy Iteration with a Policy Language Bias." NIPS. 2003.

Fürnkranz, Johannes, et al. "Preference-based reinforcement learning: a formal framework and a policy iteration algorithm." Machine learning 89.1-2 (2012): 123-156.

Geibel, Peter, and Fritz Wysotzki. "Risk-Sensitive Reinforcement Learning Applied to Control under Constraints." J. Artif. Intell. Res. (JAIR) 24 (2005): 81-108.

Geist, M. and B. Scherrer. Off-policy learning with eligibility traces: A survey. J. Mach. Learn. Res., 15(1):289-333, January 2014.

Getoor, Lise. *Introduction to statistical relational learning.* MIT press, 2007.

Girgin, S., and Preux, P. Basis expansion in natural actor critic methods. Recent Advances in Reinforcement Learning (2008), 110-123.

Goel, Sandeep, and Manfred Huber. "Subgoal discovery for hierarchical reinforcement learning using learned policies." FLAIRS conference. 2003.

Gomez, F. J., Schmidhuber, J., and Miikkulainen, R. Efficient non-linear control through neuroevolution. In ECML (2006), pp. 654-662.

Gordon, G. J. Approximate solutions to markov decision processes. Robotics Institute, page 228, 1999.

Gordon, G. J. Stable function approximation in dynamic programming. Tech. rep., DTIC Document, 1995.

Gosavi, Abhijit. "Reinforcement learning: A tutorial survey and recent advances." INFORMS Journal on Computing 21.2 (2009): 178-192.

Guyon, I., and Elisseeff, A. An introduction to variable and feature selection. J. Mach. Learn. Res. 3 (2003), 1157-1182.

Hachiya, H., T. Akiyama, M. Sugiayma, and J. Peters. Adaptive importance sampling for value function approximation in o-policy reinforcement learning. Neural Networks, 22(10):1399-1410, 2009.

Howard, Ronald A., Dynamic Programming and Markov Processes, The M.I.T. Press, 1960.

Ijspeert, Auke Jan, Jun Nakanishi, and Stefan Schaal. Learning attractor landscapes for learning motor primitives. No. BIOROB-CONF-2002-004. 2002.

James, D., and Tucker, P. A comparative analysis of simplification and complexification in the evolution of neural network topologies. In Proceedings of the 2004 Conference on Genetic and Evolutionary Computation (2004), GECCO-2004.

Johns, J., Painter-Wakefield, C., and Parr, R. Linear complementarity for regularized policy evaluation and improvement. Advances in Neural Information Processing Systems 23 (2010), 1009-1017.

Judah, Kshitij, et al. "Reinforcement Learning Via Practice and Critique Advice." AAAI. 2010.

Kaelbling, Leslie Pack, Michael L. Littman, and Andrew W. Moore. "Reinforcement learning: A survey." Journal of artificial intelligence research (1996): 237-285.

Kakade, S. M., et al. On the sample complexity of reinforcement learning. PhD thesis, University of London, 2003.

Kakade, Sham, and John Langford. "Approximately optimal approximate reinforcement learning." ICML. Vol. 2. 2002.

Kalyanakrishnan, S. and P. Stone. Batch reinforcement learning in a complex domain. In Proceedings of the 6th international joint conference on Autonomous agents and multiagent systems, page 94. ACM, 2007.

Kalyanakrishnan, S., and Stone, P. An empirical analysis of value function-based and policy search reinforcement learning. In Proceedings of The 8th International Conference on Autonomous Agents and Multiagent Systems-Volume 2 (2009), International Foundation for Autonomous Agents and Multiagent Systems, pp. 749-756.

Keller, P., Mannor, S., and Precup, D. Automatic basis function construction for approximate dynamic programming and reinforcement learning. In Proceedings of the 23rd international conference on Machine learning (2006), ACM, pp. 449-456.

Kim, H. J., et al. "Autonomous helicopter flight via reinforcement learning." Advances in neural information processing systems. 2003.

Kimura, Hajime, Kazuteru Miyazaki, and Shigenobu Kobayashi. "Reinforcement learning in POMDPs with function approximation." ICML. Vol. 97. 1997.

Ko, Jonathan, et al. "Gaussian processes and reinforcement learning for identification and control of an autonomous blimp." Robotics and Automation, 2007 IEEE International Conference on. IEEE, 2007.

Kohl, Nate, and Peter Stone. "Policy gradient reinforcement learning for fast quadrupedal locomotion." Robotics and Automation, 2004. Proceedings. ICRA'04. 2004 IEEE International Conference on. Vol. 3. IEEE, 2004.

Kollar, Thomas, and Nicholas Roy. "Trajectory optimization using reinforcement learning for map exploration." The International Journal of Robotics Research 27.2 (2008): 175-196.

Kolter, J., and Ng, A. Regularization and feature selection in least-squares temporal difference learning. In Proceedings of the 26th Annual International Conference on Machine Learning (2009), ACM, pp. 521-528.

Konidaris, G., and Barto, A. Efficient skill learning using abstraction selection. In Proceedings of the Twenty First International Joint Conference on Artificial Intelligence (2009), pp. 1107-1112.

Konidaris, G., Kaelbling, L. P., and Lozano-Perez, T. Constructing symbolic representations for high-level planning.

Konidaris, George, and Andrew G. Barto. "Building Portable Options: Skill Transfer in Reinforcement Learning." In IJCAI, vol. 7, pp. 895-900. 2007.

Konidaris, G., S. Osentoski, and P. Thomas. Value function approximation in reinforcement learning using the Fourier basis. In Proceedings of the Twenty-Fifth Conference on Articial Intelligence, pages 380-385, August 2011.

Konidaris, G.; Niekum, S.; and Thomas, P. S. 2011. Tdλ: Re-evaluating complex backups in temporal difference learning. In Advances in Neural Information Processing Systems, 2402-2410. (2011)

Konidaris, George, and Andre S. Barreto. "Skill discovery in continuous reinforcement learning domains using skill chaining." Advances in Neural Information Processing Systems. 2009.

Kormushev, P., and Caldwell, D. G. Direct policy search reinforcement learning based on particle filtering. In Proceedings of the 10th European Workshop on Reinforcement Learning (2012).

Kretchmar, R., and Anderson, C. Comparison of CMACs and radial basis functions for local function approximators in reinforcement learning. In Neural Networks, 1997., International Conference on (2002), vol. 2, IEEE, pp. 834-837.

Lagoudakis, M. G. and R. Parr. Least-squares policy iteration. Journal of Machine Learning Research, 4:2003, 2003.

Lange, Sascha, and Martin Riedmiller. "Deep auto-encoder neural networks in reinforcement learning." In Neural Networks (IJCNN), The 2010 International Joint Conference on, pp. 1-8. IEEE, 2010.

Lange, Stanislav, Martin Riedmiller, and Arne Voigtlander. "Autonomous reinforcement learning on raw visual input data in a real world application." In Neural Networks (IJCNN), The 2012 International Joint Conference on, pp. 1-8. IEEE, 2012.

Lewis, Frank L., and Draguna Vrabie. "Reinforcement learning and adaptive dynamic programming for feedback control." Circuits and Systems Magazine, IEEE 9.3 (2009): 32-50.

Li, Lihong, Michael L. Littman, and Christopher R. Mansley. "Online exploration in least-squares policy iteration." In AAMAS (2), pp. 733-739. 2009.

Li, L., Littman, M. L., Walsh, T. J., and Strehl, A. L. Knows what it knows: a framework for self-aware learning. Machine learning 82, 3 (2011), 399-443.

Li, L., Walsh, T. J., and Littman, M. L. Towards a unified theory of state abstraction for mdps. In Proceedings of the Ninth International Symposium on Artificial Intelligence and Mathematics (2006), pp. 531-539.

Lin, Chin-Teng, and Ming-Chih Kan. "Adaptive fuzzy command acquisition with reinforcement learning." Fuzzy Systems, IEEE Transactions on 6.1 (1998): 102-121.

Lin, Long-Ji. "Self-improving reactive agents based on reinforcement learning, planning and teaching." Machine learning 8.3-4 (1992): 293-321.

Lin, Long-Ji. Reinforcement learning for robots using neural networks. No. CMU-CS-93-103. Carnegie-Mellon Univ Pittsburgh Pa. School of Computer Science, 1993.

Lin, S., and Wright, R. Evolutionary tile coding: An automated state abstraction algorithm for reinforcement learning. In Abstraction, Reformulation, and Approximation (2010).

Liu, H., and Yu, L. Toward integrating feature selection algorithms for classification and clustering. IEEE Trans. on Knowl. and Data Eng. 17, 4 (2005), 491-502.

Lizotte, D. J., Bowling, M., and Murphy, S. A. Linear fitted-q iteration with multiple reward functions. The Journal of Machine Learning Research 13, 1 (2012), 3253-3295.

Lopes, M., Melo, F., and Montesano, L. Active learning for reward estimation in inverse reinforcement learning. In Machine Learning and Knowledge Discovery in Databases. Springer, 2009, pp. 31-46.

Loscalzo, S., and Wright, R. Automatic state space aggregation using a density based technique. In ICAART 2011—Proceedings of the 3rd International Conference on Agents and Artificial Intelligence, Volume 1—Artificial Intelligence, Rome, Italy, Jan. 28-30, 2011 (2011), pp. 249-256.

Loscalzo, S., Wright, R., Acunto, K., and Yu, L. Progressive mining of transition dynamics for autonomous control. In Data Mining, 2012. ICDM 2012. Thirteenth IEEE International Conference on (2012), IEEE, pp. 43-52.

Loscalzo, S., Wright, R., Acunto, K., and Yu, L. Sample aware embedded feature selection for reinforcement learning. In Proceedings of the fourteenth international conference on Genetic and evolutionary computation conference (2012), ACM, pp. 887-894.

Loscalzo, S., Wright, R., and Yu, L. Predictive feature selection for genetic policy search. Autonomous Agents and Multi-Agent Systems (2014), 1-33.

Mahadevan, S. Proto-value functions: Developmental reinforcement learning. In Proceedings of the 22nd international conference on Machine learning (2005), ACM, pp. 553-560.

Mahadevan, S. Representation discovery in sequential decision making. In Proceedings of the Twenty-Fourth AAAI Conference on Artificial Intelligence (2010), AAAI Press.

Mariano, Carlos E., and Eduardo F. Morales. "Distributed reinforcement learning for multiple objective optimization problems." Evolutionary Computation, 2000. Proceedings of the 2000 Congress on. Vol. 1. IEEE, 2000.

Marthi, Bhaskara, et al. "Concurrent Hierarchical Reinforcement Learning." IJCAI. 2005.

Martinez-Cantin, Ruben, et al. "Active Policy Learning for Robot Planning and Exploration under Uncertainty." Robotics: Science and Systems. 2007.

McCallum, A., et al. Learning to use selective attention and short-term memory in sequential tasks. From Animals to Animats 4 (1996), 315-324.

McGovern, Amy, and Andrew G. Barto. "Automatic discovery of subgoals in reinforcement learning using diverse density." Computer Science Department Faculty Publication Series (2001): 8.

Melo, Francisco S., Sean P. Meyn, and M. Isabel Ribeiro. "An analysis of reinforcement learning with function approximation." Proceedings of the 25th international conference on Machine learning. ACM, 2008.

Merke, Artur, and Martin Riedmiller. "Karlsruhe brainstormers-A reinforcement learning approach to robotic soccer." RoboCup 2001: Robot Soccer World Cup V. Springer Berlin Heidelberg, 2002. 435-440.

Meuleau, Nicolas, Leonid Peshkin, and Kee-Eung Kim. "Exploration in gradient-based reinforcement learning." (2001).

Mitchell, T. M. Machine Learning. McGraw-Hill, New York, 1997.

Munos, R. Error bounds for approximate value iteration. In Proceedings of the 20th national conference on Articial intelligence—Volume 2, AAAI'05, pages 1006-1011. AAAI Press, 2005.

Neu, Gergely, and Csaba Szepesvári. "Apprenticeship learning using inverse reinforcement learning and gradient methods." arXiv preprint arXiv:1206.5264 (2012).

Ng, A., Coates, A., Diel, M., Ganapathi, V., Schulte, J., Tse, B., Berger, E., and Liang, E. Autonomous inverted helicopter flight via reinforcement learning. Experimental Robotics IX (2006), 363-372.

Ng, Andrew Y., and Stuart J. Russell. "Algorithms for inverse reinforcement learning." Icml. 2000.

Nouri, A., and Littman, M. L. Multi-resolution exploration in continuous spaces. In Advances in neural information processing systems (2008), pp. 1209-1216.

Ormoneit. D. and S. Sen. Kernel-based reinforcement learning. Machine learning, 49(2-3):161-178, 2002.

Van Otterlo, Martijn. "A survey of reinforcement learning in relational domains." (2005).

Painter-Wakefield, C., and Parr, R. Greedy algorithms for sparse reinforcement learning. In Proceedings of the 29th Annual International Conference on Machine Learning (2012).

Parr, R., Painter-Wakefield, C., Li, L., and Littman, M. Analyzing feature generation for value-function approximation. In Proceedings of the 24th international conference on Machine learning (2007), ACM, pp. 737-744.

Pastor, Peter, et al. "Skill learning and task outcome prediction for manipulation." Robotics and Automation (ICRA), 2011 IEEE International Conference on. IEEE, 2011.

Peng, H., Long, F., and Ding, C. Feature selection based on mutual information criteria of max-dependency, max-relevance, and min-redundancy. Pattern Analysis and Machine Intelligence, IEEE Transactions on 27, 8 (2005), 1226-1238.

Peters, Jan, Sethu Vijayakumar, and Stefan Schaal. "Reinforcement learning for humanoid robotics." Proceedings of the third IEEE-RAS international conference on humanoid robots. 2003.

Petrik, M., Taylor, G., Parr, R., and Zilberstein, S. Feature selection using regularization in approximate linear programs for markov decision processes. arXiv preprint arXiv:1005.1860 (2010).

Ponsen, M., Taylor, M., and Tuyls, K. Abstraction and generalization in reinforcement learning: A summary and framework. Adaptive and Learning Agents (2010), 1-32.

Precup, D. 2000. Eligibility traces for off-policy policy evaluation. Computer Science Department Faculty Publication Series 80.

Precup, D., Sutton, R. S., and Dasgupta, S. Off-policy temporal-difference learning with function approximation. In ICML (2001), pp. 417-424.

Precup, D., Sutton, R., and Singh, S. Theoretical results on reinforcement learning with temporally abstract options. Machine Learning: ECML-98 (1998), 382-393.

Price, Bob, and Craig Boutilier. "Implicit imitation in multiagent reinforcement learning." ICML. 1999.

Puterman, M. L. Markov decision processes: discrete stochastic dynamic programming, volume 414. Wiley-Interscience, 2009.

Puterman, M. L., and Shin M. C. Modified Policy Iteration Algorithms for Discounted Markov Decision Problems, Management Science 24, 1978.

Ramachandran, Deepak, and Eyal Amir. "Bayesian inverse reinforcement learning." Urbana 51 (2007): 61801.

Rao, K., and Whiteson, S. V-max: tempered optimism for better pac reinforcement learning. In Proceedings of the 11th International Conference on Autonomous Agents and Multiagent Systems-Volume 1 (2012), International Foundation for Autonomous Agents and Multiagent Systems, pp. 375-382.

Ratliff, Nathan D., J. Andrew Bagnell, and Martin A. Zinkevich. "Maximum margin planning." Proceedings of the 23rd international conference on Machine learning. ACM, 2006.

Rawlik, Konrad, Marc Toussaint, and Sethu Vijayakumar. "On stochastic optimal control and reinforcement learning by approximate inference." Proceedings of the Twenty-Third international joint conference on Artificial Intelligence. AAAI Press, 2013.

Rennie, Jason, and Andrew McCallum. "Using reinforcement learning to spider the web efficiently." ICML. Vol. 99. 1999.

Riedmiller, M. Neural fitted Q iteration—first experiences with a data efficient neural reinforcement learning method. In Machine Learning: ECML 2005. Springer, 2005, pp. 317-328.

Riedmiller, M., Peters, J., and Schaal, S. Evaluation of policy gradient methods and variants on the cart-pole benchmark. In Approximate Dynamic Programming and Reinforcement Learning, 2007. ADPRL 2007. IEEE International Symposium on (2007), IEEE, pp. 254-261.

Santamaría, Juan C., Richard S. Sutton, and Ashwin Ram. "Experiments with reinforcement learning in problems with continuous state and action spaces." Adaptive behavior 6.2 (1997): 163-217.

Schaal, S. Learning from demonstration. In Advances in Neural Information Processing Systems 9 (1997), MIT Press.

Schaal, Stefan, Auke Ijspeert, and Aude Billard. "Computational approaches to motor learning by imitation." Philosophical Transactions of the Royal Society B: Biological Sciences 358.1431 (2003): 537-547.

Scherrer, B.; Gabillon, V.; Ghavamzadeh, M.; and Geist, M. 2012. Approximate modified policy iteration. In International Conference on Machine Learning.

Shapiro, Daniel, Pat Langley, and Ross Shachter. "Using background knowledge to speed reinforcement learning in physical agents." Proceedings of the fifth international conference on Autonomous agents. ACM, 2001.

Shelton, Christian Robert. "Importance sampling for reinforcement learning with multiple objectives." (2001).

Shi, Lei, et al. "Radar HRRP statistical recognition with local factor analysis by automatic Bayesian Ying-Yang harmony learning." Signal Processing, IEEE Transactions on 59.2 (2011): 610-617.

Singh, Satinder P. "Reinforcement learning with a hierarchy of abstract models." AAAI. 1992.

Singh, Satinder, et al. "Convergence results for single-step on-policy reinforcement-learning algorithms." Machine Learning 38.3 (2000): 287-308.

Singh, Satinder, et al. "Empirical evaluation of a reinforcement learning spoken dialogue system." AAAI/IAAI. 2000.

Stanley, K. O. and R. Miikkulainen. Evolving neural networks through augmenting topologies. Evolutionary Computation, 10(2):99-127, 2002.

Stanley, K. O. Efficient evolution of neural networks through complexification. PhD thesis, The University of Texas at Austin, 2004. Supervisor-Risto P. Miikkulainen.

Stanley, K. O., and Miikkulainen, R. Efficient reinforcement learning through evolving neural network topologies. In In Proceedings of the Genetic and Evolutionary Computation Conference (GECCO-2002 (2002), Morgan Kaufmann.

Stone, Peter, Richard S. Sutton, and Gregory Kuhlmann. "Reinforcement learning for robocup soccer keepaway." Adaptive Behavior 13.3 (2005): 165-188.

Strehl, A. L., Li, L., and Littman, M. L. Reinforcement learning in finite mdps: Pac analysis. The Journal of Machine Learning Research 10 (2009), 2413-2444.

Sutton, R. Generalization in reinforcement learning: Successful examples using sparse coarse coding. In Advances in Neural Information Processing Systems (1996), vol. 8, MIT Press, pp. 1038-1044.

Sutton, R. S., and Barto, A. G. Reinforcement Learning: An Introduction (Adaptive Computation and Machine Learning). The MIT Press, March 1998.

Sutton, R., Maei, H., Precup, D., Bhatnagar, S., Silver, D., Szepesvari, C., and Wiewiora, E. Fast gradient-descent methods for temporal-difference learning with linear function approximation. In Proceedings of the 26th International Conference on Machine Learning (Montreal, June 2009), L. Bottou and M. Littman, Eds., Omnipress, pp. 993-1000.

Sutton, Richard S. "Open theoretical questions in reinforcement learning." Computational Learning Theory. Springer Berlin Heidelberg, 1999.

Sutton, Richard S., Doina Precup, and Satinder Singh. "Between MDPs and semi-MDPs: A framework for temporal abstraction in reinforcement learning." Artificial intelligence 112.1 (1999): 181-211.

Sutton, Richard S., Hamid R. Maei, and Csaba Szepesvári. "A Convergent $O(n)$ Temporal-difference Algorithm for Off-policy Learning with Linear Function Approximation." Advances in neural information processing systems. 2009.

Tan, M., Hartley, M., Bister, M., and Deklerck, R. Automated feature selection in neuroevolution. Evolutionary Intelligence 1, 4 (2009), 271-292.

Tanner, B., and White, A. RL-Glue: Language-independent software for reinforcement-learning experiments. Journal of Machine Learning Research 10 (September 2009), 2133-2136.

Taylor, M. E., and Stone, P. Transfer learning for reinforcement learning domains: A survey. The Journal of Machine Learning Research 10 (2009), 1633-1685.

Tesauro, G. Temporal difference learning and td-gammon. Commun. ACM 38, 3 (1995), 58-68.

Thomas, Philip S., et al. "Policy Evaluation Using the Ω-Return." (2015)

Tibshirani, R. Regression shrinkage and selection via the lasso. Journal of the Royal Statistical Society. Series B (Methodological) (1996), 267-288.

Timmer, S., and Riedmiller, M. Fitted q iteration with cmacs. In Approximate Dynamic Programming and Reinforcement Learning, 2007. ADPRL 2007. IEEE International Symposium on (2007), IEEE, pp. 1-8.

Uchibe, Eiji, and Kenji Doya. "Competitive-cooperative-concurrent reinforcement learning with importance sampling." Proc. of International Conference on Simulation of Adaptive Behavior: From Animals and Animats. 2004.

Uther, W. T. B., and Veloso, M. M. Tree based discretization for continuous state space reinforcement learning. In AAAI '98/IAAI '98: Proceedings of the fifteenth national/tenth conference on Artificial intelligence/Innovative applications of artificial intelligence (Menlo Park, Calif., USA, 1998), American Association for Artificial Intelligence, pp. 769-774.

Valasek, John, Monish D. Tandale, and Jie Rong. "A reinforcement learning-adaptive control architecture for morphing." Journal of Aerospace Computing, Information, and Communication 2.4 (2005): 174-195.

van Nunen, J. A. E. E., A set of successive approximation methods for discounted Markovian decision problems. Z. Operations Research, 20:203-208, 1976.

Walker, Marilyn A. "An application of reinforcement learning to dialogue strategy selection in a spoken dialogue system for email." Journal of Artificial Intelligence Research (2000): 387-416.

Watkins, C. J. and P. Dayan. Q-learning. Machine learning, 8(3-4):279-292, 1992.

Watkins, C. J. Learning from Delayed Rewards. PhD thesis, King's College, Cambridge, UK, May 1989.

Wawrzynski, Pawel, and Andrzej Pacut. "Model-free off-policy reinforcement learning in continuous environment." Neural Networks, 2004. Proceedings. 2004 IEEE International Joint Conference on. Vol. 2. IEEE, 2004.

Whiteson, S., Stone, P., Stanley, K., Miikkulainen, R., and Kohl, N. Automatic feature selection in neuroevolution. In Proceedings of the 2005 conference on Genetic and evolutionary computation (2005), ACM, pp. 1225-1232.

Whiteson, S., Taylor, M. E., and Stone, P. Adaptive tile coding for value function approximation. Tech. rep., University of Texas at Austin, 2007.

Wiering, Marco A. "Explorations in efficient reinforcement learning." (1999).

Wright, R., and Gemelli, N. State aggregation for reinforcement learning using neuroevolution. In ICAART International Conference on Agents and Artificial Intelligence (2009).

Wright, R., Loscalzo, S., and Yu, L. Embedded incremental feature selection for reinforcement learning. In ICAART International Conference on Agents and Artificial Intelligence (2011).

Wright, R., Qiao, X., Loscalzo, S., and Yu, L. Approximate value iteration with complex returns as bounds. Under Review of the Journal of Machine Learning Research (2015).

Wright, R., S. Loscalzo, P. Dexter, and L. Yu. Exploiting multi-step sample trajectories for approximate value iteration. In Machine Learning and Knowledge Discovery in Databases, volume 8188, pages 113-128. Springer Berlin Heidelberg, 2013.

Wright, R., Xingye Qiao, Steven Loscalzo, and Lei Yu. CFQI: Fitted Q-Iteration with Complex Returns. In Proceedings of the Fourteenth International Conference on Autonomous Agents and Multiagent Systems (AAMAS-15), 163-170, 2015.

Wright, R., Xingye Qiao, Steven Loscalzo, and Lei Yu. Improving Approximate Value Iteration with Complex Returns by Bounding. In Proceedings of the Twenty-Ninth AAAI Conference on Artificial Intelligence (AAAI-15), 3087-3093, 2015

Wright, Robert "Scaling reinforcement learning through better representation and sample efficiency", Doctoral Dissertation, SUNY Binghamton, 2014.

Xu, Xin, Dewen Hu, and Xicheng Lu. "Kernel-based least squares policy iteration for reinforcement learning." Neural Networks, IEEE Transactions on 18.4 (2007): 973-992.

U.S. Pat. Nos. 4,665,549; 4,794,537; 5,175,798; 5,301,101; 5,355,305; 5,394,327; 5,444,820; 5,464,369; 5,475,795; 5,504,839; 5,506,768; 5,511,724; 5,550,752; 5,568,377; 5,579,993; 5,579,994; 5,608,843; 5,651,264; 5,677,609; 5,697,838; 5,740,324; 5,768,121; 5,769,314; 5,802,506; 5,822,740; 5,832,466; 5,875,108; 5,875,109; 5,901,246; 5,924,086; 5,946,673; 6,006,142; 6,033,302; 6,038,556; 6,041,264; 6,047,557; 6,081,750; 6,095,426; 6,119,125; 6,131,463; 6,160,892; 6,169,981; 6,192,354; 6,201,872; 6,219,590; 6,240,324; 6,250,560; 6,264,111; 6,295,363; 6,296,193; 6,393,852; 6,400,996; 6,405,103; 6,408,228; 6,408,635; 6,418,424; 6,427,454; 6,430,985; 6,438,974; 6,449,972; 6,454,178; 6,467,280; 6,467,282; 6,473,851; 6,499,305; 6,505,057; 6,505,475; 6,513,022; 6,529,887; 6,532,454; 6,581,048; 6,581,847; 6,611,823; 6,616,057; 6,640,145; 6,647,318; 6,651,895; 6,662,578; 6,662,583; 6,672,431; 6,679,072; 6,708,160; 6,726,111; 6,736,089; 6,775,377; 6,775,415; 6,792,336; 6,847,854; 6,850,171; 6,850,252; 6,865,562; 6,882,992; 6,906,434; 6,912,515; 6,917,925; 6,937,909; 6,950,534; 6,959,520; 6,987,331; 6,990,670; 7,006,881; 7,013,201; 7,014,015; 7,024,254; 7,024,336; 7,031,880; 7,043,462; 7,044,397; 7,050,873; 7,059,143; 7,079,904; 7,080,055; 7,086,240; 7,136,710; 7,143,016; 7,164,117; 7,174,354; 7,239,962; 7,243,945; 7,272,234; 7,295,119; 7,295,960; 7,308,322; 7,321,882; 7,343,016; 7,347,774; 7,386,522; 7,389,649; 7,403,904; 7,407,029; 7,415,126; 7,419,365; 7,451,005; 7,458,342; 7,460,690; 7,461,849; 7,475,828; 7,489,303; 7,505,877; 7,519,553; 7,533,536; 7,539,549; 7,539,748; 7,542,876; 7,546,210; 7,556,271; 7,577,108; 7,583,710; 7,599,759; 7,606,751; 7,611,157; 7,617,140; 7,619,647; 7,623,993; 7,628,409; 7,630,986; 7,654,098; 7,663,502; 7,668,340; 7,672,739; 7,707,131; 7,734,471; 7,740,234; 7,769,623; 7,797,062; 7,805,952; 7,813,822; 7,827,124; 7,827,813; 7,837,543; 7,839,275; 7,849,033; 7,853,645; 7,865,334; 7,881,830; 7,890,927; 7,904,187; 7,918,100; 7,936,732; 7,949,474; 7,966,078; 7,966,104; 7,966,276; 7,970,739;

7,974,714; 7,977,852; 7,979,293; 7,984,420; 7,987,003; 8,001,063; 8,010,252; 8,023,500; 8,024,611; 8,027,742; 8,028,272; 8,028,275; 8,031,060; 8,035,320; 8,041,661; 8,046,107; 8,046,313; 8,060,222; 8,086,352; 8,090,452; 8,096,140; 8,103,465; 8,126,574; 8,126,765; 8,127,060; 8,135,653; 8,147,302; 8,165,770; 8,165,916; 8,176,011; 8,200,344; 8,200,345; 8,209,040; 8,212,688; 8,214,062; 8,225,271; 8,229,579; 8,229,825; 8,234,146; 8,235,776; 8,250,014; 8,260,441; 8,260,655; 8,265,110; 8,275,635; 8,285,581; 8,301,406; 8,301,527; 8,316,926; 8,321,862; 8,326,464; 8,326,780; 8,327,653; 8,340,789; 8,356,760; 8,359,226; 8,364,136; 8,368,640; 8,369,967; 8,382,590; 8,396,550; 8,412,357; 8,417,360; 8,422,444; 8,424,328; 8,424,885; 8,428,755; 8,433,578; 8,447,431; 8,447,706; 8,452,639; 8,458,715; 8,463,441; 8,463,964; 8,468,041; 8,473,080; 8,478,433; 8,484,146; 8,494,980; 8,494,989; 8,495,888; 8,504,493; 8,504,504; 8,516,266; 8,527,108; 8,527,109; 8,538,184; 8,548,745; 8,554,706; 8,560,657; 8,567,204; 8,571,317; 8,583,263; 8,583,284; 8,594,813; 8,594,814; 8,608,480; 8,612,106; 8,612,107; 8,626,345; 8,626,565; 8,639,392; 8,644,990; 8,655,822; 8,661,136; 8,666,517; 8,674,544; 8,682,454; 8,682,677; 8,694,132; 8,694,409; 8,762,304; 8,762,379; 8,767,987; 8,774,923; 8,775,341; 8,781,608; 8,788,415; 8,793,119; 8,793,205; 8,793,381; 8,793,557; 8,805,598; 8,805,759; 8,816,752; 8,818,925; 8,819,523; 8,832,007; 8,845,795; 8,860,602; 8,873,813; 8,874,440; 8,874,477; 8,882,895; 8,897,563; 8,909,359; 8,909,571; 8,909,590; 8,914,300; 8,915,295; 8,918,223; 8,918,657; 8,924,024; 8,924,318; 8,930,115; 8,930,116; 8,943,008; 8,954,319; 8,965,597; 8,976,041; 8,987,959; 8,990,133; 8,996,141; 8,996,177; 9,002,483; 9,007,908; 9,008,840; 9,008,914; 9,015,092; 9,015,093; 9,021,462; 9,026,473; 9,053,431; 9,053,545; 9,056,368; 9,057,532; 9,063,551; 9,073,701; 9,081,760; 9,082,079; 9,087,359; 9,088,179; 9,090,255; 9,092,307; 9,104,186; 9,104,497; 9,105,077; 9,109,981; 9,110,647; 9,113,371; 9,120,365; 9,129,337; 9,134,707; 9,146,546; 9,152,915; 9,156,165; 9,172,738; 9,182,154; RE42006;

US Patent App. Nos. 20010002239; 20010042792; 20010045097; 20010049942; 20020014538; 20020105231; 20020112435; 20020116075; 20020151992; 20020178737; 20020184166; 20020184176; 20020198854; 20030061004; 20030063016; 20030074338; 20030084672; 20030089119; 20030094004; 20030153986; 20030160104; 20030171901; 20030204368; 20030209893; 20030219132; 20030221915; 20030230443; 20040015386; 20040015933; 20040029213; 20040037430; 20040073764; 20040117239; 20040123550; 20040123612; 20040129478; 20040143428; 20040161132; 20040205394; 20040215356; 20040228277; 20040236547; 20040236557; 20040244729; 20040246900; 20040262089; 20040267395; 20050017488; 20050046584; 20050071223; 20050083858; 20050156052; 20050245303; 20050273298; 20060013440; 20060064180; 20060105697; 20060111816; 20060121616; 20060155398; 20060155660; 20060158051; 20060192850; 20060200253; 20060200258; 20060200259; 20060200260; 20060206337; 20060208169; 20060208570; 20060224535; 20060234621; 20060247973; 20060253296; 20060271441; 20060288715; 20070016265; 20070016476; 20070022068; 20070022771; 20070053513; 20070061735; 20070070038; 20070082601; 20070087756; 20070094187; 20070114292; 20070145695; 20070145699; 20070147013; 20070151751; 20070151779; 20070152409; 20070174105; 20070178825; 20070181701; 20070198444; 20070203871; 20070256432; 20070260346; 20080037485; 20080051940; 20080091628; 20080140379; 20080140591; 20080154707; 20080168016; 20080177621; 20080179409; 20080211779; 20080243439; 20080249844; 20080265799; 20080269955; 20080275800; 20080318678; 20080319781; 20080319786; 20080319787; 20080319796; 20080319855; 20080320029; 20080320030; 20090005912; 20090006457; 20090006458; 20090012922; 20090062961; 20090074248; 20090088991; 20090089078; 20090093928; 20090099985; 20090116736; 20090116746; 20090116755; 20090116756; 20090116757; 20090119296; 20090127976; 20090132095; 20090157419; 20090177521; 20090204234; 20090204237; 20090204245; 20090204267; 20090210081; 20090225677; 20090248175; 20090254971; 20090276457; 20090285469; 20090299496; 20090306866; 20090312985; 20090322561; 20090327011; 20090327172; 20100010681; 20100023307; 20100030578; 20100044990; 20100057258; 20100058799; 20100076642; 20100082142; 20100082513; 20100106332; 20100106603; 20100106641; 20100107173; 20100110634; 20100112533; 20100114387; 20100137734; 20100145161; 20100182137; 20100205974; 20100241243; 20100242045; 20100250015; 20100257866; 20100262286; 20100268533; 20100306001; 20100324936; 20100327687; 20110010164; 20110016067; 20110019693; 20110022235; 20110029100; 20110037725; 20110040393; 20110043035; 20110082598; 20110099130; 20110131048; 20110142269; 20110148202; 20110156896; 20110167110; 20110168792; 20110190909; 20110213435; 20110215903; 20110216953; 20110219056; 20110231320; 20110246409; 20110249905; 20110251725; 20110252248; 20110255782; 20110255788; 20110255789; 20110255790; 20110255794; 20110257860; 20110258150; 20110258170; 20110258182; 20110258195; 20110278277; 20110284512; 20110302000; 20110316376; 20120002567; 20120010913; 20120013257; 20120016435; 20120027388; 20120030137; 20120036016; 20120041608; 20120065746; 20120072030; 20120072031; 20120072039; 20120085291; 20120107921; 20120125558; 20120150651; 20120166375; 20120209794; 20120221156; 20120235579; 20120253514; 20120253524; 20120260679; 20120278220; 20120278221; 20120296656; 20120296658; 20120303388; 20120303412; 20120323674; 20120324928; 20130013120; 20130016669; 20130024043; 20130043319; 20130054044; 20130066750; 20130073080; 20130080358; 20130080377; 20130080641; 20130096722; 20130097321; 20130097664; 20130103490; 20130131839; 20130151448; 20130151449; 20130151450; 20130173504; 20130178952; 20130178953; 20130184838; 20130185667; 20130186119; 20130197676; 20130213082; 20130215116;

20130218743; 20130218744; 20130223724;
20130228134; 20130238333; 20130245831;
20130249604; 20130250638; 20130254090;
20130262353; 20130269376; 20130284109;
20130309154; 20130318023; 20130319021;
20130319226; 20130325691; 20130325692;
20130325764; 20130325768; 20130325773;
20130325774; 20130325775; 20130325776;
20130341159; 20130346614; 20140012821;
20140018985; 20140025613; 20140032458;
20140032459; 20140046777; 20140052431;
20140058755; 20140072955; 20140079297;
20140081895; 20140089001; 20140089241;
20140094935; 20140094999; 20140097979;
20140100674; 20140100777; 20140100835;
20140100912; 20140103128; 20140113600;
20140115008; 20140115100; 20140122386;
20140122395; 20140122496; 20140122536;
20140122537; 20140123906; 20140129715;
20140132425; 20140148923; 20140156031;
20140156698; 20140173452; 20140180018;
20140180024; 20140180025; 20140180598;
20140180720; 20140180993; 20140181108;
20140187872; 20140187873; 20140188874;
20140195475; 20140201018; 20140201111;
20140201126; 20140213854; 20140213938;
20140214552; 20140214836; 20140214873;
20140214874; 20140214903; 20140220525;
20140221730; 20140221773; 20140221775;
20140221776; 20140222728; 20140222732;
20140222733; 20140222734; 20140222735;
20140222739; 20140222804; 20140222847;
20140222848; 20140222849; 20140222850;
20140222851; 20140223562; 20140229022;
20140231666; 20140235474; 20140257528;
20140257577; 20140260692; 20140265927;
20140277718; 20140277735; 20140277744;
20140277765; 20140282458; 20140303789;
20140308636; 20140308639; 20140309939;
20140309940; 20140310105; 20140310223;
20140310274; 20140310275; 20140310276;
20140310284; 20140310294; 20140310295;
20140310296; 20140310297; 20140310298;
20140316585; 20140316885; 20140317039;
20140317042; 20140317119; 20140317135;
20140324395; 20140330554; 20140330763;
20140336539; 20140337002; 20140344282;
20140358284; 20140371907; 20140371912;
20150005937; 20150019024; 20150019241;
20150019458; 20150032258; 20150052092;
20150058265; 20150060037; 20150088786;
20150094850; 20150094852; 20150100530;
20150102945; 20150106306; 20150106310;
20150106311; 20150106314; 20150106315;
20150106316; 20150116808; 20150127149;
20150127150; 20150130631; 20150133043;
20150142466; 20150148953; 20150154952;
20150158368; 20150167999; 20150186799;
20150222121; 20150226343; 20150241856;
20150242946; 20150258679; 20150258682;
20150258683; 20150278725; 20150278735;
20150283701; 20150283702; 20150283703;
20150294226; 20150294350; 20150301510;
20150306761; 20150310068; 20150314454;
20150316282; 20150317582; 20150323427.

List of Abbreviations

Acro—Acrobot
AVI—Approximate Value Iteration
CFQI—Complex Fitted Q-Iteration
CPB—Cart Pole Balance
FQI—Fitted Q-Iteration
GTD—Gradient Temporal Difference
LfD—Learning from Demonstration
LSPI—Least Squares Policy Iteration
LSTD—Least Squares Temporal Difference
LSTDQ—Least Squares Temporal Difference-Q
MC—Mountain Car
MDP—Markov Decision Process
MSE—Mean Squared Error
NEAT—NeuroEvolution of Augmenting Topologies
RL—Reinforcement Learning
SARSA—State Action Reward State Action
STD—Standard Deviation
TD—Temporal Difference
TFQI—Trajectory Fitted Q-Iteration
VI—Value Iteration

SUMMARY OF THE INVENTION

In on-policy learning settings, where the behavior policy follows the target policy, the idea of n-step returns has been exploited to great effect by the TD($\lambda$) family of algorithms, which utilize complex returns (weighted average of all n-step returns) in order to reduce variance and produce a more accurate value estimate than the 1-step return [Sutton 1998]. In off-policy learning settings where the behavior policy is different from the target policy, importance sampling has been employed to correct the off-policy bias in the n-step returns, and shown some successes in enabling effectiveness use of n-step returns for policy iteration methods.

Notwithstanding, there has been little progress in exploiting the n-step returns in value iteration methods. The main reason for this lies in the fact that in the value iteration framework, the target policy is always the optimal policy, and it is a challenging issue to deal with the off-policy bias of the n-step returns. The importance sampling method suitable for the policy iteration framework does not apply here, since it requires the prior knowledge of both the target policy and the behavior policy in order to decide the importance weight of the n-step returns, but such information is not available in the value iteration framework.

A bounding method is provided herein which uses a negatively biased, but relatively low variance complex return estimator to provide a lower bound on the value of the sample label obtained from the traditional one-step return. The method is motivated by a statistical observation that a biased estimator with relatively small variance can sometimes provide an effective bound on the value of another estimator to produce a better estimator than both.

The present technology exploits the off-policy bias down the trajectories, instead of trying to correct it as the importance sampling approach does. In addition, a new Bounded-FQI algorithm is provided, which efficiently incorporates the bounding method into an approximate value iteration framework. An empirical analysis of the present technology on a set of RL benchmarks demonstrates that the bounding method, along with the BFQI algorithm, produce more accurate value estimates than existing approaches, resulting in improved policies.

The present technology thus provides a bounding method which uses a negatively biased but relatively low variance estimator, generated by considering n-step returns along a trajectory, to provide a lower bound on the observed value of a traditional one-step return estimator. In addition, a new Bounded-FQI algorithm may be employed, which efficiently incorporates the bounding method into an approximate value iteration framework. Experiments show that the technology produces more accurate value estimates than existing approaches, resulting in improved policies.

The present technology may be used in adaptive control systems. Such control systems may employ robust autonomous agent technology that enables autonomous control of physical systems in highly complex, uncertain, and dynamic environments. The present technology may also be used in automated systems that are not involved in physical control. Typically, in a physical control paradigm, the trajectory is a change in a system state over time, with the inputs received from sensors. On the other hand, time-series data may be employed which does not represent physical changes over time, and may, for example, represent changes in human preferences or behavior patterns. Further, the trajectory need not be a time-trajectory, but rather a set of data that represents an ordered series of information with an express or implied underlying continuum or spectrum; that is, a mapping of a space wherein one or more of the spatial coordinates are quantitative. Typically, the trajectory is along a monotonically increasing variable, at least within the domain of interest, but this is not necessarily a required presumption for application of the technology.

Recent advances in autonomy technology have promoted the widespread emergence of autonomous systems in various domains such as domestic robots, self-driving vehicles, and financial management agents. Current autonomous systems, in general, are complex automated systems that are custom engineered for specific problems, and use hard coded control policies. Therefore, they are excessively expensive to build and incapable of dealing with highly uncertain and rapidly changing environments. Autonomous systems that can learn from experiences are able to adapt and are more robust to dynamic environments than automated systems.

In smart energy domains, such autonomous adaptive control systems include, but are not limited to, wind turbine control systems in wind farms, combined heat and power (CHP) control systems in microgrid, and smart thermostats in smart buildings. Other applications may include combustion systems and chemical reaction processes, such as internal combustion engines, turbines, boilers, and the like. For example, advanced combustion controllers can compensate for air pressure, humidity, existing pollutants in intake, fuel composition and quality, load, expected change in load, energy cost, process economics, safety margin, etc. In such cases, the control issue is to automatically learn the effect of changes in various independent (input) parameters on one or more dependent (output) parameters, in order to improve the control to achieve a higher quality based on a quality metric or constraint. In real-world systems, there are often time delays and interactions, intended or unintended feedback, as well as random or unmeasured or uncontrolled effects, making the control problem one of pragmatism rather than perfection. The control system according to the present technology therefore looks not only at the series of data which represents the input(s), but also a series of data representing the controlled performance of the system.

The present robust autonomy technology allows an autonomous agent to quickly learn and adapt control policies. Here, "quick" means using less time, which translates to less agent interactions with the environment and hence less experience data collected. Accordingly, the technology is efficient. Quicker improvement has some immediate benefits such as power increases or energy savings gained sooner. For example, 10 percent of reduction on energy consumption after 1 month of deployment of robust autonomous thermostat would be much more attractive than the same saving in 1 year. In the case of systems operating in dynamic environments, a more rapid adaptation may be the difference between successful and failed control. To the extent that data acquisition has a cost, the greater efficiency in use of that data may be the difference between cost effectiveness and a loss. Indeed, where the goal of the system is increasing efficiency, the difference in control efficiency can directly influence feasibility. In the case of model-based control, the system needs to observe exercise of the system over its operative range to infer its dynamic response, and thus create or populate the model. Genetic evolutionary algorithm-based systems do this by permuting the "best" inferred mode to determine whether the outcome can be improved. In a high dimensionality control problem in a dynamically changing environment, the result can be lack of convergence, with perpetually poor performance. Likewise, traditional auto-tuning controller technology may perpetually operate in a suboptimal regime.

Current control systems in the smart energy industry such as wind farms, CHP plants, and smart buildings, are complex automated systems that apply custom engineered, hard coded control policies developed based on extensive but incomplete knowledge of the systems. Such policies are excessively expensive to build and incapable of dealing with highly uncertain and rapidly changing environments. Consider the smart building domain as an example. To provide comfort and operate energy-efficiently, an automated controller, a smart thermostat, can use some heuristic policies to turn on and off heating/cooling devices ahead of time based on inhabitant patterns, weather conditions, and user preferences of comfort level and energy savings. Various additional factors such as characteristics of heating devices, thermal characteristics and surrounding environment of a building will affect the temperature pattern in a building. It is infeasible to tailor the control policy in advance for every building where a controller is to be installed. A robust autonomous controller would be able to quickly improve and adapt the initial policy while maintaining effective operations after a controller has been installed in its physical environment.

See (each of which is expressly incorporated herein by reference in its entirety): U.S. Pat. Nos. 4,665,549; 4,794,537; 5,301,101; 5,355,305; 5,394,327; 5,464,369; 5,506,768; 5,511,724; 5,550,752; 5,568,377; 5,579,993; 5,579,994; 5,651,264; 5,697,838; 5,740,324; 5,768,121; 5,769,314; 5,822,740; 5,875,108; 5,875,109; 5,901,246; 5,924,086; 6,006,142; 6,033,302; 6,041,264; 6,047,557; 6,081,750; 6,095,426; 6,119,125; 6,131,463; 6,160,892; 6,201,872; 6,219,590; 6,240,324; 6,250,560; 6,264,111; 6,295,363; 6,296,193; 6,393,852; 6,400,996; 6,405,103; 6,408,228; 6,408,635; 6,418,424; 6,427,454; 6,430,985; 6,438,974; 6,449,972; 6,454,178; 6,467,280; 6,467,282; 6,499,305; 6,505,057; 6,505,475; 6,581,847; 6,616,057; 6,640,145; 6,647,318; 6,651,895; 6,662,578; 6,662,583; 6,679,072; 6,726,111; 6,847,854; 6,850,252; 6,906,434; 6,937,909; 6,950,534; 6,959,520; 6,987,331; 7,006,881; 7,024,254; 7,024,336; 7,031,880; 7,044,397; 7,050,873; 7,059,143; 7,079,904; 7,086,240; 7,136,710; 7,143,016; 7,164,117; 7,243,945; 7,272,234; 7,295,119; 7,295,960; 7,343,016; 7,347,774; 7,389,649; 7,407,029; 7,415,126; 7,419,365; 7,451,005; 7,460,690; 7,461,849; 7,475,828; 7,489,303; 7,505,877; 7,533,536; 7,542,876; 7,556,271; 7,583,710; 7,599,759; 7,611,157; 7,623,993; 7,628,409; 7,654,098; 7,663,502; 7,668,340; 7,740,234; 7,797,062; 7,805,952; 7,813,822; 7,827,813; 7,839,275; 7,853,645; 7,865, 334; 7,890,927; 7,904,187; 7,918,100; 7,966,078; 7,966,104; 7,974,714; 7,984,420; 7,987,003; 8,023,500; 8,027,742; 8,028,272; 8,028,275; 8,031,060; 8,035,320; 8,046,107; 8,046,313; 8,060,222; 8,086,352; 8,090,452; 8,096,140; 8,103,465; 8,126,574; 8,127,060; 8,147,302; 8,165,916; 8,200,344; 8,200,345; 8,225,271; 8,229,579; 8,235,776; 8,265,110; 8,316,926; 8,326,464; 8,327,653; 8,356,760; 8,364,136; 8,368,640; 8,369,967; 8,412,357; 8,417,360; 8,424,328; 8,424,885; 8,428,755; 8,463,441; 8,463,964; 8,473,080; 8,478,433; 8,495,888; 8,516,266; 8,527,108; 8,527,109; 8,567,204; 8,583,263; 8,594,813; 8,594,814; 8,626,345; 8,639,392; 8,666,517; 8,674,544; 8,682,454; 8,694,132; 8,694,409; 8,767,987; 8,781,608; 8,788,415; 8,805,598; 8,816,752; 8,845,795; 8,882,895; 8,909,359; 8,914,300; 8,915,295; 8,918,223; 8,918,657; 8,943,008; 8,987,959; 8,990,133; 8,996,141; 8,996,177; 9,002,483; 9,015,092; 9,021,462; 9,026,473; 9,057,532; 9,063,551; 9,082,079; 9,087,359; 9,088,179; 9,104,186; 9,109,981; 9,110,647; 9,120,365; 9,129,337; 9,146,546; 9,152,915; 9,156,165; 9,172,738; 9,182,154; Re.42006; US Patent App. Nos. 20010002239; 20010042792; 20010045097; 20010049942; 20020014538; 20020105231; 20020112435; 20020116075; 20020151992; 20020178737; 20030061004; 20030084672; 20030089119; 20030094004; 20030153986; 20030160104; 20030171901; 20030209893; 20030219132; 20030230443; 20040037430; 20040123550; 20040123612; 20040129478; 20040143428; 20040161132; 20040215356; 20040236547; 20040267395; 20050017488; 20050046584; 20050156052; 20060013440; 20060064180; 20060105697; 20060111816; 20060155398; 20060158051; 20060200253; 20060200258; 20060200259; 20060200260; 20060208169; 20060208570; 20060234621; 20060288715; 20070016476; 20070022771; 20070053513; 20070061735; 20070070038; 20070082601; 20070114292; 20070145695; 20070145699; 20070147013; 20070151751; 20070151779; 20070152409; 20070178825; 20070181701; 20070256432; 20080037485; 20080051940; 20080179409; 20080211779; 20080265799; 20090005912; 20090074248; 20090088991; 20090204234; 20090204237; 20090204245; 20090204267; 20090210081; 20100010681; 20100044990; 20100057258; 20100058799; 20100076642; 20100106332; 20100106641; 20100107173; 20100110634; 20100114387; 20100182137; 20100250015; 20100306001; 20100327687; 20110022235; 20110029100; 20110037725; 20110040393; 20110043035; 20110082598; 20110142269; 20110148202; 20110156896; 20110167110; 20110168792; 20110190909; 20110251725; 20110252248; 20110316376; 20120013257; 20120027388; 20120036016; 20120041608; 20120072030; 20120072031; 20120085291; 20120125558; 20120150651; 20120221156; 20120235579; 20120253524; 20120260679; 20120278220; 20120278221; 20120324928; 20130013120; 20130024043; 20130043319; 20130054044; 20130096722; 20130131839; 20130184838; 20130186119; 20130197676; 20130213082; 20130218743; 20130218744; 20130228134; 20130249604; 20130250638; 20130254090; 20130269376; 20130284109; 20130309154; 20130319021; 20130319226; 20130325691; 20130325692; 20130325768; 20130325773; 20130325774; 20130325775; 20130325776; 20140012821; 20140025613; 20140032458; 20140032459; 20140081895; 20140089241; 20140100674; 20140103128; 20140123906; 20140148923; 20140173452; 20140201018; 20140229022; 20140257528; 20140260692; 20140265927; 20140277744; 20140277765; 20140282458; 20140303789; 20140316585; 20140337002; 20150019024; 20150060037; 20150088786; 20150116808; 20150130631; 20150133043; 20150158368; 20150167999; 20150222121; 20150226343; 20150241856; 20150283701; 20150283702; 20150283703; 20150316282; and 20150323427

The present technology can to significantly increase energy production for wind farms and combined heat and power (CHP) plants and decrease energy consumption for smart buildings. A robust autonomous thermostat might reduce at least 20% energy consumption compared to existing smart thermostats.

It is extremely difficult, if not impossible, to completely and precisely model the operational environments in searching for an optimal control policy for highly complex, uncertain, and dynamic systems. The present technology solution takes advantage of prior basic control policies developed by human experts, and leaves the more challenging task of improving and adapting these policies to a robust autonomous agent. Therefore, the robust autonomy solution has the following advantages compared to a custom engineering approach: 1) Requiring much less human effort in research and development; 2) Reducing product cycle time from research to market for an autonomous control system; 3) Producing robust control polices that can adapt to unforeseen and dynamic environments; and 4) Improving energy production and savings with robust control polices.

Reinforcement Learning (RL) techniques have great potential to provide robust autonomous systems by enabling them to learn from past experiences and adaptively optimize behaviors for dynamic environments. However, state-of-the-art RL techniques have not yet addressed the central challenge of robust autonomy—how to quickly improve and adapt control policies while maintaining effective operations. Current RL techniques focus on learning an optimal or near-optimal policy for a given problem (most through a formulation of Markov decision processes with unknown reward and transition functions), rather than improving and adapting existing suboptimal policies (and testing those policies to determine suboptimality). The exploration strategies employed by these techniques do not provide suitable tradeoff between exploitation (for effective operations) and exploration (for fast improvement) required in robust autonomy.

US2015/0100530 (Methods and Apparatus for Reinforcement Learning), expressly incorporated herein by reference, is exemplary of the limitations of the known prior art. This application describes a reinforcement learning algorithm/process that uses a five-level convolutional neural network to analyze agent experience data in order to learn a control policy.

The present technology allows an agent to make best use of limited experience data to learn a control policy in a most sample efficient way. This technology can be applied to various reinforcement learning algorithms/processes. This technology can significantly improve the sample efficiency of a popular RL process (approximate value iteration).

It is therefore an object to provide a method for controlling a system, and the corresponding system comprising: providing a set of data representing a plurality of states and associated trajectories of an environment of the system; and iteratively determining an estimate of an optimal control policy for the system, comprising performing the substeps until convergence: (a) estimating a long term value for operation at a respective state of the environment over a series of predicted future environmental states; (b) using a complex return of the data set to determine a bound to improve the estimated long term value; and (c) producing an updated estimate of an optimal control policy dependent on the improved estimate of the long term value.

It is a further object to provide a control system, comprising: a memory configured to store a set of data representing a plurality of states and associated trajectories of an environment of the system; and at least one processor, configured to process the data in the memory, according to an algorithm comprising: iteratively determining an estimate of an optimal control policy for the system, comprising performing the substeps until convergence: (a) estimating a long term value for operation at a current state of the environment over a series of predicted future environmental states; (b) using a complex return of the data set to determine a bound to improve the estimated long term value; and (c) producing an updated estimate of an optimal control policy dependent on the improved estimate of the long term value. The updated estimate of an optimal control policy may be used to control a controlled system.

It is a still further object to provide a computer readable medium storing nontransitory instructions for controlling at least one automated processor to perform an algorithm comprising: iteratively determining an estimate of an optimal control policy for a system based on a set of data representing a plurality of states and associated trajectories of an environment of the system; comprising performing the substeps until convergence: estimating a long term value for operation at a current state of the environment over a series of predicted future environmental states; using a complex return of the data set to determine a bound to improve the estimated long term value; and producing an updated estimate of an optimal control policy dependent on the improved estimate of the long term value.

The method may further update an automated controller for controlling the system with the updated estimate of the optimal control policy, wherein the automated controller operates according to the updated estimate of the optimal control policy to automatically alter at least one of a state of the system and the environment of the system. Alternately or in addition, the at least one processor may itself control the system with the updated estimate of the optimal control policy, according to the updated estimate of the optimal control policy to automatically alter at least one of a state of the system and the environment of the system. In either case, the purpose of the updated control policy is to control a system, and typically the controlled system is a physical system, i.e., governed by laws of physics and thermodynamics. Likewise, the environment is typically a physical environment. Some or all of these laws may be modelled in analyzing the data or implementing the control policy. Another possibility is that the controlled system is a computational system governed by rules of operation, but the relevant rules may not be rules of physics or thermodynamics. The computational system in this case is real, and the purpose of the controller may be to modify its operation without replacing its core components or reprogramming it. In any case, the updated predicted optimal control policy is typically for the purpose of improving the functioning of a controller, using data representing a plurality of states and associated trajectories of an environment of the controlled system.

A complex return of the data set may be used as a bound to improve the estimated long term value comprises using a truncated portion of a trajectory which is consistent with the estimate of the optimal control policy, to estimate the complex return, without introducing off-policy bias.

The truncated portion of the trajectory may comprise a predetermined number of sequential data.

The truncated portion of the trajectory may be truncated dependent on whether a sequential datum is on-policy or off-policy.

An inherent negative bias of the complex return may be employed as a lower bound for the estimate of the optimal control policy.

A trajectory may comprise an ordered time sequence of sample data. For example, a trajectory may comprise a sequentially ordered collection of observations, and the long term value is the sum of the discounted values of a reward received for each observation plus the maximum discounted estimated value for operation at the estimated optimal policy.

The iteratively determining aspect may comprise Algorithm CQFI.

The bound to improve the estimated long term value may be a bounded return representing the maximum of an unbiased estimator and a complex return function.

The iteratively determining aspect may comprise Algorithm BQFI (infra).

The method may further comprise predicting an upper bound for the estimated optimal control policy. The upper bound for a value associated with a respective state may be determined based on at least looking backward along a respective trajectory, to provide an estimate of a respective environment of the system at the respective state, as an inflated value of the past environment of the system to achieve the respective environment.

The method may be used in a batch mode processing paradigm or real-time adaptive control system.

DETAILED DESCRIPTION OF THE PREFERRED EMBODIMENTS

Example 1—Complex Return Fitted Q-Iteration

Figure 1:
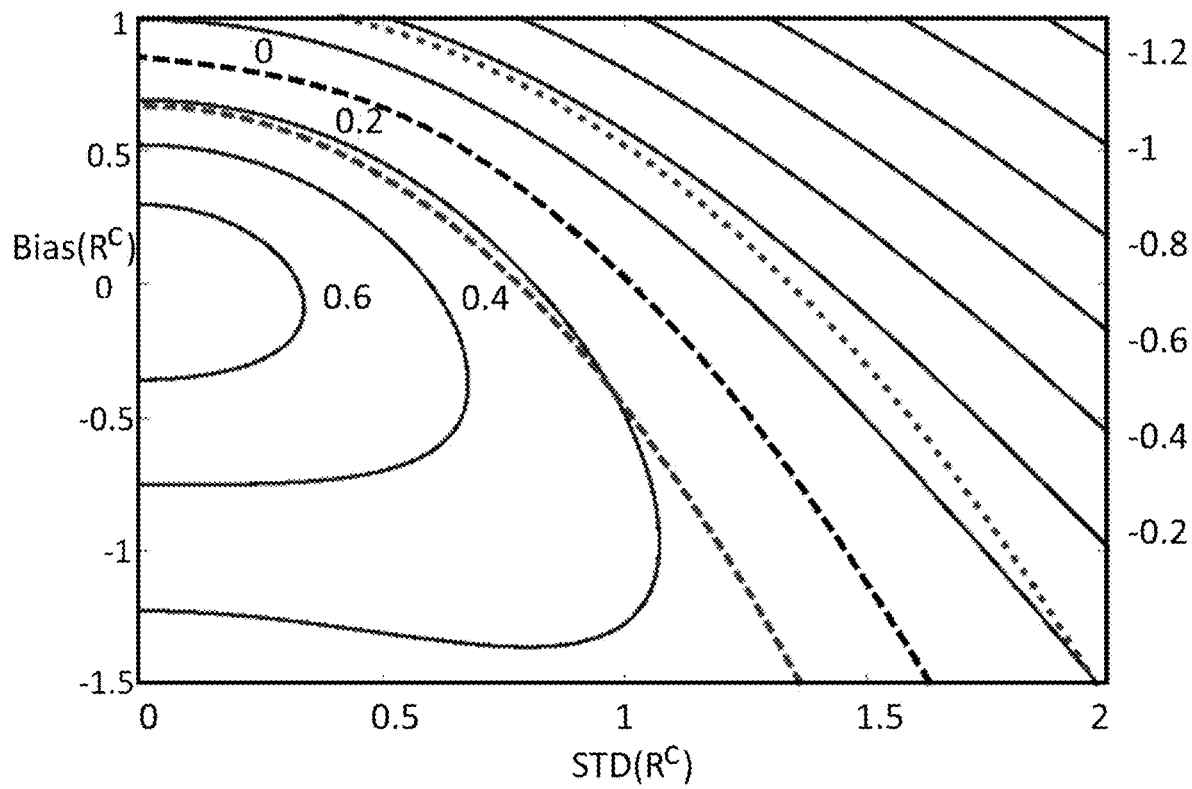
FIG. 1 shows a contour plot showing the improvement of $\max(R^{(1)}, \hat{\theta})$ over $R^{(1)}$. The hashed curves show boundaries between improvement and no improvement for cases of (solid -) bias ($R^{(1)}$)=0, (dashed) bias($R^{(1)}$)=0.5 and (dotted) bias ($R^{(1)}$=−0.5.

To meet the challenges to using trajectory data in complex returns, Complex return Fitted Q-Iteration (CFQI) is provided, a generalization of the FQI framework which allows for any general return-based estimate, enabling the seamless integration of complex returns within AVI. Two distinct methods for utilizing complex returns within the CFQI framework are provided. The first method is similar to the idea of Q(λ) [Watkins 1992] and uses truncated portions of trajectories, that are consistent with the approximation of Q*, to calculate complex return estimates without introducing off-policy bias. The second method is more a novel approach that makes use of the inherent negative bias of complex returns, due to the value iteration context, as a lower bound for value estimates. Statistical evidence and analysis is provided that shows how an estimator with predictable, but unknown, bias can provide a bound on value estimates producing a more accurate estimator. Additionally, convergence proofs are provided showing that use of CFQI is guaranteed to converge under the same assumptions as FQI. Finally, an empirical evaluation of the methods on several RL benchmarks is provided that shows how CFQI improves the accuracy of the learned Q* approximation, the quality of the learned policy, and convergence behavior.

In CFQI, Sample data are most commonly collected in sequences known as trajectories. A trajectory, T, is a sequentially ordered collection of observations where, $T=[(s_0, a_0, s_1, r_1), (s_1, a_1, s_2, r_2), \ldots]$. Trajectories provide an alternative to using just the $R_t^{(1)}$ return. Given trajectory data, the 1-step return estimate in Equation (5) has been generalized to produce the n-step returns:

$$R_t^{(n)} = \sum_{i=1}^{n-1} \gamma^{j-1} r_{t+i} + \gamma^n \max_{a \in A} \hat{Q}_{m-1}(s_{t+n}, a). \quad (5)$$

It should be noted that this definition of the n-step returns differs from the standard on-policy definition of the n-step returns because of its use of the max operation. In principle each of the n-step returns can be used as approximations of $Q^*(s_t, a_t)$. Individually each estimator has its own distinct biases and variances. However, when combined, through averaging they can produce an estimator with lower variance than any one individual return [Dietterich 2000]. It is this idea that motivated the development of complex returns [Sutton 1998].

A complex return is a weighted average, with the weights summing to 1, of the n-step returns. The n-returns are weighted differently because of their assumed relative variance behaviors. The general assumption behind existing complex return methods is that the variance of the n-step returns increases as n increases. From the on-policy literature there are two competing complex return approaches. The classic complex return is the λ-return which serves as the basis for the TD(λ) family of algorithms [Sutton 1998]. More recently, the γ-return was introduced based upon different variance assumptions of the n-step returns [Konidaris 2011]. The γ-return is defined as:

$$R_t^{\gamma} = \sum_{n=1}^{|T|} \frac{\left(\sum_{i=1}^{n} \gamma^{2(i-1)}\right)^{-1}}{\sum_{m=1}^{|T|} \left(\sum_{i=1}^{m} \gamma^{2(i-1)}\right)^{-1}} R_t^{(n)}. \quad (6)$$

The difficulty in applying complex returns to FQI is that in an AVI context the trajectories can be sampled off-policy and the target policy is also unknown. Off-policy trajectories introduce undesirable bias into the n-step return estimates that cannot be reduced through averaging. If the target policy were known, as in policy iteration, importance sampling can be used to reduce off-policy bias [Precup 2001]. However, the target policy is unknown in the AVI context.

Complex Fitted Q-Iteration (CFQI) is thus a generalization according to the present technology, of the popular FQI framework that enables the use of complex return based value estimates. Algorithm 1 provides the details of the approach.

Algorithm 1: CFQI($\mathcal{T}$, M, $R^C$)
Input:
 $\mathcal{T}$ : set of trajectories,
 M : number of iterations,
 $R^c$ : complex return function
 1:   $\hat{Q}_0 \leftarrow 0$
 2:   for m = 1 to M do
 3:     Let X and Y be empty sets.
 4:     for k = 1 to |#,40; | do
 5:       for t = 1 to $|T_k|$ do
 6:         X ← Append(X,($s_t^{T_k}, a^{T_k}$))
 7:         Y ← Append(Y, $R^C$(t,$T_k, \hat{Q}_{m-1}$))
 8:       end for
 9:     end for
10:     $\hat{Q}_m$ ← Regression(X, Y)
11:   Return $\hat{Q}_M$ The primary distinction between FQI and CFQI lies in the two update rules (line 7). FQI is limited to the $R^{(1)}$ return estimate, while CFQI makes use of any chosen complex return $R^C$ to provide value estimates. A second difference between FQI and CFQI is that CFQI processes over trajectories, not unordered samples as in FQI. From a computational complexity standpoint, CFQI has the same computational complexity as FQI. The derivations of the n-returns and complex returns can be performed efficiently by processing trajectories in reverse order. Therefore, the present technology allows for the general use of complex returns as value estimates and does not break the theoretical convergence guarantees of the original approach.

Theorem 1 CFQI converges w.p.1 if a normalized complex return, computed from fixed length trajectories, is used to derive value targets to be used in a kernel regression model, as defined by Equation (7) and Equation (8).
Proof for Theorem 1

In previous works AVI, using $R^{(1)}$ as the value estimator, has been shown to converge as long as the regression model is an averager such as a normalized kernel method [Gordon 1999, Ormoneit 2002, Ernst 2005]. Specifically, the supervised learning method learns a model, $\hat{Q}(s,a)$, defined by:

$$\hat{Q}(s, a) = \sum_{T_\ell \in \mathcal{T}} \sum_{t=1}^{|T_\ell|} k\left(\left(s_t^{T_\ell}, a_t^{T_\ell}\right), (s, a)\right) R_{\ell,t}^c \quad (7)$$

where $R_{\ell,t}^c$ is the estimated value for sample t from $T_\ell$. $R_{\ell,t}^c$ can be $R^{(1)}$, as in the standard AVI, or, as shown, any normalized complex return. Additionally, the kernel, k:(S× A)² ↦ □, must satisfy the following normalization condition:

$$\sum_{T_\ell \in \mathcal{T}} \sum_{t=1}^{|T_\ell|} \left|k\left(\left(s_t^{T_\ell}, a_t^{T_\ell}\right), (s, a)\right)\right| = 1, \forall (s, a) \quad (8)$$

Following the proof from [Ernst 2005], the sequence of M Q-functions can be rewritten as, $\hat{Q}_m = \hat{H}\hat{Q}_{m-1}$ where $\hat{H}$ is an operator mapping any function in a Banach space $\mathcal{H}$ of functions over S×A to $\mathcal{H}$ itself. $\hat{H}$ is defined as:

$$(\hat{H}K)(s, a) = \sum_{T_\ell \in \mathcal{T}} \sum_{t=1}^{|T_\ell|} k\big((s_t^{T_\ell}, a_t^{T_\ell}), (s, a)\big) *$$

$$\sum_{n=1}^{|T_\ell - t|} w(n) \left[ \sum_{i=1}^{n-1} \gamma^{j-1} r_{t+i} + \gamma^n \max_{a' \in A} K(s_{t+n}, a') \right]$$

Next $\hat{H}$ is shown to be a contraction in $\mathcal{H}$. Specifically, $\|\hat{H}K - \hat{H}\overline{K}\|_\infty < \|K - \overline{K}\|_\infty$ for any K and $\overline{K} \in \mathcal{H}$ $$\|\hat{H}K - \hat{H}\overline{K}\|_\infty = \max_{(s,a) \in S \times A} \left| \sum_{T_\ell \in \mathcal{T}} \sum_{t=1}^{|T_\ell|} k\big((s_t^{T_\ell}, a_t^{T_\ell}), (s, a)\big) \right.$$

$$\left. \sum_{n=1}^{|T_\ell - t|} w(n) \gamma^n \left[ \max_{a' \in A} K(s_{t+n}, a') - \max_{a' \in A} \overline{K}(s_{t+n}, a') \right] \right| \leq$$

$$\max_{(s,a) \in S \times A} \sum_{T_\ell \in \mathcal{T}} \sum_{t=1}^{|T_\ell|} k\big((s_t^{T_\ell}, a_t^{T_\ell}), (s, a)\big) *$$

$$\sum_{n=1}^{|T_\ell - t|} w(n) \gamma^n \left| \max_{a' \in A} K(s_{t+n}, a') - \max_{a' \in A} \overline{K}(s_{t+n}, a') \right| <$$

$$\gamma \max_{(s,a) \in S \times A} \sum_{T_\ell \in \mathcal{T}} \sum_{t=1}^{|T_\ell|} k\big((s_t^{T_\ell}, a_t^{T_\ell}), (s, a)\big) *$$

$$\sum_{n=1}^{|T_\ell - t|} w(n) \max_{a' \in A} |K(s_{t+n}, a') - \overline{K}(s_{t+n}, a')| \leq$$

$$\gamma \max_{(s,a) \in S \times A} \sum_{T_\ell \in \mathcal{T}} \sum_{t=1}^{|T_\ell|} k\big((s_t^{T_\ell}, a_t^{T_\ell}), (s, a)\big) *$$

$$\max_{t' \geq t, (s_{t'}, a') \in S_{T_\ell} \times A} |K(s_{t'}, a') - \overline{K}(s_{t'}, a')| \leq$$

$$\gamma \max_{(s,a) \in S \times A} |K(s, a) - \overline{K}(s, a)| = \gamma \|K - \overline{K}\|_\infty <$$

$$\|K - \overline{K}\|_\infty$$

By fixed-point theorem, the proof is completed.

Example 2—Bounded Fitted Q-Iteration

Using complex returns directly in an off-policy framework can be problematic, the bias of off-policy n-step returns will introduce bias into the final result possibly eliminating any potential benefit from variance reduction. Below are provided two methods for both mitigating and utilizing this bias.

One way to handle the off-policy bias of the complex returns is to attempt to avoid it by truncating the trajectories where they appear to go off-policy. This idea is borrowed from the Q(λ) [Watkins 1989] approach. In this approach the current $\hat{Q}$ provides an approximation of the optimal policy, $\hat{\pi}^*$ that can be used to approximate when a trajectory takes an off-policy sub-optimal action. During the process of calculating the complex return estimates, samples in a trajectory after the first off-policy action are not considered. Assuming $\hat{\pi}^*$ converges to a close approximation of $\pi^*$, a strong assumption, this approach should not introduce off-policy bias and can take advantage of portions of trajectories that follow the optimal policy to reduce variance and overall error.

However, the assumption that $\hat{\pi}^*$ is an accurate approximation of $\pi^*$ is a poor one, especially early in the iterative process. Additionally, because $\hat{\pi}^*$ will likely change during the iterative process, the lengths of the trajectories used to calculate the complex returns will change dynamically from one iteration to the next. Changing lengths of the trajectories violates one of the assumptions made by Theorem 1 and convergence may no longer be guaranteed. This issue is examined further in the empirical analysis below.

The second approach utilizes the off-policy n-step return bias rather than attempting to eliminate it. It exploits the predictability of this bias enabling the effective use of complex returns as a bound on the value of the $R^{(1)}$ return. In an AVI context, such as CFQI, this is possible due to the fact that the target policy is an optimal policy. Because the target policy is optimal, it is a safe assumption that any off-policy bias present in the n-step returns is negative in value. A complex return derived from the biased n-step returns will also be biased negatively, but should have relatively low variance. This insight directly leads to the derivation of a bounded complex return, $R^B$:

$$R^B = \max(R^{(1)}, R^C). \qquad (9)$$

where $R^C$ is some chosen complex return function.

Here we motivate the use of a bounded complex return $R^B$. Let us first consider a simple example by assuming that $\hat{\theta}$ is a degenerated estimator with variance 0 (that is, it is a constant) and is always less than the true value θ. In this simplified situation, it is always of benefit to use $\max(R^{(1)}, \hat{\theta})$ in place of $R^{(1)}$ to estimate the value. The reason is obvious: when $R^{(1)}$ is less than $\overline{\theta}$, then it is farther away from θ than $\hat{\theta}$, in which case the greater observation $\hat{\theta}$ should be used. In the worst-case scenario, that is, $R^{(1)} > \hat{\theta}$ with high probability, it is no harm to use $\max(R^{(1)}, \hat{\theta})$ since it would coincide $R^{(1)}$.

This simple example shows that sometimes taking the maximum of two estimators can improve both. The stringent assumption van be relaxed, and $\hat{\theta}$ assumed to have a positive variance, and is negatively biased (its expectation is less than the value θ), so that with high probability, $\hat{\theta} < \theta$. This is not difficult to achieve, since it is true either when the variance is not too large or when its expectation is small enough (compared to θ). Again, in this case $\max(R^{(1)}, \hat{\theta})$ would be superior to $R^{(1)}$.

The actual improvement of $\max(R^{(1)}, \hat{\theta})$ over $R^{(1)}$, should it exist, may not be substantial, if $R^{(1)} < \hat{\theta}$ rarely occurs. This could happen when, for example, the expectation of $\hat{\theta}$ is too small. Moreover, $\max(R^{(1)}, \hat{\theta})$ may even be worse than $R^{(1)}$, when, for example, the variance of $\hat{\theta}$ is too large (in which case "with high probability, $\hat{\theta} < \theta$" is not a true statement.)

Therefore, in some cases, $\max(R^{(1)}, \hat{\theta})$ improves $R^{(1)}$. Improvements are possible when $\text{Var}(\hat{\theta})$ is small and/or when $\mathbb{E}(\hat{\theta}) - \theta$ is small enough to ensure that $\hat{\theta} < \theta$, but not so small that $\hat{\theta} < R^{(1)}$ always. Precisely when the improvements occur depends on the underlying distribution of $R^{(1)}$ and $\hat{\theta}$. Here both estimators are assumed follow normal distributions. Hence the distributions are fully characterized by their expectations and variances respectively. Although in reality, the true estimators are only approximately normal at best, the analysis conducted here is sufficient to convey the main message.

To show a concrete example, assume that bias($R^{(1)}$)= $\mathbb{E}(R^{(1)})-\hat{\theta}=0$ and Var($R^{(1)}$)=1. The bias for $\hat{\theta}$ and the variance of $\hat{\theta}$ are chosen from the range $[-1.5,1]\times[0,2]$. For each pair of the bias and variance, the mean squared error of the estimators $R^{(1)}$ and max($R^{(1)}$, $\hat{\theta}$) is estimated by Monte Carlo integration. The set of bias($\hat{\theta}$) and std($\hat{\theta}$) are sought to be identified, where max($R^{(1)}$, $\hat{\theta}$) improves $R^{(1)}$. In FIG. 1, the isoline at 0 is the boundary where the two estimators are equally good. The domain to the southwest of the 0 isoline is precisely the domain of improvement.

FIG. 1 shows a contour plot showing the improvement of max($R^{(1)}$, $\hat{\theta}$) over $R^{(1)}$. Hashed and central curves: boundaries between improvement and no improvement for cases of (solid -) bias($R^{(1)}$)=0, (dashed) bias($R^{(1)}$)=0.5 and (dotted) bias($R^{(1)}$)=−0.5.

Also shown in FIG. 1 are contours of the log ratio of MSE, log(MSE($R^{(1)}$)/MSE(max($R^{(1)}$, $\hat{\theta}$)) (note that $R^C \approx \hat{\theta}$). The greater this measure is, the more improvement max($R^{(1)}$, $\hat{\theta}$) has. Clearly, the greatest improvement occurs at the unrealistic case where $\hat{\theta}$ is unbiased and has variance 0. Overall, a combination of small bias and small variance guarantees an improvement. More precisely, when the bias of $\hat{\theta}$ is negative, the variance of $\hat{\theta}$ can be greater than that of $R^{(1)}$ (=1 in this case) for the maximal to provide an improvement. The more negative the bias is, the greater variance is allowed. When the bias is too much negatively-biased or the variance is too large, then the improvement becomes negligible. On the other hand, even if the bias of $\hat{\theta}$ is positive, there is still a chance for the maximal to be a better estimator. However, this comes with a more stringent assumption that the variance of $\hat{\theta}$ is much smaller.

FIG. 1 also shows the boundaries under the cases where $R^{(1)}$ is biased. The dashed curve and the dotted curve correspond to bias 0.5 and −0.5 respectively. Compared to the solid curve, it is more likely for a maximal estimator such as max($R^{(1)}$, $\hat{\theta}$) to improve $R^{(1)}$, when $R^{(1)}$ is itself negatively biased; and vice versa. This is consistent with the motivation to bound the estimator from below so that it does not negatively deviate from the parameter (recall the simple toy example.)

Characteristics about $\hat{\theta}$ that make max($R^{(1)}$, $\hat{\theta}$) better than $R^{(1)}$ and hence make the bounding strategy work, can be identified.

1. As a bottom line, the expectation of $\hat{\theta}$ needs to be smaller than a positive value τ that satisfies MSE(max($R^{(1)}$, τ))=MSE($R^{(1)}$), or equivalently, $$\tau^2 \Phi(\tau) + \int_\tau^\infty t^2 \phi(t) dt = 1$$

in the current example shown in FIG. 1, where $\Phi(t)$ and $\phi(t)$ are the distribution function and density function of standard normal distribution (direct calculation leads to τ≈0.8399).

2. The variance of $\hat{\theta}$ is small in general, but can be greater than that of $R^{(1)}$ when the expectation of $\hat{\theta}$ is less than θ, i.e., the variance of $\hat{\theta}$ (=$R^C$) should be small. It can be greater than that of $R^{(1)}$.

3. The bias of $\hat{\theta}$ (=) $R^C$ should not be overly negative.

The first two criteria ensure a safe bound from below such that $R^B$ is no worse than $R^{(1)}$. The first criterion makes sure that taking maximal (bounding from below) is meaningful. Otherwise an alternative strategy, namely bounding from above, is needed. The second criterion prevents $\hat{\theta}$ from ruining the mean square error of max($R^{(1)}$, $\hat{\theta}$) through large variance.

Moreover, the third criterion is available to make sure that the improvement, when it exists, is substantial: $\hat{\theta}$ is not overly negatively biased. This allows a fair chance for $R^{(1)} < \hat{\theta}$.

It is worth noting that for off-policy n-step returns, the expectation generally decreases as n increases. Hence, bias($R^{(n)}$)<bias($^{(n-1)}$)< . . . <bias($R^{(1)}$). This means if one was to use an n-step return, or a weighted average of many n-step returns, as the bounding estimator, it is more likely to fall into the improvement domain, because the smaller bias($\hat{\theta}$) is, the greater variance is allowed, as can be seen in FIG. 1.

Consider the n-step returns in the AVI context, their variance and bias properties. Just as the 1-step return $R_t^{(1)}$ (See Equation (4)) can be used as an estimator for Q* ($s_t,a_t$) in value iteration, the n-step returns are defined as follow:

$$R_t^{(n)} = \sum_{i=1}^{n-1} \gamma^{i-1} r_{t+i} + \gamma^n \max_{a \in A} \hat{Q}_{m-1}(s_{t+n}, a). \quad (10)$$

All of the n-step returns are approximations of Q* ($s_t,a_t$). Again, the greedy choice by the max operation makes Equation (10) different from the classic n-step return definition used in the Temporal Difference (TD) family of algorithms.

A salient feature of the n-step returns is that their variances increase with n due to the stochastic nature of the Markov Decision Process (MDP). The function approximation variance, which can be a substantial component of the overall variance, is often considered to be roughly the same across different samples. The bias of n-step returns is a more complex issue. Among various types of biases (e.g., off-policy bias, function approximation bias, sampling bias, etc.), the behavior of the off-policy bias is unique. When the target policy is an optimal policy, like in the AVI context, the off-policy bias introduced by a suboptimal trajectory is strictly negative, and its magnitude increases as more suboptimal actions are followed towards the end of the trajectory. The same observation can be made when treating any state in a trajectory as the starting point for the rest of the trajectory. In contrast, other types of biases, if they exist, can be positive or negative, and often share roughly the same magnitude across different samples. Therefore, when combining the effects of various sources of bias, the expectation of n-step returns generally decreases as n increases.

Given the above analysis, any of the n-step estimators can potentially fall into the domain of improvement. However, it is difficult to determine whether Conditions 1 and 2 identified earlier are met for each of the individual n-step estimators and which one is the best, without detailed prior knowledge of the bias and variance behaviors along a trajectory. Therefore, a logical choice is to consider a weighted average of a number of n-step returns, the so-called complex return.

There is a risk that the bounding method may not work, i.e., the bounding estimator falls into the "bad" region, for example if the bias of $R^{(1)}$ is positive.

Therefore, a complex return can effectively be utilized as a lower bound for the $R^{(1)}$ estimator.

This insight produces Bounded Fitted Q-Iteration (BFQI), an algorithm that makes use of the complex return approach in an AVI framework to provide improved value estimates. The details for BFQI are provided by Algorithm 2.

```
Algorithm 2: BFQI(𝒯, γ, M, R^B)
Input: 𝒯: set of trajectories, γ discount factor,
M: number of iterations, R^B: Bounding Return
 1:        Q_0 ← 0
 2:        for m = 1 to M do
 3:            Let X and Y be empty sets.
 4:            for k = 1 to |𝒯| do
 5:                for all (s_t, a_t, s_{t+1}, r_{t+1}) ∈ T_k do
 6:                    X ← Append(X; (s_t; a_t))
 7:                    Y ← Append(Y; R_t^B)
 8:                end for
 9:            end for
10:            Q̂_m ← Regression( X, Y )
11:        end for
```

Theorem 2 assures that BFQI with the bounding method also converges under the same conditions as FQI.

Theorem 2 BFQI converges w.p.1 if the $R^{(1)}$ return is bounded by a normalized complex return on fixed length trajectories to produce value estimates used in a kernel regression model, as defined by Equation (11) and Equation (12).

Proof for Theorem 2

Following proof of Theorem 1, $\hat{H}$ is defined as:

$$(\hat{H}K)(s, a) = \sum_{T_\ell \in \mathcal{T}} \sum_{t=1}^{|T_\ell|} k\left(\left(s_t^{T_\ell}, a_t^{T_\ell}\right), (s, a)\right) \quad (11)$$

$$\max \quad (12)$$

$$\left\{ r_{t+1} + \max_{a' \in A} K(s_{t+1}, a'), \sum_{n=1}^{|T_\ell - t|} w(n)\left[\sum_{i=1}^{n-1} \gamma^{i-1} r_{t+i} + \gamma^n \max_{a' \in A} K(s_{t+n}, a')\right]\right\}$$

$\hat{H}$ is shown to be a contraction in $\mathcal{H}$.

$$\|\hat{H}K - \hat{H}\overline{K}\|_\infty = \max_{(s,a) \in S \times A} \left| \sum_{T_\ell \in \mathcal{T}} \sum_{t=1}^{|T_\ell|} k\left(\left(s_t^{T_\ell}, a_t^{T_\ell}\right), (s, a)\right) \right.$$

$$\left\{ \max\left\{ r_{t+1} + \gamma \max_{a' \in A} K(s_{t+1}, a'), \right. \right.$$

$$\sum_{n=1}^{|T_\ell - t|} w(n)\left[\sum_{i=1}^{n-1} \gamma^{i-1} r_{t+i} + \gamma^n \max_{a' \in A} K(s_{t+n}, a')\right]\right\} -$$

$$\max\left\{ r_{t+1} + \gamma \max_{a' \in A} \overline{K}(s_{t+n}, a'), \right.$$

$$\left. \left. \sum_{n=1}^{|T_\ell - t|} w(n)\left[\sum_{i=1}^{n-1} \gamma^{i-1} r_{t+i} + \gamma^n \max_{a' \in A} \overline{K}(s_{t+n}, a')\right]\right\}\right| \leq$$

$$\max_{(s,a) \in S \times A} \left| \sum_{T_\ell \in \mathcal{T}} \sum_{t=1}^{|T_\ell|} k\left(\left(s_t^{T_\ell}, a_t^{T_\ell}\right), (s, a)\right) \max \right.$$

$$\left\{ \gamma \max_{a' \in A} K(s_{t+n}, a') - \gamma \max_{a' \in A} \overline{K}(s_{t+n}, a'), \right.$$

$$\left. \sum_{n=1}^{|T_\ell - t|} w(n) * \left[\gamma^n \max_{a' \in A} K(s_{t+n}, a') - \gamma^n \max_{a' \in A} \overline{K}(s_{t+n}, a')\right]\right\}\right|$$

At this point all that remains is to show that both choices in the second max{ } function are less than $\|K - \overline{K}\|_\infty$ independently. The first choice, $\gamma \max_{a' \in A} K(s_{t+1}, a') - \gamma \max_{a' \in A} \overline{K}(s_{t+1}, a')$, was proven in [Ernst 2005]. Finally, the second choice, $\sum_{n=1}^{T_\ell - t} w(n)[\gamma^n \max_{a' \in A} K(s_{t+n}, a') - \gamma^n \max_{a' \in A} \overline{K}(s_{t+n}, a')]$ is proven by Theorem 1.

Example 3 (Comparative Example)—Trajectory Fitted Q-Iteration

Trajectory Fitted Q-Iteration (TFQI) [Wright 2013] is an AVI-based algorithm that makes use of the n-step returns. Instead of using a complex return, as provided in Examples 1 and 2, TFQI uses the n-step return that has the highest observed value as the sample Q-value estimate.

$$R^{Max} = \max(R^{(1)}, R^{(2)}, \ldots, R^{(|T|)}) \quad (13)$$

Example 4—Inverse Return Function FQI

The next logical question is whether an effective upper bound can be derived as well. One hypothesis is that an upper bound may be derived by looking backward along trajectories instead of forward. The inverse return may be derived starting from the original n-step return equation:

$$R_t^{(n)} = \sum_{i=1}^{n-1} \gamma^{i-1} r_{t+i} + \gamma^n Q(s_{t+n}, a_{t+n})$$

$$R_t^{(n)} - \sum_{i=1}^{n-1} \gamma^{i-1} r_{t+i} = \gamma^n Q(s_{t+n}, a_{t+n})$$

$$\frac{R_t^{(n)} - \sum_{i=1}^{n-1} \gamma^{i-1} r_{t+i}}{\gamma^n} = Q(s_{t+n}, a_{t+n})$$

Substituting $Q(s_t, a_t)$ for $R_t^{(n)}$ $$\frac{Q(s_t, a_t) - \sum_{i=1}^{n-1} \gamma^{i-1} r_{t+i}}{\gamma^n} = Q(s_{t+n}, a_{t+n})$$

Substituting $Q(s_t, a_t)$ for $$R_t^{(n)} \frac{Q(s_t, a_t) - \sum_{i=1}^{N-1} \gamma^{i-1} r_{t+i}}{\gamma^n} = Q(s_{t+n}, a_{t+n}).$$

Finally, subtracting n time-steps from all time indices leaves the definition of the inverse return, $R^{(-n)}$:

$$R_t^{(-n)} = \gamma^{-n} Q(s_{t-n}; a_{t-n}) - \sum_{i=1}^{n-1} \gamma^{i-n-1} r_{t-n+i} \quad (14)$$

This new inverse return function looks back n-steps along a trajectory to provide an estimate of $Q(s_t,a_t)$. Intuitively the equation makes sense. It states that value of where the agent is $Q(s_t,a_t)$, is equal to the undiscounted value of where it was n-steps ago, $\gamma^{-n}Q(s_{t-n}, a_{t-n})$, minus the undiscounted value accumulated by the agent to get to where it is, $$\sum_{i=1}^{n-1} \gamma^{i-n-1} r_{t-n+i}.$$

In principle, these inverse returns could be used directly to estimate the value of $Q(s_t,a_t)$, just as the forward returns. However, cursory examination reveals that they have poor variance properties compared to the forward n-step returns due to $\gamma^{-n}$. The discount factor, $\gamma \in (0 \ldots 1)$, in the forward view becomes a multiplicative factor in the backward view, that amplifies variance. Further, absorbing states, by their nature, are only found at the end of trajectories. As such, there are no absorbing states for inverse returns. Without absorbing states, there is nothing in an inverse return to provide an absolute grounding value. Still, the inverse returns may provide effective upper bounds for an estimator grounded by value estimates provided by the forward returns. As an upper bound, mirroring the statistical analysis of lower bounds as discussed above, the expectation of the inverse returns should have small positive bias with comparable variance to the $R^{(1)}$ return. Examining Equation (14) it is clear that, given sub-optimal trajectories, the inverse returns should exhibit positive bias. Sub-optimal action choices made by the behavior policy will decrease the expected value of $$\sum_{i=1}^{n-1} \gamma^{i-n-1} r_{t-n+i},$$

introducing positive bias in the inverted returns.

The variance of the inverse returns should be controlled if they are to be used effectively as bounds. Complex return methods can provide a means for controlling the variance of the forward returns.

Example 5—Empirical Results

An empirical evaluation of these approaches are provided on several non-deterministic RL benchmarks. The methods are compared based upon accuracy of the learned value function, quality of the derived policy, and convergence behavior. The following methods were employed, annotated with the return they use to estimate value:

| Method | Value Estimator |
| --- | --- |
| FQI | $R^{(1)}$ |
| TFQI | $R^{Max}$ |
| CFQI-$C_\gamma$ | Truncated $R^\gamma$ |
| CFQI-$B_\gamma(l)$ | $R^{B(R^{(1)}, R^\gamma)}$ |

For the CFQI-$B_\gamma(l)$ method, l denotes the limit on how many steps down the trajectory to use when computing the $R^C$ return. If l is not listed, it uses the full trajectory.

For the purpose of evaluating this approach, an empirical comparison of the present bounding method is provided with that of implementations of the standard $R_t^{(1)}$ method, FQI, the newer $R_t^{Max}$ method, TFQI, and (as just discussed) a naive implementation of using the $TD_\lambda$ return within the FQI framework, $R_t^{\lambda'}$. Results are shown for the CFQI-$B_\gamma$ method, equivalent to BFQI, using the $TD_\gamma$ return as bounds, $R_t^{B_\lambda}$.

In all the experiments, linear regression models with Fourier Basis functions [Konidaris 2011] trained using ridge regression are employed. An exhaustive parameter search was performed, varying the complexity of the model, regularization, number of iterations, and trajectory counts. The results reported are representative of the general observed trends.

AVI is known to exhibit divergence behavior when paired with this type of function approximation model [Boyan 1995]. This issue was circumvented for these specific problem domains by bounding the values returned by the models by $V_{max}$. $V_{max}$ is the maximum possible value for any state-action pair and can be calculated a priori as:

$$V_{max} = \frac{R_{max}}{(1-\gamma)} \quad (15)$$

where $R_{max}$ is the maximum single step reward in the domain. This change was sufficient to ensure convergence for the methods in all the domains tested. This form of function approximation provided superior results than the kernel averaging based methods AVI is guaranteed to converge with. Without bounding the approximation models in this way, divergence behavior was exhibited from all methods. A comprehensive set of parameters were investigated, varying the complexity of the model, regularization, number of iterations, and trajectory counts.

The first set of experiments evaluates the accuracy of each approach in deriving $Q^*$ using identical trajectory data sets. For this purpose, a non-deterministic 51-state Markov chain similar to the one presented in [Lagoudakis 2003] was used as the testing environment. This environment is chosen because $Q^*$ can be calculated exactly using dynamic programming. The goal in this domain is to traverse the chain, starting from some random state, to one of the terminal states, in as few steps as possible. States 0, 25, and 50 are the terminal states. From any non-terminal state the agent can take an action to move the agent to one of two neighboring states with a cost of −1. The discount factor, $\gamma$, was set to 0.9 and there is a 20% probability that an action taken will result in no transition. The function approximation model uses a 10th order Fourier basis with no regularization in training the model.

In order to evaluate the methods under varying levels of off-policy bias, multiple training sets of 10,000 trajectories were generated. The sets are generated from behavior policies that follow the optimal policy with 0.9 to 0.5 probability (equivalent to a random policy) at each step. For each run, 1000 trajectories were selected at random from a chosen repository to form a training data set. The results are the average of 200 runs. Each approach was evaluated based on the average MSE of the $\hat{Q}$ functions after 50 iterations of learning, comparing to the true Q* function, after 50 iterations of learning (sufficient to ensure convergence).

For completeness, the LSTD-Q algorithm [Lagoudakis 2003], an alternative batch-mode algorithm, is considered. LSTD-Q performed nearly identically to $R_t^{(1)}$. This finding is expected given that LSTD-Q and $R^{(1)}$ perform the same given they are optimizing the same objective function. Testing was also conducted using $R_t^{\lambda}$ without truncating the returns and found it did not work, as expected.

Figure 2:
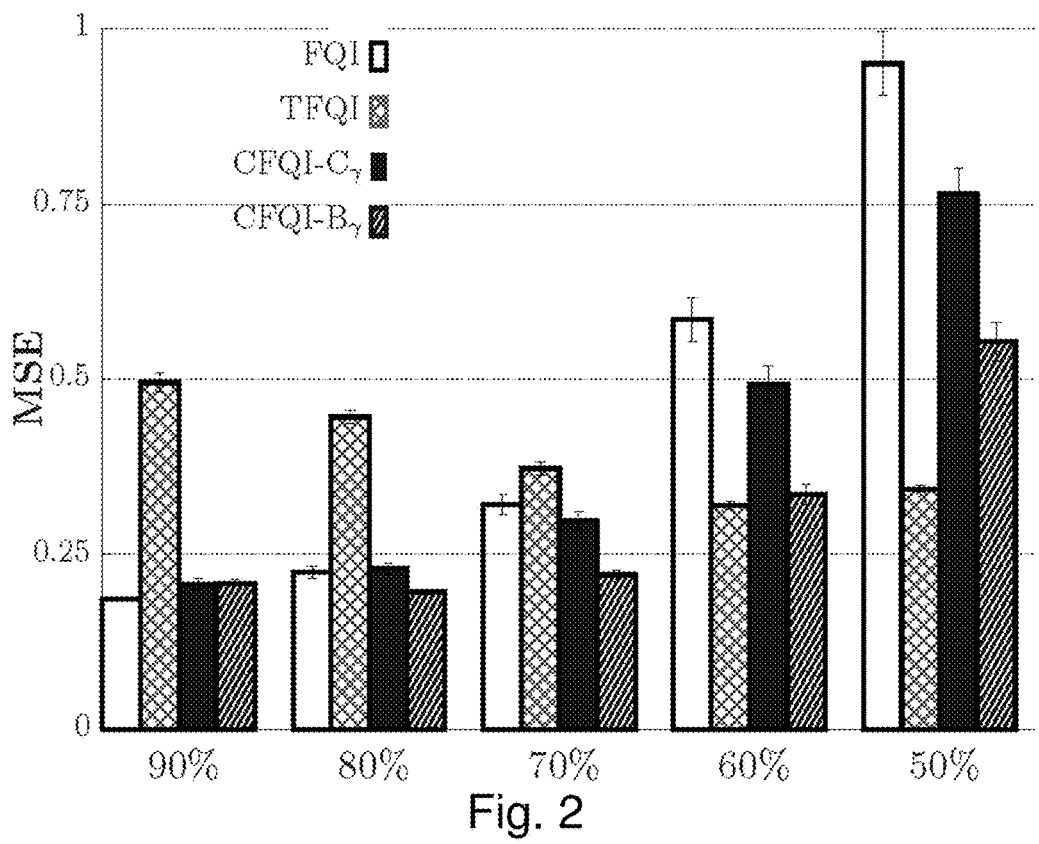
FIG. 2 shows the average MSE of the learned Q functions. The behavior policy is varied from 90% to 50% of optimal simulating conditions of increasing bias. Error bars are standard error.

FIG. 2 shows the average MSE of the learned Q functions. The behavior policy is varied from 90% to 50% of optimal simulating conditions of increasing bias. Error bars are standard error.

FIG. 2 shows the experimental results; the bounding approach $R_t^{B_\lambda}$ is able to learn Q* as well or more accurately than $R_t^{(1)}$, most significantly as the off-policy bias increases. This demonstrates that providing a stable and effective bound that reduces overall error. The $R_t^{Max}$ method, in comparison, provides the greatest overall improvement over $R_t^{(1)}$ when the off-policy bias is highest. However, it is unstable and performs poorly compared to the other methods when there is less off-policy bias demonstrating how this method is prone to overestimating. Not surprisingly the naive $R_t^{\lambda'}$ method is not competitive. The results show the CFQI based methods are stable and significantly outperform FQI at most levels of off-policy bias. The only exception is with data from a 90% optimal policy, where CFQI performs comparably to FQI. TFQI on the other hand shows unstable results. It performs poorly when there is less off-policy bias, demonstrating that the $R^{Max}$ return can be prone to overestimate. However, it is significantly better than all other methods on near random trajectory data. Comparing CFQI-C and CFQI-B, the bounding approach performs significantly better than its truncated complex return counterpart.

In analyzing this result, it was observed that the values of n-step returns, after convergence, are normally distributed and exhibit the general trend of increasing negative bias as predicted.

Investigation was performed to determine if increases in accuracy in the approximation of Q* translate to improved learned policies. Two experiments were performed, on challenging RL benchmarks the Acrobot (Acro) swing-up [Sutton 1998] and the Cart Pole Balancing (PB) [Sutton 1998] problems. These two problems represent two different classes of domain: goal oriented and failure avoidance respectively. In the Acrobot domain, the objective is to derive a policy that enables an under-actuated robot to swing-up in as few steps as possible, limited to 1,000. A cost of $-1$ is given for every non-terminal transition. Whereas, in the PB domain the goal is to avoid the failure conditions, for up to 10,000 steps, of dropping the pole or exceeding the bounds of the track. Here a positive reward of $+1$ is given for every non-terminal transition. The discount factor for the Acrobot domain was set to $\gamma=0.9999$, while for CPB it was set to $\gamma=0.9999$. Like the Markov chain, these domains were made non-deterministic by incorporating a 20% probability that an action results in no action having been taken. Fourier basis of orders 2, for Acrobot, and 2 or 3, for CPB, both trained with the same small regularization penalty, are used to represent Q.

Policy performance is measured by the mean aggregate reward obtained by running a given policy over 50 trials, necessary due to the non-determinism. Experiments are run on data sets comprised of increasing numbers of trajectories to examine the relative sample efficiency of the methods. NeuroEvolution of Augmenting Topologies (NEAT) [Stanley 2002] to generate diverse trajectory sets, comprised of over 5,000 trajectories, for both domains as was done in [Wright 2013]. This form of data violates Least Squares Temporal Difference-Q (LSTD-Q)'s assumptions on sampling distribution, and thus are excluded in these experiments. Additionally, for clarity of exposition results for $R_t^{\lambda'}$ also excluded because during testing it was not found to be competitive. The reported results are an average of 200 runs for each experimental setting. The reported results are an average of 200 runs for each setting after 300 iterations of learning. Error bars are not included in the reported results. Instead, statistical significance is determined by performing a paired t-test. Statistical significance is found in the following analysis if (p<0.005).

Figure 3:
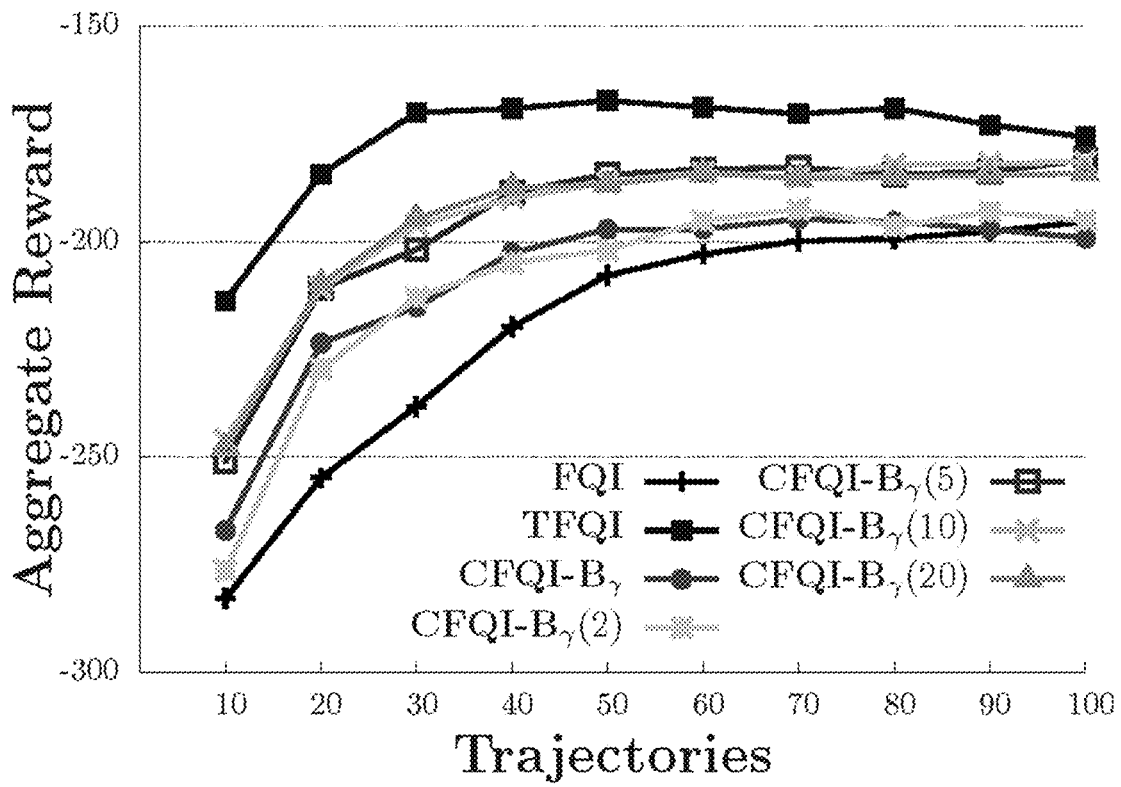
FIG. 3 shows the mean policy performance in the Acrobot domain over 300 iterations.

FIG. 3 shows the mean policy performance in the Acrobot domain over 300 iterations.

Figure 4:
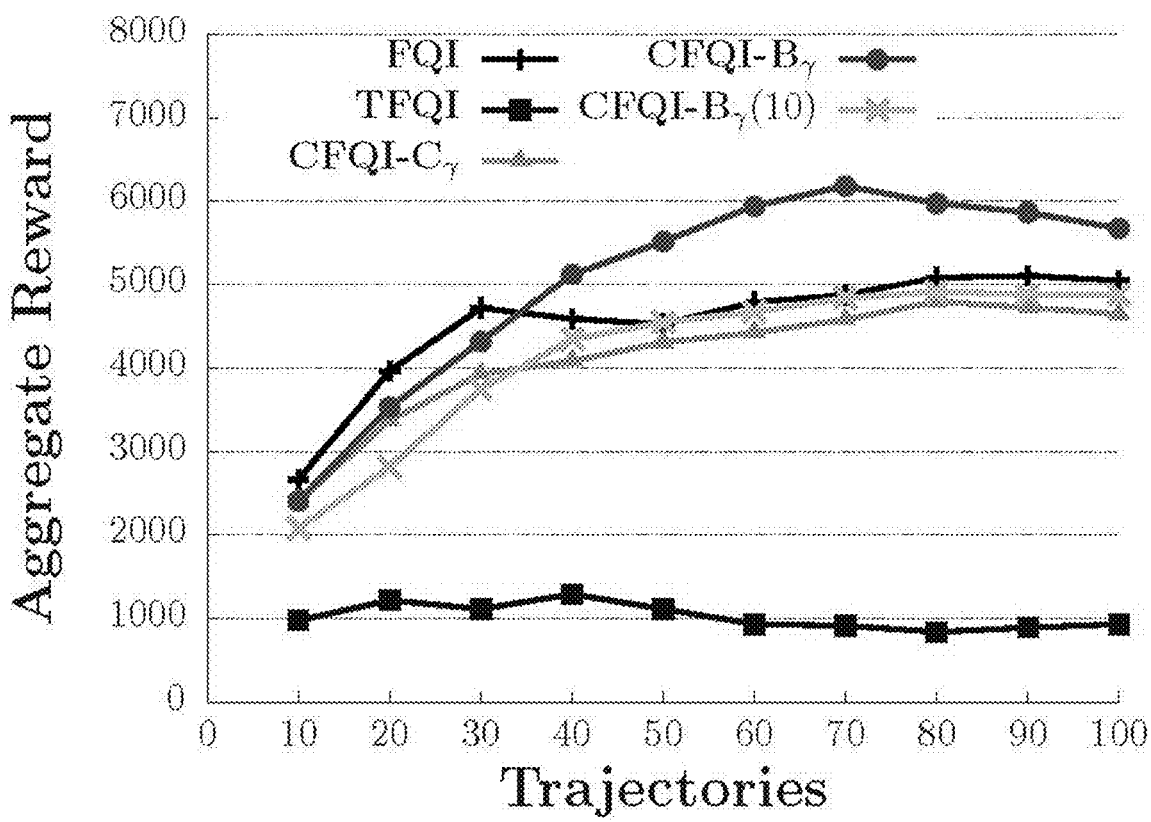
FIG. 4 shows the mean policy performance in the Cart Pole Balancing domain over 300 iterations.

FIG. 4 shows the mean policy performance in the Cart Pole Balancing domain over 300 iterations.

TFQI performs the best, significantly outperforming all other methods with the exception of CFQI-$B_\gamma$ (10) at 100 trajectories. This observation suggests that there is significant negative bias stemming from either the trajectories, model or both. TFQI is the most aggressive of the bounding approaches and finds the best policies. The results for CFQI-$C_\gamma$ are purposely missing from FIG. 3. CFQI-$C_\gamma$ has difficulty converging on all data sets in this domain, confirming the suspicion discussed above. The resulting policies all averaged an aggregate reward value of $-700$ or less, so the result was omitted.

CFQI-$B_\gamma$ fails to significantly outperform FQI at 10 and 100 trajectories. This demonstrates how the full $\gamma$-return can fail the third criterion by incorporating too much off-policy bias. A solution is provided below that limits the length of complex return. FIG. 3 also shows results for CFQI-$B_\gamma$(l) for various l settings. Setting l=2 performs comparably to the default full length setting, CFQI-$B_\gamma$, which are representatives of the two extremes of the parameter's range. At l=1 CFQI-$B_\gamma$ (l) reduces to FQI. Increasing l=5 and the method performs significantly better. No measurable improvement is seen increasing l beyond this value, however, l=10 is used in subsequent experiments as 5 may be too short and 10 did not adversely affect performance. These results show CFQI-$B_\gamma$ (l) provides effective bounds that enable more effective policies to be learned on less data, demonstrating improved sample efficiency.

In sharp contrast to the Acrobot results, TFQI performs the worst in this domain, as shown in FIG. 4. It fails to find a competent policy at all trajectory counts, confirming that it can be an overly aggressive bound and an unstable approach. All other methods perform comparably with FQI with the exception of CFQI-$B_\gamma$. At higher trajectory counts CFQI-$B_\gamma$ learns a significantly better policy than all other methods. This observation can be explained by the $\gamma$-return's long-tail weighting and the specifics of the CPB domain. In the CPB domain all rewards are positive with the exception of transitions to failure states. As a result, there is little the sub-optimal trajectory bias in long trajectories. CFQI-$B_\gamma$ looks the furthest out and produces the most effective lower bound in this domain.

Convergence behavior is an important consideration with any AVI approach because it determines how long it will take before a consistent policy can be extracted or if the approach will succeed at all. The convergence behavior is examined based on policy convergence and convergence of the $\hat{Q}$ models.

Figure 5:
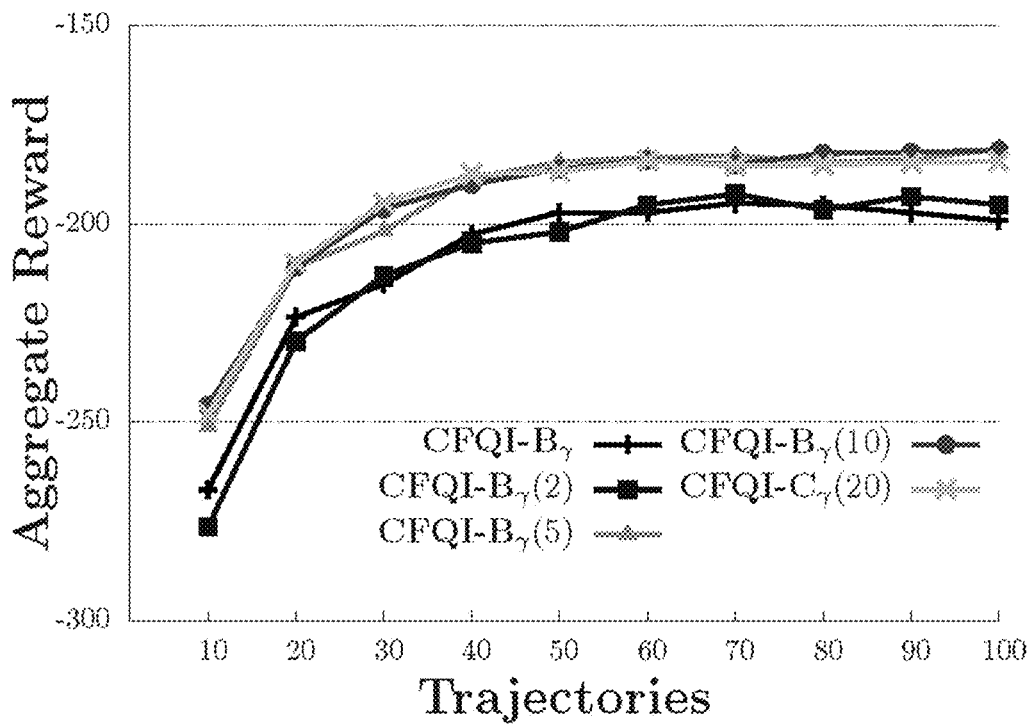
FIG. 5 shows the mean policy performance at every 10 iterations in the Acrobot domain using 100 trajectories.

FIG. 5 shows the final policy performance in the Cart Pole Balancing domain using trajectory sets of increasing size.

Figure 6:
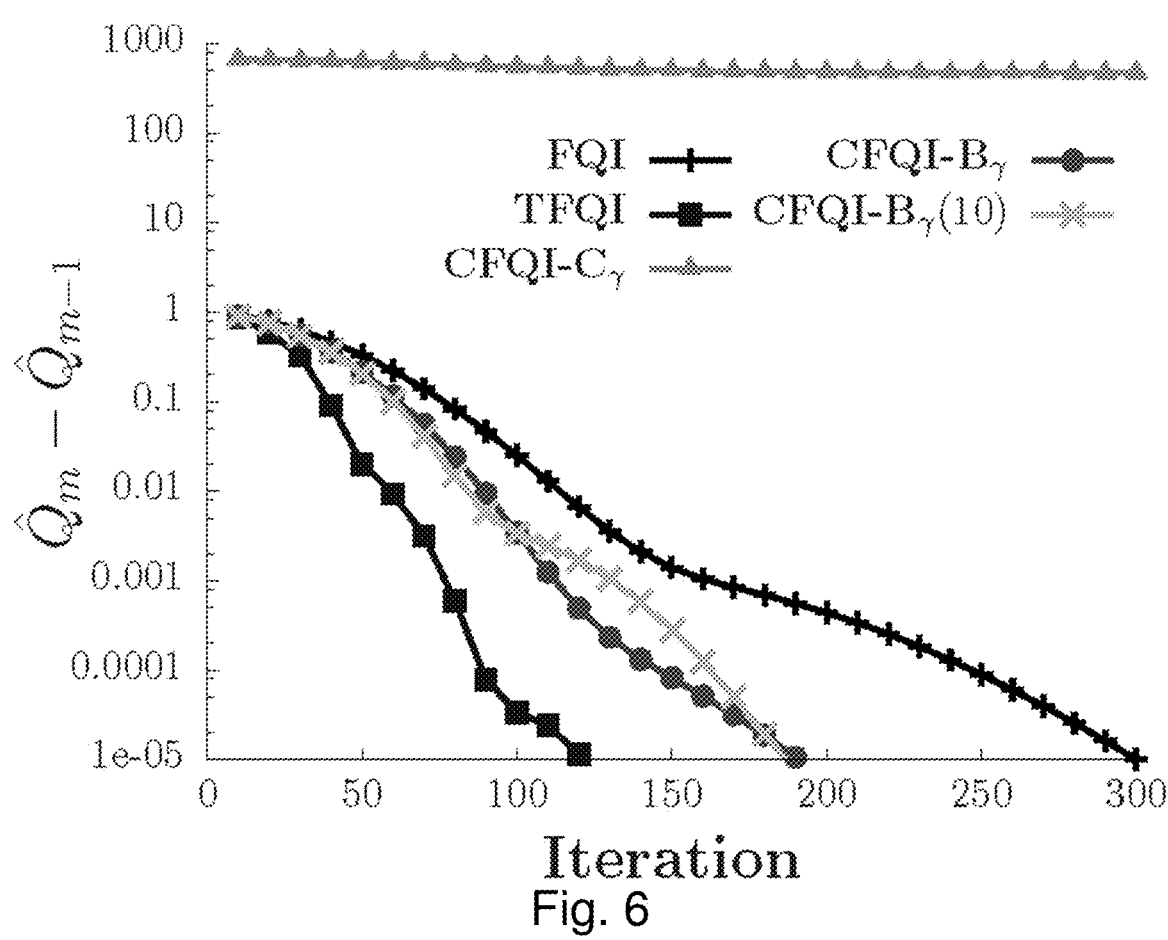
FIG. 6 shows the mean per-iteration $\hat{Q}$ difference at every 10 iterations in the Acrobot domain using 100 trajectories.

FIG. 6 shows the mean per-iteration $\hat{Q}$ difference at every 10 iterations in the Acrobot domain using 100 trajectories.

The results for the Acrobot domain are shown in FIGS. 5 and 6. Both figures are generated from the results of the 100 trajectory count experiments. FIG. 5 shows the policy performance evaluated at every 10th iteration and FIG. 6 shows the per-iteration difference in Q models. From FIG. 5 it appears that the policy for the methods shown all converge around the 100th iteration. The result for CFQI-C($\gamma$) is omitted due its poor performance. The explanation for this is that CFQI-C($\gamma$) fails to converge as shown in FIG. 6). The lack of convergence is caused by the non-fixed length of truncated trajectories. This finding suggests that the CFQI-C approach is not reliable. TFQI converges the fastest of all approaches followed by the CFQI-B methods, which all converge significantly faster than FQI.

Figure 7:
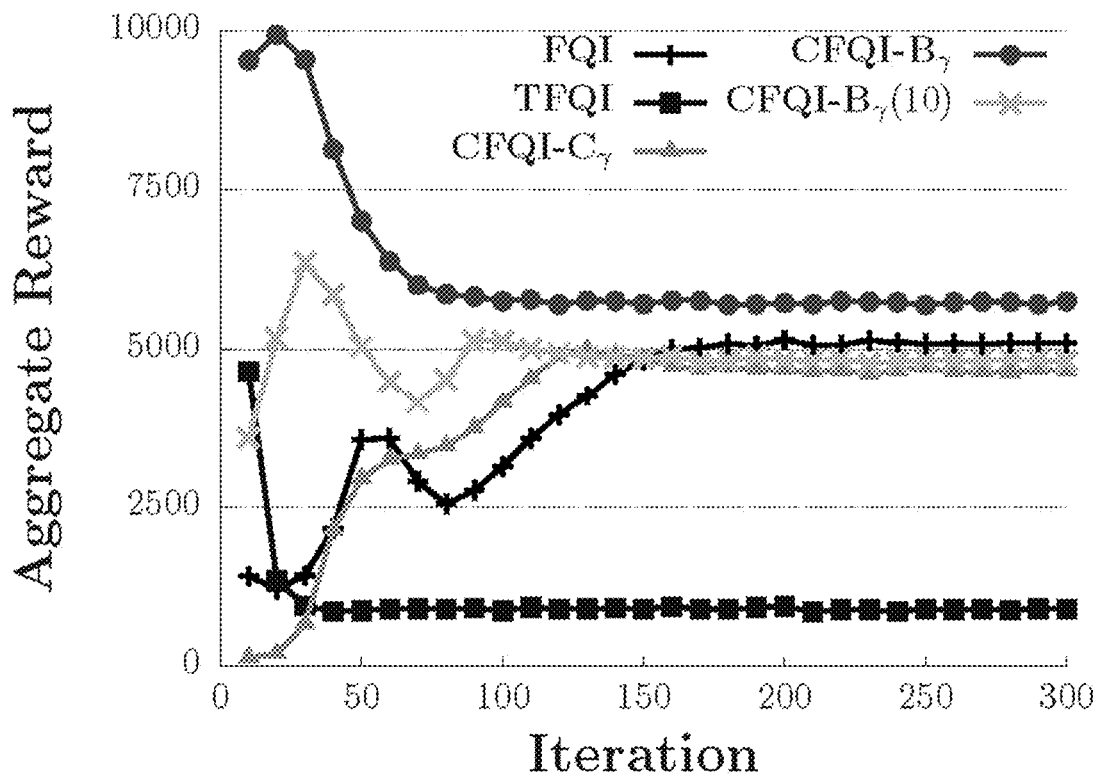
FIG. 7 shows the mean policy performance at every 10 iterations in the Cart Pole Balancing domain using 100 trajectories.

FIG. 7 shows the mean policy performance at every 10 iterations in the Cart Pole Balancing domain using 100 trajectories.

Figure 8:
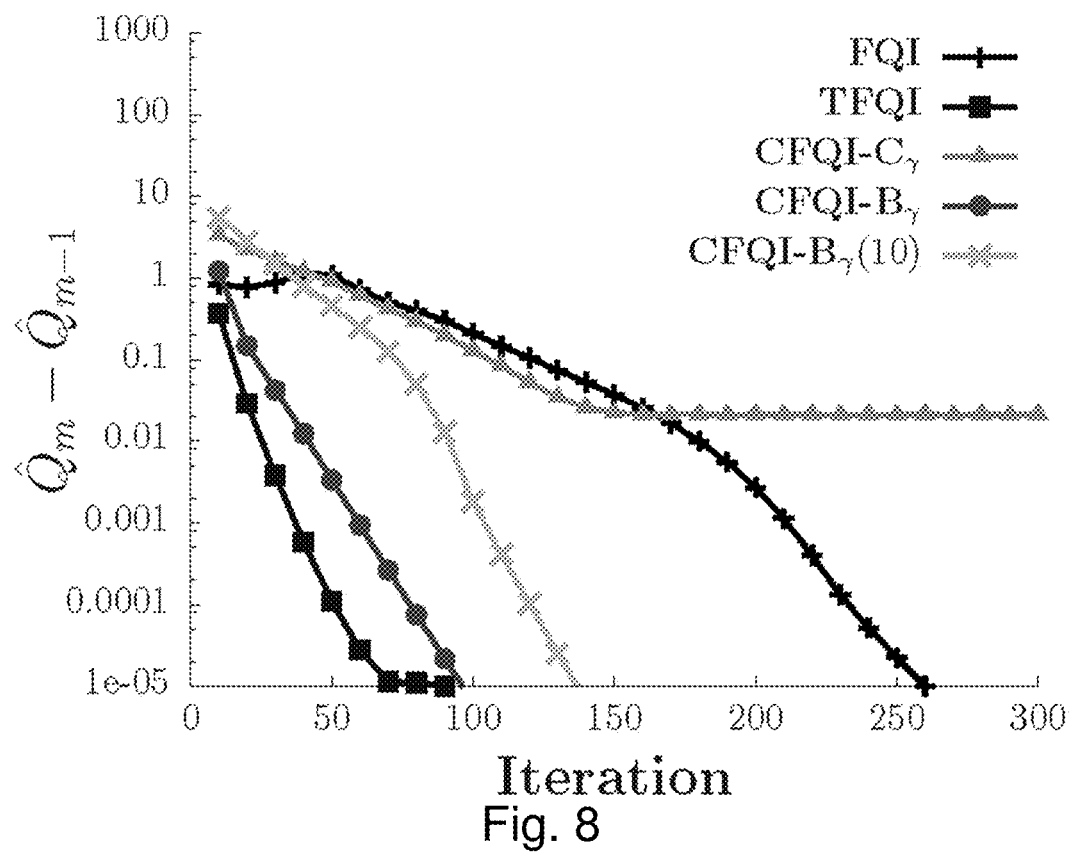
FIG. 8 shows the mean per-iteration $\hat{Q}$ difference at every 10 iterations in the Cart Pole Balancing domain using 100 trajectories.

FIG. 8 shows the mean per-iteration $\hat{Q}$ difference at every 10 iterations in the Cart Pole Balancing domain using 100 trajectories.

FIGS. 7 and 8 show the similar results for the CPB domain. FQI, CFQI-$C_\lambda$, and CFQI-$B_\lambda$ (10) all converge to a similar performing policy after 100 iterations. It is somewhat odd that the CFQI-$B_\lambda$ runs produce near optimal policies early in the iterative process before converging to a lesser performing policy. These results demonstrate how there can be a disconnect between deriving an accurate value function and actual policy performance. TFQI also converges quickly, but to a poor policy. FIG. 8, again, shows that CFQI-C. methods fail to converge, but does manage to derive a stable policy. CFQI-$B_\lambda$ meanwhile, converges towards the best performing policy at a significantly quicker rate than FQI.

The sub-optimal off-policy bias, as discussed herein, unique to the AVI context, can therefore be exploited by using the complex returns as bounds on value estimates. A new AVI framework, CFQI, and two new approaches based on this framework, CFQI-C and CFQI-B, have been explained. CFQI converges with fixed length complex returns and when bounding is used. An empirical evaluation is presented that clearly demonstrates that the bounding approach improves the accuracy of value estimates for AVI significantly resulting in better policies, faster convergence, and improved sample efficiency.

Therefore, it is understood that the present technology provides improved performance in approximate value iteration approaches, achieving higher efficiency by providing updating algorithms that employ off-policy trajectory data with optimized upper and lower bound bias.

The embodiments and features of this invention may be used in combination and subcombination, without departing from the spirit and scope of the invention disclosed herein.

Thus have been described improvements to reinforcement learning technology, which may be applied to, by way of example, and without limitation, robot control (such as bipedal or quadrupedal walking or running, navigation, grasping, and other control skills); vehicle control (autonomous vehicle control, steering control, airborne vehicle control such as helicopter or plane control, autonomous mobile robot control); machine control; control of wired or wireless communication systems; control of laboratory or industrial equipment; control or real or virtual resources (such as memory management, inventory management and the like); drug discovery (where the controlled action is, say, the definition or DNA sequence of a drug and the states are defined by states of a living entity to which the drug is applied); application to a system in which the state of or output from the system is defined by words (text and/or audio and/or image), such as a system employing natural language; application to a trading system such as a stock, bond, foreign exchange, repo, options, futures, commodities, insurance, etc. markets (although the actions taken may have little effect on such a system, very small effects can be sufficient to achieve useful overall rewards); recommenders, advertising delivery platforms, customer relationship management systems and callcenters, social networks, games and video games, HVAC and environmental control, appliance and motor/motion system control, combustion system control, chemical process control, industrial process control, energy production systems and infrastructure, energy storage systems, energy distribution systems, elevator systems, traffic (physical and logical) control systems, network (physical and logical) management systems, other types of energy consumption systems, queue management systems, and others. The technology may also be used in toys and games, such as quadcopters and hex-copters, cellphones and other portable electronics, office machines such as copiers, scanners and printers, military devices such as munitions and UAVs, vehicle and machine transmissions, vehicle cruise controls, and the like. Other applications for the technology are described in the cited references incorporated herein.

In a physical control system, various types of sensors may be employed, such as position, velocity, acceleration, angle, angular velocity, vibration, impulse, gyroscopic, compass, magnetometer, SQUID, SQIF, pressure, temperature, volume, chemical characteristics, mass, illumination, light intensity, biosensors, micro electromechanical system (MEMS) sensors etc. The sensor inputs may be provided directly, through a preprocessing system, or as a processed output of another system.

The technology may be applied to image and video processing. In that case, while the trajectory may also be over time, it may also encompass other physical dimensions, as well as considering objects represented over their respective dimensions. [Lange 2010, Lange 2012].

The technology may also be applied in non-physical domains, such as in a semantic space, which may have very high dimensionality. For example, a trajectory in the semantic space may represent a series of words or semantic communications, see [Rennie 1999, Van Otterlo 2005, Cuayáhuitl 2009, Cuayáhuitl 2010]. In that case, the processing of the trajectories reveals at least context, and is responsive to changing context. Even modest improvements in efficiency The present technology is performed using automated data processors, which may be purpose-built and optimized for the algorithm employed, or general-purpose hardware. Without limiting the generality, a written description of such a system is as follows:

In various embodiments, the System may comprise a standalone computer system, a distributed computer system, a node in a computer network (i.e., a network of computer systems organized in a topology), a network of Systems, and/or the like. It is to be understood that the System and/or the various System elements (e.g., processor, system bus, memory, input/output devices) may be organized in any number of ways (i.e., using any number and configuration of computer systems, computer networks, nodes, System elements, and/or the like) to facilitate System operation. Furthermore, it is to be understood that the various System computer systems, System computer networks, System nodes, System elements, and/or the like may communicate among each other in any number of ways to facilitate System operation. The term "user" refers generally to people and/or computer systems that interact with the System, the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The System includes a processor that executes program instructions. In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory, e.g., DDR2, DDR3. DDR4. Or DDR5 via a system bus. The system bus may interconnect these and/or other elements of the System via electrical, electronic, optical, wireless, and/or the like communication links (e.g., the system bus may be integrated into a motherboard that interconnects System elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions executed by the processor. The system memory may facilitate accessing, storing, retrieving, modifying, deleting, and/or the like data by the processor.

In various embodiments, input/output devices may be connected to the processor and/or to the system memory, and/or to one another via the system bus. In some embodiments, the input/output devices may include one or more graphics devices. The processor may make use of the one or more graphic devices in accordance with program instructions executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., SYSTEM data). A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an NVidia GRID K2, K1, Tesla K10, K20X, K40, M2075, Quadro K6000, K5200, K2000, AMD FirePro W9000, W8100, AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. A graphics device may operate in combination with other graphics devices (e.g., in parallel) to provide improved capabilities, data throughput, color depth, and/or the like.

In some embodiments, the input/output devices may include one or more network devices. The processor may make use of the one or more network devices in accordance with program instructions executed by the processor. In one implementation, a network device may be a network card that may obtain (e.g., via a Category 6A Ethernet cable), process, output (e.g., via a wireless antenna), and/or the like network data. A network card may be connected to the system bus via an interface such as PCI, PCI Express, USB, FireWire, PC Card, ExpressCard, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices. The processor may make use of the one or more peripheral devices in accordance with program instructions executed by the processor. In various implementations, a peripheral device may be a monitor, a touchscreen display, active shutter 3D glasses, head-tracking 3D glasses, a camera, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the System with a variety of input, output and processing capabilities.

In some embodiments, the input/output devices may include one or more storage devices. The processor may access, read from, write to, store in, erase, modify, and/or the like a storage device in accordance with program instructions executed by the processor. A storage device may facilitate accessing, storing, retrieving, modifying, deleting, and/or the like data by the processor. In one implementation, the processor may access data from the storage device directly via the system bus. In another implementation, the processor may access data from the storage device by instructing the storage device to transfer the data to the system memory and accessing the data from the system memory. In various implementations, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CO card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed. Together and/or separately the system memory and the one or more storage devices may be referred to as memory (i.e., physical memory). System memory contains processor-operable (e.g., accessible) data stores. Such data may be organized using one or more data formats such as a database (e.g., a relational database with database tables, an object-oriented database, a graph database, a hierarchical database), a flat file (e.g., organized into a tabular format), a binary file, a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, System elements, and/or the like).

In some embodiments, components may include an operating environment component. The operating environment component may facilitate operation via various subcomponents. In some implementations, the operating environment component may include an operating system subcomponent. The operating system subcomponent may provide an abstraction layer that facilitates the use of, communication among, common services for, interaction with, security of, and/or the like of various System elements, components, data stores, and/or the like. In some embodiments, the operating system subcomponent may facilitate execution of program instructions by the processor by providing process management capabilities. For example, the operating system subcomponent may facilitate the use of multiple processors, the execution of multiple processes, multitasking, and/or the like. In some embodiments, the operating system subcomponent may facilitate the use of memory. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data. In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices. In some embodiments, the operating system subcomponent may facilitate operation of the System as a node in a computer network by providing support for one or more communications protocols. For example, the operating system subcomponent may include support for the internet protocol suite (i.e., Transmission Control Protocol/Internet Protocol (TCP/IP)) of network protocols such as TCP, IP, User Datagram Protocol (UDP), Mobile IP, and/or the like. In another example, the operating system subcomponent may include support for security protocols (e.g., Wired Equivalent Privacy (WEP), Wi-Fi Protected Access (WPA), WPA2) for wireless computer networks. In yet another example, the operating system subcomponent may include support for virtual private networks (VPNs). In various embodiments the operating system subcomponent may comprise a single-user operating system, a multi-user operating system, a single-tasking operating system, a cluster or high performance operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 7, 8, 8.1, 10, Apple Mac OS X, Apple iOS, Android, Symbian, Windows Phone 7, Windows Phone 8, Blackberry QNX, and/or the like.

In some implementations, the operating environment component may include a database subcomponent. The database subcomponent may facilitate capabilities such as storage, analysis, retrieval, access, modification, deletion, aggregation, generation, and/or the like of data (e.g., the use of data stores 530). The database subcomponent may make use of database languages (e.g., Structured Query Language (SQL), XQuery), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, and/or the like.

In some implementations, the operating environment component may include an information handling subcomponent. The information handling subcomponent may provide capabilities to serve, deliver, upload, obtain, present, download, and/or the like a variety of information. The information handling subcomponent may use protocols such as Hypertext Transfer Protocol (HTTP), Hypertext Transfer Protocol Secure (HTTP), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some implementations, the operating environment component may include a virtualization subcomponent that facilitates virtualization capabilities. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via memory virtualization, storage virtualization, data virtualization, network virtualization, and/or the like. For example, the virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

What is claimed is:

1. A method for controlling a system, comprising:
   estimating an optimal control policy for the system;
   receiving data representing sequential states and associated trajectories of the system, comprising off-policy states and associated off-policy trajectories;
   improving the estimate of the optimal control policy by performing at least one approximate value iteration, each approximate value iteration comprising:
     estimating an expected value of operation of the system dependent on the estimated optimal control policy;
     using a complex return of the received data, biased by the off-policy states, to determine a bound dependent on at least the off-policy trajectories;
     using the determined bound to improve the estimate of the expected value of operation of the system; and
     updating the estimate of the optimal control policy, dependent on the improved estimate of the expected value of operation of the system using the determined bound; and
   employing the updated estimate of the optimal control policy to control the system with an automated controller, wherein the automated controller is configured to automatically alter at least one of the system, and an environment in which the system operates.

2. The method according to claim 1, wherein said using the complex return of the received data comprises using a truncated portion of a trajectory which is consistent with the estimate of the optimal control policy, to estimate the complex return, without introducing off-policy bias.

3. The method according to claim 2, wherein the truncated portion of the trajectory comprises a predetermined number of received data representing sequential states.

4. The method according to claim 2, wherein the truncated portion of the trajectory is truncated dependent on whether a sequential datum of the received data is on-policy or off-policy.

5. The method according to claim 1, wherein an inherent negative bias of the complex return is employed as a lower bound for the estimate of the expected value of operation of the system.

6. The method according to claim 1, wherein the bound comprises an upper bound for the estimate of the expected value of operation of the system according to the estimated optimal control policy.

7. The method according to claim 6, wherein the upper bound is determined by at least looking backward along a respective trajectory, to provide an estimate of the system as an inflated value of a past environment of the system to achieve a current environment.

8. The method according to claim 1, wherein a trajectory comprises an ordered collection of observations, and the expected value of operation of the system comprises the sum of discounted expected values of a reward received for each observation plus a maximum discounted estimated expected value for operation of the system at the estimated optimal control policy.

9. The method according to claim 1, wherein the bound is a bounded return representing a maximum of an unbiased estimator and a complex return function.

10. The method according to claim 1, wherein said iteratively determining comprises using reinforcement learning to derive the optimal control policy that maximizes the expected value of operation of the system according to the Bellman optimality equation $\tau$
$M$
$R^c$
$\hat{Q}_0 \leftarrow 0$
$m=1\ M$
  $X\ Y$
  $k=1\ |\tau|$
    $t=1\ |T_k|$
      $X \leftarrow \text{Append}\ (X, (s_t^{T_k}, a_t^{T_k}))$
      $Y \leftarrow \text{Append}\ (Y, R^C\ (t, T_k, \hat{Q}_{m-1}))$
  $\hat{Q}_m \leftarrow \text{Regression}\ (X, Y)$
$\hat{Q}_{M'}$ 11. The method according to claim 1, wherein said approximate value iteration comprises using a Markov decision process (MDP) in combination with the optimal control policy $\hat{Q}$
$\hat{Q}_0 \leftarrow 0$
$|\tau|$
  $R_t^B$
$\hat{Q}_m \leftarrow \text{Regression}\ (X, Y)$.

12. A control system, comprising:
a memory configured to store a set of data representing sequential states and associated trajectories of the system, comprising off-policy states and associated off-policy trajectories; and
at least one automated processor, configured to process the data in the memory, to:
  estimate an optimal control policy for the system;
  receive the set of data representing sequential states and associated trajectories of the system, comprising off-policy states and associated off-policy trajectories;
  improve the estimate of the optimal control policy by performing at least one approximate value iteration, comprising:
    estimate an expected value of operation of the system dependent on the estimated optimal control policy;
    determine a bound dependent on at least the off-policy trajectories using a complex return of the received data, biased by the off-policy states;
    using the determined bound to improve the estimate of the expected value of operation of the system; and
    update the estimate of the optimal control policy, dependent on the improved estimate of the expected value of operation of the system using the determined bound; and
  produce at least one output, selectively dependent on the updated estimate of the optimal control policy, to alter at least one of the system and an environment in which the system operates.

13. The control system according to claim 12, further comprising a network device, configured to automatically communicate the at least one output to change an operating state of the system.

14. The control system according to claim 12, further comprising a network device, configured to automatically communicate the at least one output to change an environment of operation of the system.

15. The control system according to claim 12, wherein the at least one automated processor is configured to use the complex return of the set of data as a bound to improve an estimated expected value of operation of the system by truncating a trajectory to produce a truncated portion which is consistent with the estimate of the optimal control policy, and to use the truncated portion to estimate the complex return, without introducing off-policy bias.

16. The control system according to claim 12, wherein the truncated portion of the trajectory is selectively truncated dependent on whether a sequential datum is on-policy or off-policy.

17. The control system according to claim 12, wherein the at least one processor is further configured to:
employ an inherent negative bias of the complex return as a lower bound for the estimate of the expected value of operation of the system; and
predict an upper bound for the estimated expected value of operation of the system.

18. The control system according to claim 12, wherein the trajectory comprises an ordered collection of observations, and the expected value of operation of the system comprises the sum of discounted values of a reward received for each observation, plus a maximum discounted estimated expected value for operation of the system at the estimated optimal policy.

19. The control system according to claim 12, wherein the bound comprises a bounded return representing the greater of an unbiased estimator and a complex return function.

20. A non-transitory computer readable medium storing instructions for controlling at least one automated processor, comprising:
instructions for estimating an optimal control policy for the system;
instructions for receiving data representing sequential states and associated trajectories of the system, comprising off-policy states and associated off-policy trajectories; and
instructions for improving the estimate of the optimal control policy by performing at least one approximate value iteration comprising:
  instructions for estimating an expected value of operation of the system dependent on the estimated optimal control policy;

instructions for using a complex return of the received data, biased by the off-policy states, to determine a bound dependent on at least the off-policy trajectories;

using the determined bound to improve the estimate of the expected value of operation of the system; and instructions for updating the estimate of the optimal control policy, dependent on the improved estimate of the expected value of operation of the system.

* * * * *